US011655433B2

(12) United States Patent
Sikora et al.

(10) Patent No.: US 11,655,433 B2
(45) Date of Patent: May 23, 2023

(54) METHOD, SYSTEM AND PRODUCT OF ULTRASONIC CLEANING OF DRILL CUTTINGS

(71) Applicant: Green Drilling Technologies, LLC, Uniontown, PA (US)

(72) Inventors: Richard Anthony Sikora, Uniontown, PA (US); John Sebastian Shaker, Uniontown, PA (US)

(73) Assignee: Green Drilling Technologies LLC, Uniontown, PA (US)

(*) Notice: Subject to any disclaimer, the term of this patent is extended or adjusted under 35 U.S.C. 154(b) by 406 days.

(21) Appl. No.: 16/887,993

(22) Filed: May 29, 2020

(65) Prior Publication Data

US 2020/0377821 A1 Dec. 3, 2020

Related U.S. Application Data

(60) Provisional application No. 62/854,015, filed on May 29, 2019.

(51) Int. Cl.
*C11D 1/00* (2006.01)
*C11D 1/29* (2006.01)
(Continued)

(52) U.S. Cl.
CPC .................. *C11D 1/83* (2013.01); *B08B 3/08* (2013.01); *B08B 3/12* (2013.01); *E21B 21/066* (2013.01);
(Continued)

(58) Field of Classification Search
CPC .. C11D 1/00; C11D 1/29; C11D 1/665; B08B 3/08; B08B 3/12; E21B 21/06;
(Continued)

(56) References Cited

U.S. PATENT DOCUMENTS

| | | | |
|---|---|---|---|
| 3,489,679 A | 1/1970 | Davidson et al. |
| 4,350,591 A | 9/1982 | Lee |

(Continued)

FOREIGN PATENT DOCUMENTS

| | | |
|---|---|---|
| WO | 9103309 | 3/1991 |
| WO | 9527551 | 10/1995 |

OTHER PUBLICATIONS

"Draft Testing Requirements for Drill Cuttings R&D: Draft Analytical Requirements for R&D Project," Pennsylvania Department of Environmental Protection, Mar. 15, 2018.

(Continued)

*Primary Examiner* — Brian P Mruk
(74) *Attorney, Agent, or Firm* — Metz Lewis Brodman Must O'Keefe LLC

(57) ABSTRACT

A method, system and cleaning solutions for the ultrasonic cleaning of drill cuttings and the resulting cleaned drill solids is described. The drill cuttings are characterized by their liquid/solid composition, texture of solids and size of particulates. A cleaning solution formula having surfactant(s) and viscosity agent(s) is selected based on the characterization of drill cuttings. Drill cuttings are contacted with the selected cleaning solution and subjected to ultrasonic vibrations simultaneously for a period of treatment and vibration time. Contaminants from drill cuttings are removed to beneficial use standards and the resulting cleaned drill solids may be reused at the well site. The cleaning may occur at a well site in conjunction with drilling activity and the cleaning solution may be changed to adapt to changes in the drill mud and/or cuttings characteristics.

20 Claims, 13 Drawing Sheets

(51) Int. Cl.

| | |
|---|---|
| ***B08B 3/08*** | (2006.01) |
| ***B08B 3/12*** | (2006.01) |
| ***E21B 21/06*** | (2006.01) |
| ***B09C 1/02*** | (2006.01) |
| ***B07B 1/10*** | (2006.01) |
| ***B09B 3/00*** | (2022.01) |
| ***C11D 1/83*** | (2006.01) |
| *C11D 1/48* | (2006.01) |
| *C11D 1/14* | (2006.01) |
| *C11D 1/75* | (2006.01) |
| *C11D 1/72* | (2006.01) |

(52) U.S. Cl.
CPC ................ *C11D 1/146* (2013.01); *C11D 1/48* (2013.01); *C11D 1/721* (2013.01); *C11D 1/75* (2013.01)

(58) Field of Classification Search
CPC ........... E21B 21/065; B09C 1/02; B07B 1/10; B09B 3/00
See application file for complete search history.

(56) References Cited

U.S. PATENT DOCUMENTS

| | | | | |
|---|---|---|---|---|
| 4,645,608 | A | 2/1987 | Rayborn | |
| 5,676,213 | A | 10/1997 | Auzerais | |
| 5,780,407 | A | 7/1998 | Van Slyke | |
| 6,553,901 | B2 | 4/2003 | Reddoch | |
| 7,913,776 | B2 | 3/2011 | Nahmad | |
| 8,025,152 | B2 | 9/2011 | Vasshus et al. | |
| 8,394,270 | B2 | 3/2013 | Vasshus et al. | |
| 2005/0236015 | A1 | 10/2005 | Goel et al. | |
| 2010/0186767 | A1* | 7/2010 | Martin | E21B 21/065 134/1 |
| 2012/0181085 | A1* | 7/2012 | Quintero | E21B 21/066 175/66 |
| 2013/0146545 | A1 | 6/2013 | Pabalan et al. | |

OTHER PUBLICATIONS

"PA Standard GP Testing," Pennsylvania Department of Environmental Protection, Apr. 18, 2018.

"Management of Fill," Pennsylvania Department of Environmental Protection, Bureau of Waste Management, Dep ID 258-2182-773, vol. 6, Tab 40(b), Aug. 7, 2010, p. i-ii, 1-6 and Tables FP-1a, FP-1b, GP-1a and GP-1b.

Ohio Revised Code, Title 15, Chapter 1509, Section 74, "Analysis and disposition of material resulting from construction, operation, or plugging of a horizontal well," Sep. 29, 2013, pp. 1-2.

North Dakota Administrative Code, Title 33, Article 20, Chapter 1, "General Provisions," Jan. 1, 2016, pp. 1-11.

"Guideline 38—Beneficial Use of Inert Waste," North Dakota Department of Health, Division of Waste Management, Nov. 2009, pp. 1-3.

"Guideline 42—Oilfield Exploration and Production Associated Waste Activities," North Dakota Department of Health, Division of Waste Management, Feb. 2014, pp. 1-6.

Ohio Administrative Code, Title 3745, Chapter 599, Section 60, "Approved sampling and characterization procedures for the beneficial use of a beneficial use byproduct," Feb. 25, 2019, pp. 1-2.

Texas Administrative Code, Title 30, Part 1, Chapter 335, Subchapter R, Rule §335.509, "Waste Analysis," Nov. 15, 2001, pp. 1-2.

Texas Administrative Code, Title 30, Part 1, Chapter 335, Subchapter R, Rule §335.521, "Appendices," Nov. 15, 2001, pp. 1-4.

West Virginia Administrative Code, Title 33, Series 8, "Standards for Beneficial Use of Materials Similar to Sewage Sludge," Mar. 21, 2003, pp. 1-16.

Ohio Administrative Code, Title 3745, Chapter 599, Section 30, "Beneficial use—relationships among authorizing documents, rules, and the authority of the director and board of health," Mar. 31, 2017, p. 1.

North Dakota Administrative Code, Title 33, Article 24, Chapter 2, "Identification and Listing of Hazardous Waste," Jan. 1, 2016, pp. 1-295.

* cited by examiner

METHOD, SYSTEM AND PRODUCT OF ULTRASONIC CLEANING OF DRILL CUTTINGS

FIELD OF THE INVENTION

This invention relates to cleaning the byproducts resulting from the drilling process, and more particularly, to the use of ultrasonic vibrations with a cleaning solution of specific formulations to remove contaminants from drill cuttings to achieve solids meeting certain beneficial reuse regulated fill and/or clean fill standards.

BACKGROUND

Oil and gas wells are used around the world to harvest fuels such as petroleum, hydrocarbons, and natural gas entrained in subterranean formations. To reach these fuel sources, a well is drilled into the ground at a drilling rig site located at the surface. A wellbore is drilled into the earth from the rig. From the surface to about 7,500 to 8,000 ft, water and air-based drilling methods are used, since the rock in this section of earth tends to be more coarsely structured rock having a medium to large granular structure, such as schist, breccia, hornfels and conglomerate. The water table is also present in this initial depth range, so aquifers or pockets of water may be hit when drilling.

Further drilling to the 11,000 to 15,000 ft depth provides access to rock having a small to fine granular structure. Examples include limestone, sandstone, gneiss, siltstone, dolomite, shale and slate. Natural gas may be entrained in the rock within the strata and it is often desired to drill the well bore horizontally, or parallel to the surface, within the strata to maximize the surface area accessible for harvesting fuels. Accordingly, the wellbore will curve between the vertical and horizontal portions of the well bore, usually occurring between 8,000 and 11,000 ft below the surface.

The point where the wellbore begins to curve is known as the "kick-off point." The portion of the well bore between the surface and the kick-off point is referred to as "top hole." Drilling mud used in the top-hole section is made with water and other aqueous fluids. The portion of the wellbore located beyond the kick-off point is referred to as "bottom hole." Synthetic or diesel-based drilling muds are often used in bottom hole drilling. Drilling mud refers to the fluid used to aid in the drilling of well boreholes. They are used primarily to suspend and release drill cuttings, which are the rock and other solids cut away from the strata by the drill bit during the drilling process and assist in bringing the drill cuttings to the surface to remove them from the well and keep the wellbore clear of debris. Drilling mud also cools and lubricates the drill bit and assembly, manages and controls pressures in the wellbore, and maintains wellbore stability as excavation of rock occurs from drilling process.

Once removed from the well, the drilling mud (fluid) and suspended drill cuttings (solids) are separated. Mud shakers are employed to separate the solid drill cuttings from the drilling fluids. The drilling fluids are recycled back into the well for further use. The solid drill cuttings, however, are of no further use. Because they contain chemicals from the drilling process which are not safe for the environment, particularly in the quantities found in the drill solids, they cannot simply be discarded. For example, chlorides and diesel range organics (DROs) can be especially deleterious to the surrounding environment. As a result, drill cuttings are typically combined with solidification agents, such as cement, to encapsulate the drill cuttings which are then safe to be transported to and dumped in a landfill. However, the solidification and transportation of drill cuttings is costly and time-consuming since drilling rigs and production wells are often in remote locations and can produce thousands of pounds of drill cuttings. Similarly, the drill cuttings take up a large amount of space in the landfills. Where diesel-based muds are used, the diesel may be fired or baked off the drill cuttings. However, this method still leaves around 50% of the diesel in the cuttings, creating an environmental issue in disposal of the cuttings.

It would be beneficial to be able to clean the drill cuttings so they may be reused or repurposed, rather than having them take up precious space in landfills. Being able to clean the drill cuttings would also decrease costs spent on solidification and transportation, saving the well operating company thousands of dollars or more.

Some efforts have been made to treat drill cuttings from drilling mud. For instance, U.S. Pat. No. 8,025,152 to Vasshus, et al. is directed to an apparatus and method that uses a sieve and ultrasonic energy to separate solids and cuttings from drilling mud. The mud is dispersed on a continuous belt or screen that flows through a fluid bath. Ultrasonic transducers in the fluid bath generate ultrasonic vibrations to the fluid, with the fluid coupling the ultrasonic vibrations and the mud and solids. The ultrasonic energy separates the fluids from the solids. Airflow may subsequently be applied to the materials for additional cleaning. The use of ultrasonic energy to separate solid materials is also described in U.S. Pat. No. 3,489,679 to Davidson, et al. Detergents and other organic solvents have also been described in connection with cleaning drill cuttings in United States Patent Application Publication No. 2005/0236015 to Goel, et al. Such solvents are described in conjunction with a physical separation process in which the solvents are recaptured and recycled. Goel et al. also discusses the need for reducing the environmental impact of the solvent materials and cuttings. United States Patent Application Publication No. 2010/0186767 to Martin discloses the use of surfactants in combination with detergents to absorb oils from particles in cleaning drilling wastes such as drill cuttings and oil slops.

The above references address removing oil from the drill cuttings, but do not address removing other chemicals and contaminants that may be in the drill cuttings which would render them unsafe to be placed in landfill or reused. For instance, the references do not address removing metals and inorganics such as chlorides and sulfates, and volatile organic compounds (VOCs), all of which may contaminate surrounding areas if not removed from the drill cuttings. The Bureau of Waste Management of the Department of Environmental Protection (DEP) has established numerical quantitation limits (QL) for each of a variety of VOCs, inorganics materials and metals that delineate between whether a material can be classified as "clean fill," "regulated fill," or suitable for "beneficial use." "Clean fill" is defined as uncontaminated, non-water soluble, non-decomposable inert solid material, which includes rock and soil. "Regulated fill" is defined as soil rock, stone, dredged material that is separate and recognizable from other waste, and that has been affected by a spill or release of a regulated substance and the concentration of regulated substances exceeds the acceptable numerical quantitation limits. Regulated fill may be permitted for "beneficial use" if it is used for the same or substantially the same use or operations that generated the waste if it does not pose a threat of harm to the health, safety or welfare of people or the environment.

There remains a need for cleaning of drill cuttings and other solid waste from drill sites that would meet standards for at least beneficial use. If such standards can be met, the cleaned drill cuttings could be reused at drilling sites and the costs of transporting and storing drill cuttings in landfills, and the environmental impact thereon, could be alleviated.

SUMMARY

The present invention is directed to a method, system and cleaning solutions for the ultrasonic cleaning of drill cuttings and the resulting cleaned drill solids. The drill cuttings are collected from a drilling rig at a well site and characterized according to their liquid and solid composition of the drill cuttings, as well as the texture of the solids and size of the solid particulates. A cleaning solution formula that is 1% to 9% surfactant(s) and 2.5% to 3.5% viscosity agent(s) is then selected based on the characterization of drill cuttings. The cleaning solution may have any number and combination of surfactant(s) and viscosity agent(s), and the specific concentrations thereof may differ depending on the characterization of the drill cuttings. Drill cuttings are then treated with the selected cleaning solution by contacting with the selected cleaning solution, such as by being at least partially submerged in the cleaning solution, for a preselected treatment time. The treatment also includes simultaneous application of ultrasonic vibrations for a period of vibration time to the drill cuttings while in contact with the cleaning solution. The treatment compartment of the cleaning system may therefore hold the cleaning solution and drill cuttings during treatment and may further have ultrasonic sources mounted within the treatment compartment so that ultrasonic vibrations emanating therefrom are directed at the drill cuttings. Once the treatment and vibration time has elapsed, the cleaned drill solids are removed from the treatment compartment. Optional pre-treatment and post-treatment rinses may be included before and after the treatment to further facilitate the cleaning process.

This cleaning method is distinct from current post-drilling activity in that it cleans and removes the contaminants of the drilling process from the rock and other solids brought up out of a well, rather than encapsulating the solids as is current practice. This is a fundamental difference in approach and has not been done previously since many of the drilling constituents are difficult to remove, such as semi-volatiles, diesel range organics, chlorides, sulfates and heavy metals. Others have tried to clean drill cuttings and have failed because of the difficulty of removing these constituents to acceptable levels. The present invention provides a method of cleaning and removing contaminants of drill mud from drill solids sufficient to meet beneficial use standards, at least in Pennsylvania. Therefore, the drill solids cleaned by the present method and system may be reused at the well site, saving the cost of transporting them from the well site and disposal fees.

Another noted benefit is that the present cleaning method and system may be implemented at a well site in conjunction with drilling activity. There is no need to transport the raw drill cuttings offsite for encapsulation and disposal. Rather, they can be cleaned and rendered useful at the site without having to transfer anywhere. In addition, the system may run at the same speed as the rate of drilling at the rig, thus allowing for real-time cleaning of drill cuttings in tandem with drilling operations as they come out of the well. The invention also provides a way to adjust or change the cleaning solution to adapt to changes in the drill mud and/or drill cuttings characteristics as drilling progress and the well depth increases. None of these aspects have been seen previously.

DESCRIPTION OF THE DRAWINGS

Like reference numerals refer to like parts throughout the several views of the drawings.

DETAILED DESCRIPTION

As shown in the accompanying drawings, the present invention is directed to a method for cleaning drill solids, as at 100. The method 100 combines ultrasonic vibration with unique cleaning solutions that provides resulting treated drill solids that are at least clean enough to meet beneficial reuse standards and may also meet clean fill standards in certain areas.

Figure 1:
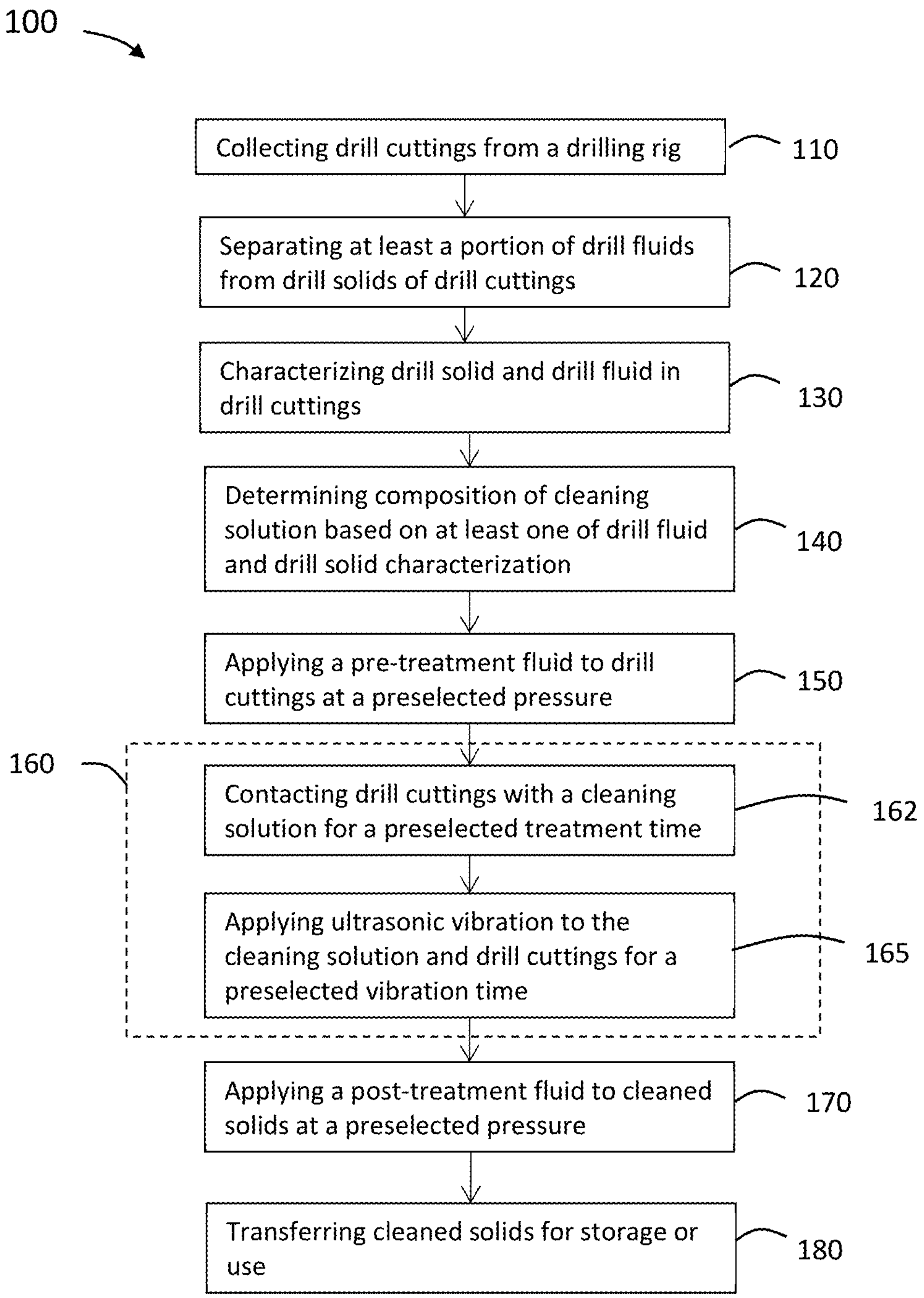
FIG. 1 is a schematic diagram of the method of the present invention.

As outlined in FIG. 1, the method 100 may begin with collecting drilling by-products from a drilling rig which includes a mixture of drill fluids and drill solids, as at 110. For instance, the drilling by-products are the drill cuttings coming up out of a well and which are collected by well personnel, and which may include a mixture of drill solids and fluids. As used herein, "drill fluids" means any liquid or gas being removed from a well at a drilling rig, which may include but is not limited to fluid components of the drilling mud. Accordingly, the terms "drill fluid," "drilling fluid" and "drilling mud" may be used interchangeably herein. Likewise, "drill solids" as used herein means any solid material being removed from a well at a drilling rig, including the solid portions or particles of the drill cuttings being removed from the surrounding strata as the drill creates the well.

The composition of drill cuttings may vary depending on whether the drilling is occurring top hole or bottom hole. For example, top hole drilling often uses water-based muds made of water mixed with bentonite clay, and may include other additives such as barite, chalk, hematite, soda ash, thickeners such as starch and xantham gum, deflocculants, fluid loss inhibitors, weighting agents, and lubricants. Top hole drilling results in drill solids of schist, breccia, hornfels, conglomerate types of rock, as these are present at the top-hole strata levels. These types of rock typically have medium to large granular structure.

Bottom hole drilling, on the other hand, uses oil-based, diesel-based or synthetic muds which provide the required viscosity and specific gravity to carry drill cuttings back to the surface from a lower depth. Such bottom hole muds also include any number of additives and chemicals, such as organic and inorganic chemicals like benzene and potassium chloride and may be volatile and/or include metals and heavy metals. In addition, lubricants, viscosity or density adjusting agents, and flocculent inhibitors may also be present in oil-based or synthetic muds. A smaller drill bit is typically used for bottom hole drilling, such as 8⅜" drill bit, producing smaller sized drill cuttings, such as ranging from ¼"-⅜". For comparison, this is the size of rock used in construction, roads, and French drains. Bottom hole drilling encounters shale, slate, limestone, sandstone, gneiss, and siltstone. These types of rock that exist at lower depths have a more uniform and generally finer structure than top hole rock.

Regardless of whether drilling is occurring at top or bottom hole, mud engineers at the well pad will monitor and control the system as drilling occurs, adjusting the composition of the drilling mud as needed based on the depth penetrated and the composition of the mixture being removed from the well. For instance, engineers may monitor the parts per million of various additives, flocculent, and percentage of drill cuttings in the exiting mud, and may vary the additives or other components to adjust the properties of the drilling mud accordingly.

Once the mixture from the well is collected, the method 100 may continue with separating at least a portion of the drill solids from the drill fluid, as at 120. For instance, solids control personnel at the well may initially separate the water or other fluids from the drill solids, such as by filtration, spinning the mixture to remove fluid by centrifugal force, or a combination thereof. A shaker, such as a mud shaker, shale shaker, oil well shaker or other similar device, may be used to separate fine particles suspended in fluid from larger solids, such as drill cuttings. The screen utilized in the shaker may have any size mesh. The screen may be planar or may be a 3D screen.

Vibration or oscillatory movement may be applied to the shaker bed to facilitate physical separation of the drill solids from drill fluids. In some embodiments, a comb device may be used to assist in separation of drill solids from drill fluids, such as by stirring the mixture to keep the screen unclogged. A comb or rake device may also be used to separate drill solids from one another, such as in dragging through a layer or mass of drill solids to spread them out, creating more space around each drill solid to increase the exposed surface area of the drill solid for later treatment. In some embodiments, the drill solids may be shaken, combed, or otherwise mechanically separated to a layer of ¼ inch to 1½ inch, and preferably a thickness of no more than 1 inch. The greater the surface area of the drill solids, such as by the greater the spread of drill solids from one another or thinner the layer, the better penetration the cleaning solution will have and the greater efficiency of cleaning may be obtained. These are but a few illustrative examples.

In some embodiments, separating drill solids from drill fluid, as at 120, includes a single technique, such as filtration or mechanical spreading described above. In other embodiments, separation can occur by any combination of techniques, and may occur in any order. For instance, filtration may occur initially to remove the majority of the drill fluids. A shaker may subsequently be used to further separate drill solids from other solids suspended in remaining drill fluid. The separated drill solids may then be physically or mechanically separated along an area by a spreading device to increase available surface area.

Even once the majority of the drill fluid is removed from the drill solids, there may still be some amount of drill fluid clinging to or absorbed within the drill solid. The compositions of the drill solids and the drill fluids therefore should be considered in determining how best to clean the drill solids. Therefore, in at least one embodiment, the method 100 includes characterizing at least one of the solid composition and fluid composition of the drill cuttings, as at 130. For instance, the percentage of drill fluid and drill solids to be treated may be determined. Mixtures having greater than 50% drill fluid content may be considered a "wet" mixture or "trending wet", such as a slurry. The terms "liquid" and "fluid" may be used interchangeably to refer to the non-solid component of the drill cuttings. Conversely, mixtures with less than 50% drill fluid content may be considered "dry" mixtures, or "trending dry," and may be a sludge, paste, or even mostly solid with moisture retained in the rock. The percentage of drill solids and fluids may be determined by visual inspection or may be quantified. It may also be determined at any point prior to treatment, such as after being removed from the well or drill rig, or after separating some of the drill solids, as at 120, by any of the steps discussed above.

The texture of the drill solids may also be assessed in determining the drill solid and fluid composition, as at 130. The texture may be the surface granularity or coarseness of the rock(s) and other materials in the drill solids, and may be determined based on visual inspection and/or knowledge of the type of rocks and materials present in an area or at a particular depth, such as if the site or bed has been dug before. The granularity of the drill solid may also be determined by a geology report from a core sampling performed in connection with preparing the well site. As used herein, "coarse" drill solids are those having granules that are visible to the naked eye, such as greater than 1 mm. For instance, medium to large granular structure corresponds to a coarse texture, such as that of #2 gravel. Examples of coarse drill solids include schist, breccia, hornfels and conglomerate and other rock that may be encountered in the top-hole portion of a well. Conversely, "fine" drill solids as used herein are those having granules that are not visible to the naked eye, such as less than 1 mm. Small to fine granular structure and textures, such as ⅛ inch to ¼ inch flake may correspond to fine texture. Examples of fine drill solids include limestone, sandstone, gneiss, siltstone, dolomite, shale, slate and other rock that may be found in the bottom-hole portion of a well. It should be appreciated that the texture of the solids is defined by its particulate surface structure, not the type of rock it comes from or includes.

Finally, the size of the drill solid particles may also be assessed in determining the drill solid and fluid composition, as at 130. The size of the particles may be a result of the size drill used for the drilling activity, or other reasons. Smaller sized particles will have greater surface area for the cleaning solution to contact, which will affect the cleaning action. In at least one embodiment, whether the drill solids are greater than or less than ½ inch in diameter may be one way to classify the size of the solids, though other threshold sizes are also contemplated and may be used.

Once the drill cuttings have been characterized, the method continues with determining the composition of cleaning solution based on the drill cutting characterization, as at 140. The cleaning solution is formulated to provide release of oils, organic and inorganic contaminants from the drill solids. These contaminants, if not removed, would render the drill solids unfit for reuse and require special disposal in landfills, and could create environmental hazards. These contaminants, however, have proven to be difficult to remove from drill cuttings, particularly chlorides, diesel range organics (DRO) such as petroleum, and heavy metals. The cleaning solution is formulated not only with these contaminants in mind, but also the mud chemistry of the drilling mud used in the drilling process, the viscosity of the drilling mud, and the type of rock and granularity thereof present in the drill solids.

Figure 2:
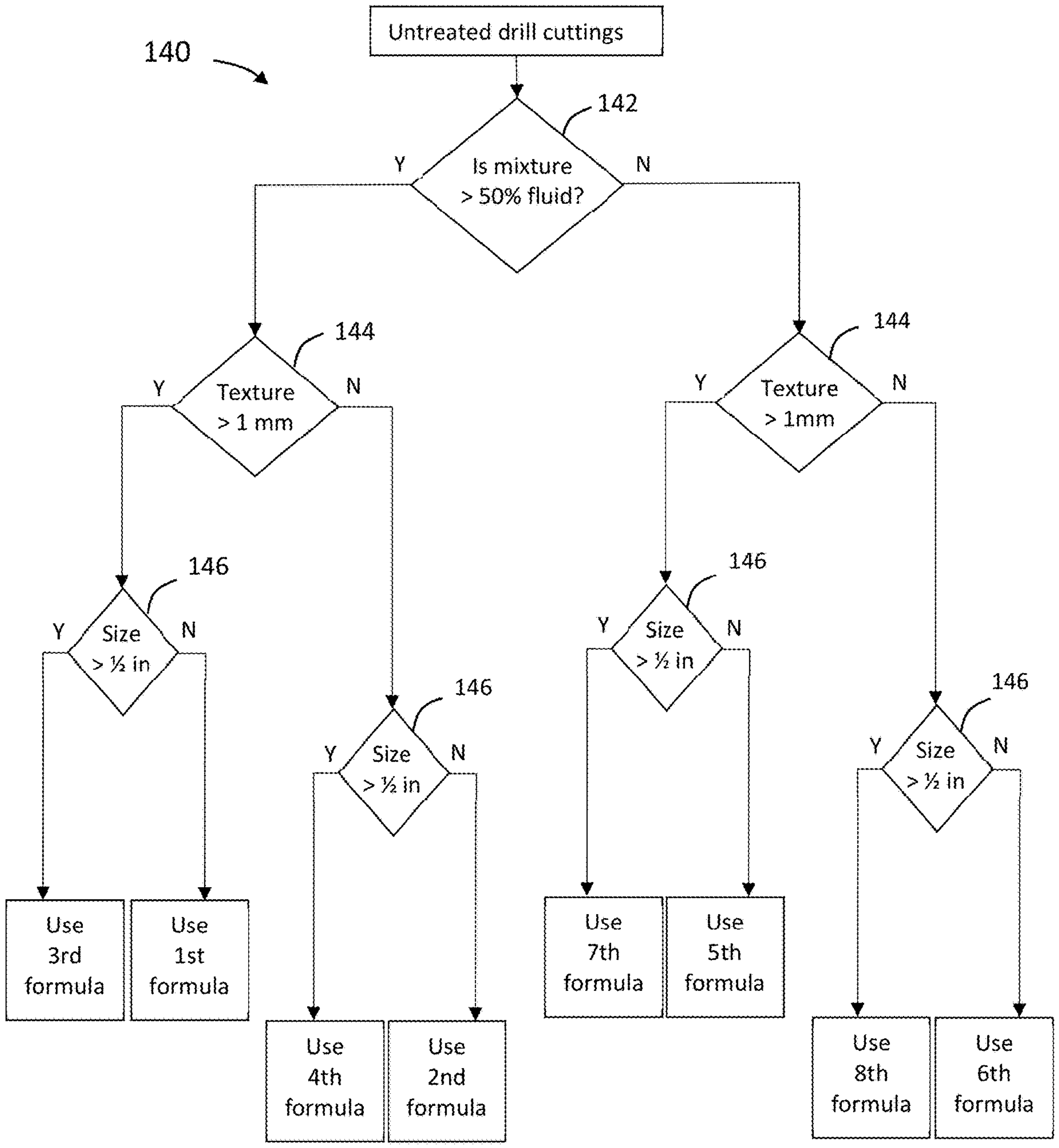
FIG. 2 is a schematic diagram of the decision tree used in characterizing the drill cuttings and selecting a composition of cleaning solution based on the characterization of drill cuttings.

The step of determining the cleaning solution composition, as at 140, involves following the decision tree shown in FIG. 2. This decision tree reflects the characterization process of the drill cuttings from step 130. For instance, determining the cleaning solution composition, as at 140, includes first determining whether the drill cuttings to be treated are greater than 50% fluid, as at 142. If yes, they are considered a wet mixture or slurry. If not, they are considered dry or sludge. The next step is assessing whether the texture of the drill solids is greater than 1 mm, as at 144. If yes, they are considered coarse as described above. If not, they are considered fine. Finally, the next step is determining whether the size of the particles of solids is greater than ½ inch in diameter, as at 146. If yes, then the solids are considered small as described above. If not, they are considered large. For drill cuttings that have a mix of textures or sizes, the composition of the cleaning solution should be based on the predominant texture or size from the drill cuttings. If possible, further separation of the solids based on size or texture prior to cleaning may be done to determine and use the most effective cleaning composition.

The end result of the decision tree of FIG. 2 is identifying which cleaning solution composition to use based on the characterization of the drill cuttings. Specifically, the decision tree will result in selection of one of eight formulas to use, the compositions of which are shown in Table 1.

TABLE 1

| Formula | Composition | Use for Drill Cuttings Characterized As |
|---|---|---|
| First | 1% surfactant(s)<br>2.5% viscosity agent(s) | >50% fluid<br>>1 mm texture<br><½ in size |
| Second | 5% surfactant(s)<br>2.5% viscosity agent(s) | >50% fluid<br><1 mm texture<br><½ in size |
| Third | 1% surfactant(s)<br>3.5% viscosity agent(s) | >50% fluid<br>>1 mm texture<br>>½ in size |
| Fourth | 5% surfactant(s)<br>3.5% viscosity agent(s) | >50% fluid<br><1 mm texture<br>>½ in size |
| Fifth | 5% surfactant(s)<br>2.5% viscosity agent(s) | <50% fluid<br>>1 mm texture<br><½ in size |
| Sixth | 9% surfactant(s)<br>2.5% viscosity agent(s) | <50% fluid<br><1 mm texture<br><½ in size |
| Seventh | 5% surfactant(s)<br>3.5% viscosity agent(s) | <50% fluid<br>>1 mm texture<br>>½ in size |
| Eighth | 9% surfactant(s)<br>3.5% viscosity agent(s) | <50% fluid<br><1 mm texture<br>>½ in size |

As can be seen from Table 1, the cleaning solution may include one or more surfactants. Surfactants break the surface tension of fluids to increase the release of contaminants from the drill solids. They may also be referred to as detergents. Any surfactant may be used in the cleaning solution, such as but not limited to a salt, oxide or ether of at least one fatty acid. Any fatty acid may be used as the underlying fatty acid from the which the surfactant is derived, such as lauric acid. For instance, in at least one embodiment, the surfactant(s) may be, but not limited to, sodium laureth sulfate, sodium lauryl sulfate, lauramine oxide, and PEG-8 propylheptyl ether (also known as PEG-8 laurate). The specific surfactant(s) chosen may be selected based on the specific drill mud composition, chemistry and type of rock, in addition to the characterizations described above. In at least one embodiment, lauramine oxide is preferred. In other embodiments, sodium lauryl sulfate is preferred. In still other embodiments, sodium laureth sulfate provides the best results. The cleaning solution may include any one or more surfactant in any combination or amounts ranging from 1% to 9% of the cleaning solution. In other embodiments, the cleaning solution may be up to 17% surfactant(s).

The cleaning solution may also include one or more viscosity agents. Viscosity agents increase the viscosity of the cleaning solution fluid and may allow the cleaning solution longer contact time with the drill solids during cleaning. Any viscosity agent(s) may be used in the cleaning solution, such as but not limited to glycols, ethylene polymers and copolymers. Any glycols or polymers may be used. For instance, in at least one embodiment, the viscosity agent(s) may be, but not limited to, PEI-14 PEG-10/PPG-7 copolymer, PPG-26 and PEG-8 propylheptyl ether (also known as PEG-8 laurate). The specific viscosity agent(s) chosen may be selected based on the specific drill mud composition, chemistry and type of rock, in addition to the characterizations described above. In at least one embodiment, PEI-14 PEG-10/PPG-7 copolymer is preferred as the viscosity agent. The cleaning solution may include any one or more viscosity agents in any combination or amount ranging from 2.5% to 3.5% of the cleaning solution. In other embodiments, the cleaning solution may be up to 6% viscosity agent(s).

The cleaning solution may include any combination of surfactant(s) and viscosity agent(s) for a total 3.5% to 12.5% solution. In certain embodiments, the cleaning solution is a 4.5% to 11.5% solution, and in at least one embodiment is a 10% solution of surfactant(s) and viscosity agent(s). In still other embodiments, however, the cleaning solution may be a 1.75% to 23% solution. Moreover, some cleaning agents may be both a surfactant and viscosity agent, such as but not limited to PEG-8 laurate and may therefore be counted as both a surfactant and viscosity agent for the purposes of determining the composition percentages. The cleaning solution described herein is an aqueous solution, the contents of which being dissolved in water. In addition, the cleaning solution preferably has a pH in the range of 5 to 7. The pH may be adjusted up or down once the cleaning solution is prepared through the use of acids, such as but not limited to citric acid, to lower the pH and bases, such as but not limited to agricultural lime, to raise the pH.

In some embodiments, the method 100 may also include adjusting the cleaning solution according to at least one of drill fluid and drill solid composition, as at 148. As the composition of the drill cuttings (including the solids and fluids coming from the well) changes during the drilling process, such as from encountering different types of rock and the adjustment of mud chemistry as the drilling progresses, the same composition of cleaning solution may not work as effectively for removing contaminants from the resulting drill cuttings. The cleaning solution composition, such as type of surfactant(s) or viscosity agent(s) and relative amounts thereof, may therefore be adjusted to suit the characteristics of the drill cuttings as they change. Adjusting the cleaning solution composition, as at 148, may occur at any point in the method 100 of cleaning. For instance, in at least one embodiment it may be performed in real-time as the drill cuttings move through a cleaning system, such as described hereinafter. This may be useful in embodiments in which the method of cleaning 100 is performed on a continuous basis, such as in connection with drilling operations. In other embodiments, adjusting the cleaning solution composition may occur between batches of drill cuttings, such as but not limited to between top hole and bottom hole drilling settings. Adjusting the cleaning solution composition may occur by incremental changes to the percentage of surfactant(s) and/or viscosity agent(s) in the cleaning solution along a continuous range. For instance, the percentage of individual components may be increased or decreased by 1/16-5%. In some embodiments, the percentage may be increased or decreased by ¼-1%. In still further embodiments, the percentage may be increased or decreased by ½%.

In some embodiments, the cleaning solution may consist of an initial starting solution that is 1% surfactant(s) and 0.5% viscosity agent(s), adjusted to a pH of 5-7 with agricultural lime to raise the pH or citric acid to lower the pH as necessary to meet the desired target range. As before, any particular surfactants or viscosity agents, and combinations thereof, may be used to make the starting solution. For instance, in at least one embodiment, the starting solution may be a mixture of 0.25% (0.32 oz.) sodium lauryl sulfate 0.25% (32 oz.) sodium laureth sulfate, 0.25% (32 oz.) lauramine oxide, 0.25% (32 oz.) PEG-8 propylheptyl ether and 0.25% (32 oz.) PPG-26 in 128 oz.

In water as a solvent. The various formulas on Table 1 may be achieved by beginning with this starting solution and adjusting the cleaning solution, as at 148, by adding surfactant(s) and viscosity agent(s) to reach the desired final cleaning composition based on the drill cutting characterization. This may be useful for the first cleanings at a well or to adjust the cleaning solution as the character of the drill cuttings change with increased well depth, becoming more wet or fine in texture for example, and thus requiring different cleaning solution composition over the course of drilling. Moreover, the same formula may be useful on different characterized drill cuttings. For instance, the second and fifth formulas have the same composition but may be used with differently characterized drill cuttings. Similarly, the fourth and seventh have the same composition but may be used with differently characterized drill cuttings.

Returning now to FIG. 1, in some embodiments, the method 100 may continue with applying a pre-treatment solution to drill solids at preselected pressure, as at 150. This is an optional step of the method 100 but may increase the efficiency of cleaning when employed. Application of the pre-treatment fluid mechanically spreads out the drill solids, further separating them and allowing increased exposed surface area for the cleaning solution to better access. It also removes some of material before treating, so there is less to remove by the cleaning treatment. A pre-treatment fluid, such as water or other aqueous solvent, is applied to the drill cuttings. Preferably, the pre-treatment fluid may be the same solvent as is used in the cleaning solution. However, in some embodiments, the pre-treatment fluid may be different from the cleaning solution solvent. In some embodiments, the pre-treatment fluid is a single component, such as water, though in other embodiments, the pre-treatment fluid is a solution of various components. The pre-treatment fluid may be polar or non-polar in nature. In one embodiment, the pre-treatment fluid is water. In another embodiment, the pre-treatment fluid has the same composition as the cleaning solution.

The pre-treatment fluid may be applied to the drill solids in a pressurized manner, such as at a preselected pressure. For instance, in at least one embodiment, the pre-treatment fluid is directed onto the drill solids at a pressure in the range of 15-120 psi. In some embodiments, the pre-treatment fluid is applied at a pressure in the range of 30-60 psi. In further embodiments, a pressure of 60 psi is used for application of the pre-treatment fluid to the drill solids. Applying the pre-treatment fluid, as at 150, occurs for a preselected pre-treatment time. For instance, in one embodiment, the pre-treatment time is 15-120 seconds. In other embodiments, the pre-treatment time is 30-120 seconds. In still other embodiments, the pre-treatment time is 15-30 seconds.

The pressure and/or time of applying the pre-treatment fluid, as at 150, may vary depending on the thickness of the drill cuttings as presented for cleaning. For instance, thicker layers of drill cuttings on a conveyor belt, or otherwise where less surface area of the drill solids are available, may require greater pressure or longer pre-treatment time for applying the pre-treatment fluid to achieve the same result. Similarly, thin layers of drill cuttings or where much of the surface area of the drill solids are already exposed, less pressure and time may be needed in the application of the pre-treatment fluid. For instance, in some embodiments a layer of drill solids measuring 0.1-1.5 inches may be subjected to the pre-treatment fluid. In some embodiments, the layer is 1 inch. Pre-treatment benefits may begin to decline when layers of drill solids exceed 1.5 inches in depth.

Applying the pre-treatment fluid, as at 150, may be accomplished using any suitable apparatus and configuration. For instance, the pre-treatment fluid may be directed onto the drill solids through nozzles, jets, valves, hoses, and other devices for transmitting fluids, which may be pressurized with pumps or like structure.

The method 100 continues with treating the drill cuttings, as at 160. This treatment step includes contacting the drill cuttings with the cleaning solution for a preselected treatment time, as at 162. The cleaning solution is as described above and includes 1% to 8% at least one surfactant and 2% to 3.25% at least one viscosity agent. The precise surfactant(s), viscosity agent(s), and amounts thereof will be preselected based on the characterization of the solid and fluid composition of the drill cuttings and selection of cleaning solution based thereon, as described above in connection with steps 130 and 140, respectively. The purpose of the cleaning solution is to dislodge "fines" and other particulate matter from the drill solids, as well as release oils, organic and inorganic contaminants from the drill solids, both at the surface and beneath the surface. "Contacting" as used herein means at least partially contacting the drill cuttings, and specifically the drill solids, with the selected cleaning solution. Therefore, in preferred embodiments, the entire surface area of each drill solids may be contacting cleaning solution, such as when the drill solids are submerged in cleaning solution. In other embodiments, however, contacting drill solids with the cleaning solution, as at 162, includes contacting less than the entire surface area of the drill solids with cleaning solution, such as only partially submerging the drill solids. If any cleaning solution is in contact with any part of a drill solid, contacting drill solids with the cleaning solution, as at 162, is occurring.

In some embodiments, contacting drill solids with the cleaning solution, as at 162, includes moving the drill cuttings through a bath containing the cleaning solution. The amount of time the drill cuttings spend in contact with the cleaning solution may depend on the speed of a conveyor belt or other transporter structure on which the drill cuttings are held as it passes through the cleaning solution. In such manner, treatment with the cleaning solution may occur in a continuous or discrete fashion, depending on the speed and operation of the transporter or conveyor belt. In other embodiments, contacting drill cuttings with the cleaning solution, as at 162, may include lowering a basket containing the drill cuttings into a bath of cleaning solution and removing it when treatment is complete. Such embodiments provide treatment with the cleaning solution in batches. Though described as lowering and raising a basket of drill cuttings, it should be appreciated that any receptacle may be used to hold or otherwise retain the drill cuttings during treatment, and such receptable may be moved into and out of the cleaning solution in any direction. Similarly, in certain embodiments the cleaning solution may be added to the holding receptacle for treatment then removed, such as by decanting or other action, when treatment is finished. All of these are examples of batch treatment under the current method 100.

Contacting the drill cuttings with the cleaning solution, as at 162, occurs for a preselected treatment time. The treatment time may be as long as needed to reach effective cleaning, which may be defined as sufficient to remove enough contaminants from the drill cuttings that the cleaned solids meet or exceed the beneficial use standards for regulated fill in at least one jurisdiction, as described in greater detail below. This may vary depending on the composition of the drill cuttings and the drill mud used in the drilling process that then becomes part of the drill cuttings removed from the well. The treatment time may be up to 20 minutes. For instance, in at least one embodiment the treatment time may be from 1 minute to 20 minutes. In certain embodiments, the treatment time may be 1 to 5 minutes, 5 to 10 minutes in other embodiments, and preferably 10 to 20 minutes in still other embodiments.

Treating the drill cuttings, as at 160, also includes applying ultrasonic vibrations to the cleaning solution and drill cuttings for a preselected vibration time, as at 165. Ultrasonic vibrations are applied to the cleaning solution while in contact with the drill solids, so that the ultrasonic vibrations propagate through the cleaning solution as a conduit to the drill solids. The ultrasonic vibrations and cleaning solution together break up and/or break loose the particulates and contaminants from the drill solids.

The ultrasonic vibration applied in step 165 may be any frequency or wavelength of vibrations in the ultrasonic range, such as from 20 kHz to 5 gigahertz. In some embodiments, the ultrasonic vibrations are in the range of 80-120 kilohertz. In other embodiments, the ultrasonic vibrations may be defined in terms of power usage of an ultrasound producing device and may further depend on the amount of cleaning solution present. For instance, in at least one embodiment, 30 watts of ultrasound per gallon of cleaning solution is applied at 180. Any type of machine or device capable of producing and emitting ultrasound is contemplated for use in the method 100. The greater the amount of cleaning solution present, the higher the ultrasound frequency or the longer duration may be needed to achieve a similar result, since ultrasound waves will dissipate as they propagate through the cleaning solution.

Applying ultrasonic vibration, as at 165, occurs for a preselected amount of vibration time. For instance, applying ultrasonic vibration to the cleaning solution and drill solids, as at 165, may occur for a vibration time of at least 20 seconds and up to 20 minutes. In some embodiments, it may occur for a range of 30 seconds-5 minutes. In some embodiments, it may occur for 1-5 minutes, or 1-4 minutes, or 1-3 minutes. In still other embodiments, it may occur for 5-10 minutes or 10-20 minutes. In at least one preferred embodiment, the vibration time may the same as the treatment time described above. Less vibration time may be needed when the drill cuttings have been pre-treated, as at 150. More time may be needed if pre-treatment as at 150 was not performed, or if the drill solids are layered or stacked such that less than their entire surface areas are exposed. The deeper the layer of drill solids, the more time may be needed for treatment with the cleaning solution and ultrasonic vibration. Further, applying ultrasonic vibration, as at 165, may occur discontinuously, such as pulses of ultrasonic vibration applied for distinct time intervals with periods of time between having no ultrasonic vibration, or they may occur continuously such that the amount of time that ultrasonic vibrations are provided is controlled by the amount of time the drill solids are present in the cleaning solution. For instance, the drill cuttings may be moved through the cleaning solution where ultrasonic vibration is being applied, and the time it takes to travel through the cleaning solution may control the treatment time and/or vibration time.

Treating the drill cuttings, as at 160, may occur at a preselected temperature. For instance, the temperature of the cleaning solution may be maintained in the range of at least 35 degrees Fahrenheit, and no more than the boiling point of any of the ingredients of the cleaning solution drill fluid or the melting point of any component of the drill solids. Such a temperature range maintains the integrity of the drill solids, drill fluids, and cleaning solution during treatment. In at least one embodiment, the temperature of the cleaning solution during treatment is in the range of 55° to 90° Fahrenheit.

In at least one embodiment, the method 100 may continue with an optional step of applying a post-treatment fluid to cleaned drill solids at preselected pressure, as at 170. This step may be a rinse of the drill solids following treatment with the cleaning solution and ultrasonic vibration, to ensure any particulates and contaminants broken loose during treatment are removed from the drill solids. As with the pre-treatment step 150, applying a post-treatment fluid as at 170 may increase the efficiency of the overall cleaning process. The post-treatment fluid may be the same fluid as the solvent of the cleaning solution and/or the pre-treatment fluid. For instance, in at least one embodiment the post-treatment fluid is water. In other embodiments, the post-treatment fluid is an aqueous fluid, which may be a solution, and may be polar or non-polar in nature. In some embodiments, the post-treatment fluid has the same composition as the cleaning solution.

Applying the post-treatment fluid, as at 170, may occur under similar conditions and parameters as described above for applying a pre-treatment fluid, as at 150. For instance, the post-treatment fluid may be applied directly onto the drill solids in a pressurized manner, such as in a range of 15-120 psi, and preferably 30-60 psi. Applying the post-treatment fluid occurs for a preselected post-treatment time, which may be the same or different from the pre-treatment time. For instance, the post-treatment fluid may be applied for 15-120 seconds, and in some embodiments, 15-30 seconds. As with pre-treatment, applying post-treatment fluid as at 170 may be accomplished using any suitable apparatus and configuration, such as spray nozzles, jets, valves, hoses, and other devices for transmitting fluids.

The method 100 may finish with transferring the treated or cleaned drill solids for use or storage, as at 180. As used herein, "treated" and "cleaned" may be used interchangeably to refer to drill solids that have been subjected to the method of the present invention to remove contaminants. Once cleaned, the treated drill solids may be collected and stored. In at least one embodiment, the treated drill solids may be used at the well site, either directly following cleaning with the method 100 or after a period of storage following cleaning. Treated drill solids may also be used in road construction, such as in the roadway connecting the well site to the surrounding local surface streets. The gravel and other materials for the well site roadway must often be transported to the site, and such roadways can be hundreds of feet long due to the remote location of well sites. Using drill cuttings to form or even supplement or repair the roadway to the well site could save thousands of dollars for a well project.

The method of cleaning drill cuttings 100 as described herein is capable of producing drill solids that are cleaned to a "beneficial use" standard according to at least one regulatory agency. As used herein, the terms "beneficial use" and "beneficial reuse" may be used interchangeably. For instance, the United States Environmental Protection Agency ("EPA"), the Pennsylvania Department of Environmental Protection Bureau of Waste Management ("PA DEP"), the West Virginia Department of Environmental Protection Division of Waste Management ("WV DEP"), all have "beneficial use" standards and criteria for meeting the same, each of which are incorporated by reference herein in their entireties. For instance, the PA DEP defines beneficial use as "use or reuse of residual waste or residual material derived from residual waste for commercial, industrial or governmental purposes, where the use does not harm or threaten public health, safety, welfare or the environment, or the use or reuse of processed municipal waste for any purpose, where the use does not harm or threaten public health, safety, welfare or the environment." PA DEP Bureau of Waste Management, Document No. 258-2182-773, incorporated herein by reference in its entirety. Materials meeting beneficial use standards can be used at the point of generation but cannot be transferred off-site. Therefore, materials from drilling operations that meet the beneficial use standard could be used at the wellsite, drill pad, and anywhere else licensed at the site.

Beneficial use is a type of regulated fill and may be permitted if environmental due diligence reveals evidence of a release of a regulated substance from the material and testing according to the PA Standard GP Testing, rev. 4.18.2018 from the Pennsylvania Department of Environmental Protection, incorporated herein by reference in its entirety. Specifically, the Option 2 therein entitled "Analyze for Total Constituent Concentration and Perform Leachability Evaluation (with Attenuating Soil)" permits beneficial use if the samples do not exceed the following limits, as determined by Toxicity Characteristic Leaching Procedure (TCLP) as described in EPA Method 1311:

| | |
|---|---|
| Aluminum | 190,000 mg/kg |
| Antimony | 88 mg/kg |
| Arsenic | 29 mg/kg |
| Barium | 15,000 mg/kg |
| Beryllium | 440 mg/kg |
| Boron | 20,000 mg/kg |
| Cadmium | 47 mg/kg |
| Chromium | 1000 mg/kg |
| Cobalt | 4,400 mg/kg |
| Copper | 1,500 mg/kg |
| Lead | 500 mg/kg |
| Manganese | 31,000 mg/kg |
| Mercury | 66 mg/kg |
| Molybdenum | 18 mg/kg |
| Nickel | 4,400 mg/kg |
| Selenium | 1,100 mg/kg |
| Silver | 1,100 mg/kg |
| Thallium | 15 mg/kg |
| Zinc | 66,000 mg/kg |
| 1,1-Dichloroethene | 6.4 mg/kg |
| cis-1,2-dichloroethene | 670 mg/kg |
| trans-1,2-dichloroethene | 1,300 mg/kg |
| 1,1,1-Trichloroethane | 750 mg/kg |
| 1,1,2-Trichloroethane | 20 mg/kg |
| 1,2-Dichloroethane | 12 mg/kg |
| 1,2-Dichloropropane | 31 mg/kg |
| 1,2,4-Trichlorobenzene | 340 mg/kg |
| 1,2,4-Trimethylbenzene | 110 mg/kg |
| 1,3,5-Trimethylbenzene | 110 mg/kg |
| 1,2-Dichlorobenzene | 260 mg/kg |
| 1,4-Dichlorobenzene | 210 mg/kg |
| 2,4-D | 200 mg/kg |
| 2,4-Dinitrotoluene | 58 mg/kg |
| 2,4,5-TP (Silvex) | 1,200 mg/kg |
| 2,4,5-Trichlorophenol | 12,000 mg/kg |
| 2,4,6-Trichlorophenol | 6,600 mg/kg |
| Atrazine | 46 mg/kg |

-continued

| | | |
|---|---|---|
| Benzene | 41 | mg/kg |
| Benzo(a)pyrene | 2.5 | mg/kg |
| Carbon Tetrachloride | 21 | mg/kg |
| Chlordane | 28 | mg/kg |
| Chlorobenzene | 490 | mg/kg |
| Chloroform | 6 | mg/kg |
| Cresol | 1,100 | mg/kg |
| Dalapon | 2,000 | mg/kg |
| Di(2-ethylhexyl) adipate | 10,000 | mg/kg |
| Dibromochloropropane | 3.8 | mg/kg |
| Dichloromethane (Methylene Chloride) | 680 | mg/kg |
| Dinoseb | 30 | mg/kg |
| Endrin | 13 | mg/kg |
| Ethylbenzene | 180 | mg/kg |
| Ethylene Dibromide (1,2-Dibromomethane) | 0.21 | mg/kg |
| Ethlyene Glycol | 10,000 | mg/kg |
| Heptachlor | 4 | mg/kg |
| Heptachlor Epoxide | 2 | mg/kg |
| Hexachlorobenzene | 0.15 | mg/kg |
| Hexachlorobutadiene | 44 | mg/kg |
| Hexachlorocyclopentadine | 66 | mg/kg |
| Hexachloroethane | 220 | mg/kg |
| Isopropylbenzene (Cumene) | 700 | mg/kg |
| Lindane (Gamma BHC) | 14 | mg/kg |
| m-Cresol (3-Methylphenol) | 440 | mg/kg |
| Methoxychlor | 15 | mg/kg |
| Methyl Ethyl Ketone (butanone, 2-) | 10,000 | mg/kg |
| Methyl-tert-butyl-ether (MTBE) | 620 | mg/kg |
| Naphthalene | 140 | mg/kg |
| Nitrobenzene | 110 | mg/kg |
| o-Cresol (methylphenol, 2-) | 1,200 | mg/kg |
| p-Cresol (4-Methylphenol) | 1,100 | mg/kg |
| PCBs | 2 | mg/kg |
| Pentachlorophenol | 150 | mg/kg |
| Pyridine | 33 | mg/kg |
| Styrene | 1,400 | mg/kg |
| Tetrachloroethene | 240 | mg/kg |
| Toluene | 350 | mg/kg |
| Toxophene | 16 | mg/kg |
| Trichloroethene | 190 | mg/kg |
| Vinyl Chloride | 12 | mg/kg |
| Xylenes | 310 | mg/kg |
| Chlorides (Leachable) | 250 | mg/l |
| Sulfates (Leachable) | 250 | mg/l |

Some jurisdictions are in the process of defining "beneficial use" standards for drill cuttings specifically. For instance, Pennsylvania has draft guidance on such standards titled "Draft Analytical Requirements for R&D Project" for drill cuttings. PA DEP, rev. 3.15.2018 ("PA Drill Cuttings"), which are also incorporated by reference herein in its entirety. These guidelines provide drill cuttings not exceed the following leachable levels of constituents, according to Synthetic Precipitation Leaching Procedure (SPLP) as described in EPA Method 1312, in order to be acceptable for reuse:

| Constituent | Leachable (mg/L)* |
|---|---|
| Aluminum | 0.1 |
| Antimony | 0.006 |
| Arsenic | 0.05 |
| Barium | 2 |
| Beryllium | 0.004 |
| Boron | 0.6 |
| Cadmium | 0.005 |
| Calcium | |
| Chromium | 0.1 |
| Cobalt | 0.73 |
| Copper | 1 |
| Lead | 0.015 |
| Lithium | |
| Magnesium | |
| Manganese | 0.1 |
| Mercury | 0.002 |
| Molybdenum | 0.175 |
| Nickel | 0.1 |
| Selenium | 0.05 |
| Silver | 0.1 |
| Strontium | |
| Thallium | 0.002 |
| Zinc | 2 |
| 1,1-Dichloroethene | 0.007 |
| cis-1,2-dichloroethene | 0.007 |
| trans-1,2-dichloroethene | 0.07 |
| 1,1,1-Trichloroethane | 0.2 |
| 1,1,2-Trichloroethane | 0.003 |
| 1,2-Dichloroethane | 0.005 |
| 1,2-Dichloropropane | 0.005 |
| 1,2,4-Trichlorobenzene | 0.07 |
| 1,2,4-Trimethylbenzene | 0.016 |
| 1,3,5-Trimethylbenzene | 0.016 |
| 1,2-Dichlorobenzene | 0.6 |
| 1,4-Dichlorobenzene | 0.075 |
| 2,4-D | 0.07 |
| 2,4-Dinitrotoluene | 0.0021 |
| 2,4,5-TP | 0.05 |
| 2,4,5-Trichlorophenol | 3.5 |
| 2,4,6-Trichlorophenol | 0.00318 |
| Atrazine | 0.003 |
| Benzene | 0.005 |
| Benzo(a)pyrene | 0.0002 |
| Carbon Tetrachloride | 0.005 |
| Chlordane | 0.002 |
| Chlorobenzene | 0.1 |
| Chloroform | 0.1 |
| Cresol | 0.18 |
| Dalapon | 0.2 |
| Di(2-ethylhexyl) adipate | 0.4 |
| Dibromochloropropane | 0.0002 |
| Dichloromethane | 0.005 |
| Dinoseb | 0.007 |
| Endrin | 0.002 |
| Ethylbenzene | 0.7 |
| Ethylene Dibromide | 0.00005 |
| Ethylene Glycol | 14 |
| Heptachlor | 0.0004 |
| Heptachlor Epoxide | 0.0002 |
| Hexachlorobenzene | 0.001 |
| Hexachlorobutadiene | 0.001 |
| Hexachlorocyclopentadiene | 0.05 |
| Hexachloroethane | 0.001 |
| Isopropylbenzene (Cumene) | 1.1 |
| Lindane | 0.0002 |
| m-Cresol | 1.75 |
| Methoxychlor | 0.0004 |
| Methyl Ethyl Ketone (butanone, 2-) | 2.8 |
| Methyl-tert-butyl ether (MTBE) | 0.02 |
| Naphthalene | 0.1 |
| Nitrobenzene | 0.018 |
| o-Cresol (methylphenol, 2-) | 1.75 |
| p-Cresol | 0.18 |
| PCBs 1 or 2 | |
| Pentachlorophenol | 0.001 |
| Pyridine | 0.0097 |
| Styrene | 0.1 |
| Tetrachloroethene | 0.005 |
| Toluene | 1.0 |
| Toxaphene | 0.002 |
| Trichloroethene | 0.005 |
| Vinyl Chloride | 0.002 |
| Xylenes | 10 |

| Constituent | Limit |
|---|---|
| Chlorides (Leachable) | 250 mg/L- |
| Sulfates (Leachable) | 250 mg/L- |
| Total Petroleum Hydrocarbons | |
| Paint Filter | |
| Percent Solids | |
| Sulfide (Total) | |
| Total Organic Halogens | |

-continued

| |
|---|
| Volatile Residue |
| Bromide |
| Solid pH |
| Cyanide |
| Fluoride |
| Gross Alpha/Beta |
| Rad 226/228 |
| Thorium |
| Uranium |

Other states may have slightly different definitions and methods of determining beneficial use of material. For instance, in West Virginia, the WV DEP defines beneficial use as "the use of a non-hazardous material for a specific beneficial purpose where it is done in a manner that protects groundwater and surface water quality, soil quality, air quality, human health, and the environment." Title 33-08 Legislative Rule, Department of Environmental Protection Division of Waste Management. In Table 1 of this Rule, the WV DEP provides the following maximum allowable concentrations of heavy metals in subject material, reproduced here as Table 4.

TABLE 4

| Metal | Maximum Permitted Concentration (mg/kg) |
|---|---|
| Arsenic | 20 |
| Cadmium | 39 |
| Chromium | 1000 |
| Copper | 1500 |
| Lead | 250 |
| Mercury | 10 |
| Molybdenum | 18 |
| Nickel | 200 |
| Selenium | 36 |
| Zinc | 2800 |

Texas defines it in the Texas Administrative Code, Title 30, Chapter 335.509 with testing parameters addressed in Chapter 335.521, which adopt those of the EPA. It provides maximum leachable concentrations of constituents in materials for beneficial use as reproduced in Table 5.

TABLE 5

| Compound | Concentration (mg/L) |
|---|---|
| Acenaphthene | 210 |
| Acetone | 400 |
| Acetonitrile | 20 |
| Acetophenone | 400 |
| Acrylamide | 0.08 |
| Acrylonitrile | 0.6 |
| Aniline | 60 |
| Anthracene | 1050 |
| Antimony | 1 |
| Arsenic | 1.8 |
| Barium | 100 |
| Benzene | 0.5 |
| Benzidine | 0.002 |
| Beryllium | 0.08 |
| Bis(2-chloroethyl)ether | 0.3 |
| Bis(2-ethylhexyl) phthalate | 30 |
| Bromodichloromethane | 0.3 |
| Bromomethane | 5 |
| Butylbenzyl phthalate | 700 |
| Cadmium | 0.5 |
| Carbon disulfide | 400 |
| Carbon tetrachlo ride | 0.5 |

TABLE 5-continued

| Compound | Concentration (mg/L) |
|---|---|
| Chlordane | 0.03 |
| Chlorobenzene | 70 |
| Chloroform | 6 |
| Chloro-m-cresol, p | 7000 |
| 2-Chlorophenol | 20 |
| Chromium | 5 |
| m-Cresol | 200.0 |
| o-Cresol | 200.0 |
| p-Cresol | 200.0 |
| DDD | 1 |
| DDE | 1 |
| DDT | 1 |
| Dibutyl phthalate | 400 |
| 1,4-Dichlorobenzene | 7.5 |
| 3,3-Dichlorobenzidine | 0.8 |
| 1,2-Dichloroethane | 0.5 |
| Dichlorodifluoromethane | 700 |
| 1,1-Dichloroethylene | 0.6 |
| 1,3-Dichloropropene | 1 |
| 2,4-Dichlorophenol | 10 |
| 2,4-Dichlorophenoxyacetic acid (2,4-D) | 10 |
| Dieldrin | 0.02 |
| Diethyl phthalate | 3000 |
| Dimethoate | 70 |
| 2,4-Dimethylphenol | 70 |
| 2,6-Dimethylphenol | 21 |
| m-Dinitrobenzene | 0.4 |
| 2,4-Dinitrophenol | 7 |
| 2,4-Dinitrotoluene (and 2,6-, mixture) | 0.13 |
| Dinoseb | 3.5 |
| 1,4-Dioxane | 30 |
| Dioxins (Poly chlorinated dibenzo-p-dioxins) | |
| 2,3,7,B-TCDD | 0.005 |
| 1,2,3,7,8-PeCDD | 0.01 |
| 1,2,3,4,7,8-HxCDD | 0.05 |
| 1,2,3,6,7,8-HxCDD | 0.05 |
| 1,2,3,7,8,9-HxCDD | 0.05 |
| Diphenylamine | 90 |
| 1,2-Diphenylhydrazine | 0.4 |
| Disulfoton | 0.1 |
| Endosulfan | 0.2 |
| Endrin | 0.02 |
| 2-Ethoxyethanol | 1400 |
| Ethylbenzene | 400 |
| Ethylene dibromide | 0.004 |
| Ethylene Glycol | 7000 |
| Fluoranthene | 140 |
| Fluorene | 140 |
| Furans (Polychlorinated dibenzo furans) | |
| 2,3,7,8-TCDF | 0.05 |
| 1,2,3,7,8-PeCDF | 0.1 |
| 2,3,4,7,8-PeCDF | 0.01 |
| 1,2,3,4,7,8-HxCDF | 0.05 |
| 1,2,3,6,7,8-HxCDF | 0.05 |
| 1,2,3,7,8,9-HxCDF | 0.05 |
| Heptachlor (and its hydroxide) | 0.008 |
| Heptachlor epoxide | 0.04 |
| Hexachlorobenzene | 0.13 |
| Hexachloro-1,3-butadiene | 0.4 |
| Hexachlorocyclopentadiene | 20 |
| Hexachloroethane | 3 |
| Hexachlorophene | 1 |
| Isobutyl alcohol | 1000 |
| Isophorone | 90 |
| Lead | 1.5 |
| Lindane | 0.3 |
| Mercury | 0.2 |
| Methacrylonitrile | 0.4 |
| Methornyl | 90 |
| Methoxychlor | 10 |

TABLE 5-continued

| Compound | Concentration (mg/L) |
|---|---|
| 2-Methoxyethanol | 14.0 |
| Methyl ethyl ketone | 200.0 |
| Methyl isobutyl ketone | 200 |
| Methylene chloride | 50 |
| Methyl parathion | 0.9 |
| Mirex | 0.7 |
| Nickel | 70 |
| Nitrobenzene | 2 |
| N-Nitroso-di-n-butylarnine | 0.06 |
| N-Nitrosodiphenylamine | 70 |
| N-Nitrosomethylethylamine | 0.02 |
| N-Nitroso-n-propylarnine | 0.05 |
| N-Nitrosopyrrolidine | 0.2 |
| p-Phenylene diamine | 20 |
| Parathion | 20 |
| Pentachlorobenzene | 3 |
| Pentachloronitrobenzene | 10 |
| Pentachlorophenol | 100 |
| Phenol | 2000 |
| Pronamide | 300 |
| Pyrene | 5.9 |
| Pyridine | 4 |
| Selenium | 1 |
| Silver | 5 |
| Styrene | 700 |
| 1,1,1,2-Tetrachloroethane | 10 |
| 1,1,2,2-Tetrachloroethane | 2 |
| Tetrachloroethylene | 0.7 |
| 2,3,4,6-Tetrachlorophenol | 100 |
| Toluene | 1000 |
| Toxaphene | 0.3 |
| trans-1,3-Dichloropropene | 1 |
| Tribromomethane (Bromoform) | 70 |
| 1,2,4-Trichlorobenzene | 70 |
| 1,1,1-Trichloroethane | 300 |
| Trichloroethylene | 0.5 |
| 1,1,2-Trichloroethane | 6 |
| Trichlorofluoromethane | 1000 |
| 2,4,5-Trichlorophenoxypropionic acid (2,4,5 TP or Silvex) | 1 |
| 1,2,3-Trichloropropane | 20 |
| 2,4,5-Trichlorophenol | 400 |
| 2,4,6-Trichlorophenol | 2 |
| Vanadium Pentoxide | 30 |
| Vinyl chloride | 0.2 |
| Xylenes (all isomers) | 7000 |

North Dakota addresses beneficial use and drill cuttings in State Guidelines 38 and 42, with further details in Chapters 33-20-01 and 33-24-02 but no testing parameters are provided. Similarly, Ohio does not mention testing parameters or drill cuttings specifically but addresses beneficial use generally in Ohio Administrative Code 3745-599, waste characterization in Code 3745-599-30, sampling and characterization in Code 3745-599-60 and analysis and disposal of material in Ohio Title 15, Section 1509.074. It also indicates Ohio may also follow the EPA standards. The contents of the above standards are incorporated by reference herein in their entireties.

In some embodiments, the present method 100 may be capable of producing drill solids that are cleaned to a "clean fill" standard. In Pennsylvania, for instance, "clean fill" is defined as "uncontaminated, nonwater-soluble, nondecomposable inert solid material. The term includes soil, rock, stone, dredged material, used asphalt, and brick, block or concrete from construction and demolition activities that is separate from other waste and recognizable as such." PA DEP Bureau of Waste Management, Document No. 258-2182-773. Materials meeting clean fill standards are of the highest level of cleanliness and can be used sold in the commercial market as a commodity product for use off-site. Though Pennsylvania does not currently permit use of drill cuttings as clean fill since they have, at some point, come into contact with contaminants, the regulations in other jurisdictions may not be so restrictive. Depending on the jurisdiction and their requirements, the present method 100 may be capable of cleaning to clean fill standards in those jurisdictions as well.

Further, chlorides and diesel-ranged organics (DRO) are considered particularly dangerous by PA DEP standards and are known to be difficult to remove. The method 100 of the present invention has been demonstrated to reduce many contaminants from the drilling process, as demonstrated in the Examples hereinafter, but has also been demonstrated to reduce chlorides and DROs (see Examples 4-6 and FIGS. 3A-10). It has also been shown to sufficiently clean drill solids to meet the PA Drill Cuttings draft standards for beneficial use in Pennsylvania, as well as beneficial use standards for waste in other jurisdictions where drilling occurs (see Example 7).

The method 100 described herein can be used on materials exiting an active drilling rig, to clean the materials to acceptable levels as soon as it is generated. The cleaned material can then be ground and placed in landfills or other subterranean levels with no hazard to the environment. If meeting the beneficial use standard, the cleaned drill solids may be reused at the drill site, such as in forming the roadway leading to the site, the well pad, or other construction applications at the site. If meeting the clean fill standard, the cleaned drill solids may be sold to companies for use in construction jobs elsewhere, such as road construction, French drain formation, fill for other projects. In other embodiments, it is contemplated the method 100 can be used for reclamation of contaminated materials already in landfills. Such contaminated material may be ground to particles of a size and/or shape similar to drill cuttings and may be subjected to the cleaning method 100 to clean the material and remove contaminants.

The present invention is also directed to a system 200 for cleaning drill cuttings, such as by the method 100 described above. The method 100 above can be performed using any suitable system or apparatus, and the various embodiments of the system 200 described here are provided as non-limiting examples.

Figure 11:
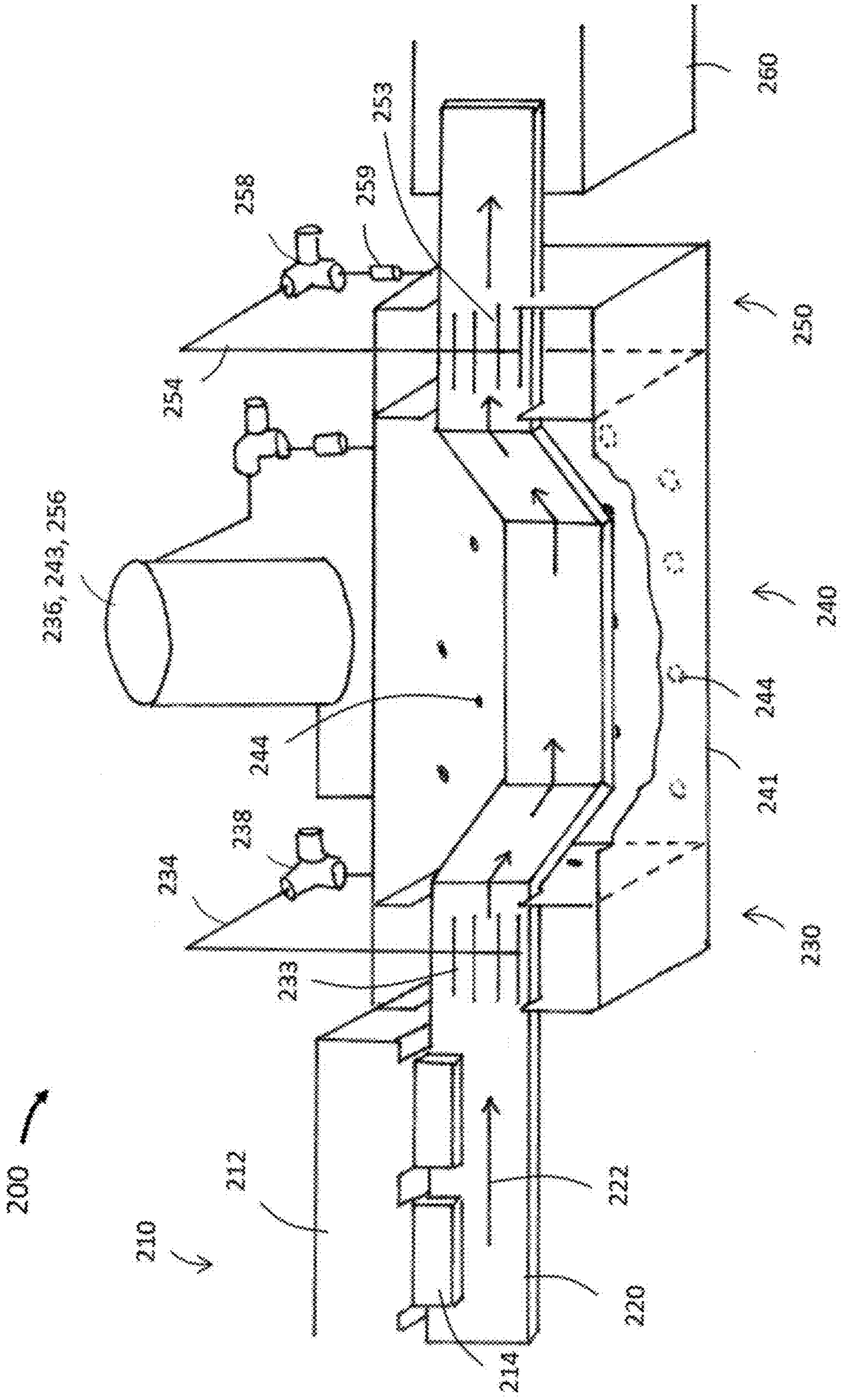
FIG. 11 is a schematic illustration of an isometric view one embodiment of the system of the present invention.
Figure 12:
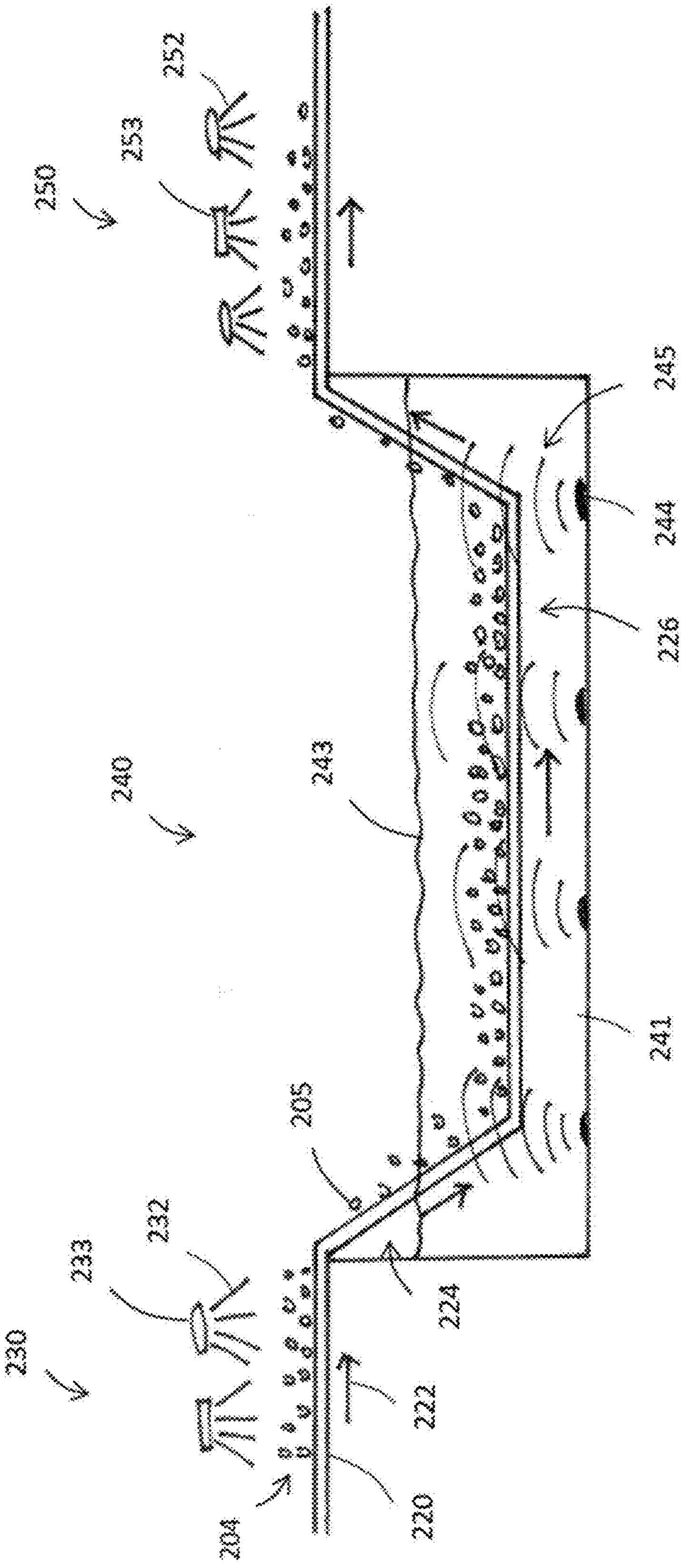
FIG. 12 is schematic illustration of a front elevation of the pre-treatment, treatment, and post-treatment zones of the system of FIG. 11.

As shown in FIGS. 11 and 12, the system 200 includes a separator 210 configured to receive drill cuttings 204 (a mixture of drill solids 205 and drill fluid, such as drill mud) from the drill rig and facilitate physical separation of the drill solids 205 from the drill fluid. In some embodiments, the drill cuttings 204 are directed into the separator 210 immediately upon surfacing and exiting the drill rig. In other embodiments, the drill cuttings 204 are first processed before entering the separator 210. The separator 210 may be any apparatus that permits or facilitates the physical separation of the drill solids 205 from drill fluids of the mixture and may be any size and operate under any appropriate operative parameters to contribute to the separation. For instance, in some embodiments the separator 210 is a centrifuge or other similar apparatus that separates the drill solids 205 from drill fluid by spinning the drill fluid away by centrifugal force. In other embodiments, as in FIG. 12, the separator 210 is a shaker such as a mud shaker, shale shaker, or other similar apparatus having a hopper 212 to receive the mixture and a screen(s) to filter out the drill solids 205 from the drill fluids. The screen may be of a planar configuration or three-dimensional configuration, and may filter by gravity, rotation, pressurized force, or any filtration method or combinations thereof. The drill fluid may run off into a fluid collector for further processing. The separator 210 may also have a protrusion(s) 214 extending from the hopper 212 over which the drill solids 205 may be moved and/or fall past the edge of into a drill solids collector or onto a transport system, described below.

The separator 210 may also include a vibrator configured to generate mechanical vibrations. The vibrator may be secured to, integral with, or connected to the separator 210 to transmit the vibrations to the structure of the separator 210. These vibrations are different from the ultrasonic vibrations discussed previously, and here are meant to assist in the shaking and separating of untreated drill cuttings 204. In certain embodiments, the separator 210 may include a rake or similar structure having a plurality of fingers that are pulled through the drill cuttings 204 to separate the drill solids 205 and create a layer of drill solids of a predetermined depth, such as between ¼ and 1½ inch.

The system 200 also includes at least one transporter 220 that moves relative to the remaining components of the system 200 and carries the drill cuttings 204 and drill solids 205 through the system 200 in direction 222 for processing according to the method 100 described above. The transporter 220 may therefore span the entire system 200 and its various components. In certain embodiments, however, the transporter 220 may span at least the length of the treatment compartment discussed below. In at least one embodiment, as shown in FIGS. 11 and 12, the transporter 220 may be a conveyor belt or other similar structure that moves along a closed track or loop to move materials from one location to another and may have any dimension that permits the movement of material from drill rigs. In at least one embodiment, the transporter 220 receives drill cuttings 204 directly from the drill rig and moves them into the system 200 for treatment according to the method 100. The transporter 220 may move at any speed or rate, and in at least one embodiment moves with a speed sufficient to clear the drill cuttings 204 from the separator 210 to make room for further drill cuttings 204 to be introduced to the separator 210. In at least one embodiment, the transporter 220 moves at a speed comparable to the drill rate of the rig, such as 30 ft/hr for example, to allow for cleaning treatment on a continuous basis consistent with that of the operation of the drilling rig. In other embodiments, the transporter 220 may move faster than the drill rate of the rig, such as 1 ft/min. Multiple transporters 220 may be used in the system 200 to handle a high volume of drill cuttings 204, such as from a high drilling rate, while still permitting sufficient treatment time. The transporter 220 may move continuously or may be stopped and started, which can be programmed or controlled manually at the site.

The separator 210 and transporter 220 may cooperate in some embodiments to control the depth and/or spacing of drill cuttings 204 and/or drill solids 205 on the transporter 220. For instance, the protrusions 214 of the separator 210 may permit, in conjunction with a pump, vibrator, arms, screws or other mechanical device for pushing, the drill solids 205 onto the transporter 220 over a defined time period to space apart the drill solids 205 from one another. In other embodiments, a rake or similar structure of the separator 210 may interact with drill solids 205 once on the transporter 220 to separate and space apart the drill solids 205 from one another, to keep the layer of drill solids 205 from exceeding a certain limit, such as 1½ inches.

The transporter 220 may have a smooth surface or may have friction elements such as treads, ridges, grooves or other similar structure to facilitate the retention of the drill solids 205 on the transporter 220 during movement. In addition, the transporter 220 may move along a path through the rest of the system 200, which may be linear, angled, curved, and combinations thereof. For instance, the transporter 220 may include an inclined portion 224 along at least a portion thereof, such as to raise or lower the drill solids 205 into and out of contact with the cleaning solution 243. The transporter 220 may also include a flat portion 226 along at least a portion thereof that is substantially parallel to the surface supporting the system 200.

In some embodiments, the system 200 may also include a pre-treatment zone 230. The transporter 220 may move the drill cuttings 204 into and through the pre-treatment zone 230 as part of the cleaning method 100 described herein. The pre-treatment zone 230 is where the pre-treatment fluid 232 is applied to and contacts the drill cuttings 204, as depicted in FIG. 12. The pre-treatment fluid 232 may be any suitable fluid and is an aqueous solvent in at least one embodiment. The pre-treatment fluid 232 may be the same fluid as the solvent of the cleaning solution 243 and may even be the same as the cleaning solution 243 in some embodiments. In at least one embodiment, the pre-treatment fluid 232 is water.

The pre-treatment zone 230 includes at least one pre-treatment fluid dispenser 233, which provides the pre-treatment fluid 232 to the drill solids 205. In at least one embodiment, the pre-treatment fluid dispensers 233 are nozzles, and may be spray nozzles that eject the pre-treatment fluid 232 in a pressurized jet, such as at a pressure of 30-60 psi, or up to 120 psi. Other examples of pressures are provided above in describing the method 100. The pre-treatment fluid dispensers 233 may also provide the pre-treatment fluid 232 as a mist or a stream, which may fall on the drill solids 205 by gravity.

Any number of pre-treatment fluid dispensers 233 may be included in the pre-treatment zone 230 of the system 200. For instance, in some embodiments the system 200 may include up to 20 pre-treatment fluid dispensers 233. In some embodiments, the system 200 may include up to 12 pre-treatment fluid dispensers 233. The pre-treatment fluid dispensers 233 may have any shape, such as but not limited to circular, triangular, wedge-shaped, linear, curvilinear, and may be arranged in any configuration so as to provide pre-treatment fluid 232 in any shape, such as but not limited to a jet, stream, linear curtain, diamond pattern, offset pattern, and others. The pre-treatment fluid dispensers 233 may be arranged in a line or a series of parallel lines, such as along arms shown in FIG. 12, to provide multiple successive streams of pre-treatment fluid 233 to the drill solids 205 as they pass thereby. In at least one embodiment, the various pre-treatment fluid dispensers 233 are arranged to span the entire width of the transporter 220, to enable contact of the pre-treatment fluid 232 with the drill solids 205 wherever they are positioned along the transporter 220.

The pre-treatment fluid dispensers 233 are positioned a spaced apart distance from the transporter 220, and may be positioned above, below, laterally beside, in front of, behind, or at an angle from the transporter 220, and therefore from the drill cuttings 204 carried thereon. The distance between the pre-treatment fluid dispensers 233 and transporter 220 may be selectively changed during or between operation of the pre-treatment fluid dispensers 233. Changing the spacing may occur manually or in an automated fashion. Similarly, the configuration and orientation of the pre-treatment fluid dispensers 233 in relation to the transporter 220 and/or the drill cuttings 204 may be adjusted during or between operation of the pre-treatment fluid dispensers 233 and may be manual or automated. Indeed, the operation of the pre-treatment fluid dispensers 233 may be manual or automated and may be programmable. Each of the pre-treatment fluid dispensers 233 may operate independently of the other pre-treatment fluid dispensers 233, such that different patterns of pre-treatment fluid 232 application to the drill solids 205 can be achieved. In other embodiments, at least some of the pre-treatment fluid dispensers 233 are operably connected to provide pre-treatment fluid 232 in concert with one another. Different groupings of pre-treatment fluid dispensers 233 may operate independently of other groupings of pre-treatment fluid dispensers 233. The pre-treatment fluid dispensers 233 may operate continuously to provide a constant stream of pre-treatment fluid 232, or may be operated in discrete time intervals, such as for 15 seconds at a time or other time intervals discussed above with the method 100, for pulsed application of pre-treatment fluid 232.

The system 200 also includes a treatment zone 240, such as shown in FIGS. 11 and 12. The treatment zone 240 includes a treatment compartment 241, such as a tank or other receptacle, configured to receive and retain the cleaning solution 243 therein for contact with and cleaning of the drill cuttings 204. Accordingly, the treatment compartment 241 is also configured to receive the drill solids 205 as well for cleaning treatment. The cleaning solution 243 may be any combination and amounts of ingredients described above in connection with discussing the method 100 of the present invention and may include at least one surfactant and/or at least one viscosity agent as previously described. The particular composition of the cleaning solution 243, which includes both ingredients and amounts thereof, is determined prior to the introduction of drill cuttings 204 into the cleaning solution 243, such as prior to performing the treatment step of the method 100 described above. In some embodiments, the composition of the cleaning solution 243 may be adjusted during treatment, while the drill solids 205 are in contact with the cleaning solution 243, such as to accommodate changes in cleaning solution composition and/or chemistry as may occur as the components of the cleaning solution 243 interact with contaminants in or on the drill solids 205, such as by way of chemical reaction, and molecular or atomic interactive forces, by way of example. For instance, the cleaning solution 243 may be adjusted during treatment to replace reacted surfactant and/or viscosity agent, or other ingredients of the cleaning solution 243, to maintain the level of solutes in the cleaning solution 243 to a predetermined level according to their formula. Adjusting the composition of the cleaning solution 243 may also be done as needed, such as between batches of drill cuttings 204 or in response to drilling changes affecting the characteristics of the drill cuttings 204, as described above.

In at least one embodiment, the transporter 220 carries the drill solids 205 positioned thereon into and through the treatment compartment 241, as shown in FIG. 12. In some embodiments, the transporter 220 carries the drill solids 205 from a pre-treatment zone 230 into the treatment zone 240. As depicted in FIGS. 11 and 12, the transporter 220 may be inclined along a portion of its length to lower into the treatment compartment 241 and cleaning solution 243, to bring the drill solids 205 in contact with the cleaning solution 243 for treatment. The incline of the transporter 220 may be any angle to transition between the height of the pre-treatment zone 230 or separator 210 and the cleaning solution 243 of the treatment zone 240 and still permit retention of the drill solids 205 on the transporter 220, and may be any angle between 0-180 degrees. In at least one embodiment, the angle of incline may be in the range of 20-75 degrees. In one embodiment, the angle of incline may be 45 degrees.

As shown in FIGS. 11 and 12, the treatment compartment 241 may be defined by at least one wall and may further include a floor. The treatment zone 240 further includes at least one ultrasound source 244 positioned within the treatment compartment 241 in transmitting relation of ultrasonic vibrations 245 produced therefrom to the cleaning solution 243. The ultrasound source(s) 244 may be any device capable of generating ultrasonic frequencies or vibration, such as an ultrasonic transducer. The ultrasound source(s) 244 may be positioned anywhere within the treatment compartment 241, such as along the wall(s) or floor thereof, and in any configuration. In at least one embodiment, the ultrasound sources 244 are spaced a predetermined distance apart from the drill solids 205, such as by being spaced apart from the transporter 220 which carries the drill solids 205 through the treatment compartment 241. In at least one embodiment, the treatment compartment 241 includes up to 20 ultrasound source(s) 244, although any number of ultrasound source(s) 244 are possible. The ultrasound source(s) 244 may be arranged in any configuration within the treatment zone 240 and are disposed so that the ultrasonic vibrations 245 emanating therefrom are directed toward the drill solids 205. For instance, in some embodiments, the ultrasound source(s) 244 are arranged evenly spaced apart from one another by a common, predetermined distance, such as but not limited to 1 inch to 10 feet. In at least one embodiment, the ultrasound source(s) 244 are arranged in a zig-zag pattern within the floor of the treatment compartment 241, as shown in FIG. 11. In other embodiments, the ultrasound source(s) 244 are arranged along the floor and walls equidistantly from the transporter 220. These are but a few non-limiting examples.

The ultrasonic vibrations 245 produced by the ultrasound source(s) 244 may be of any frequency or wavelength within the ultrasonic range and may be of any power level used to generate ultrasonic waves. The ultrasound source(s) 244 may be activated for a preselected vibration time as described previously, such as for a period of 1-30 minutes or up to 3 hours in some embodiments. In certain embodiments, the ultrasound source(s) 244 are activated for 15 minutes. During the vibration time, the ultrasound source(s) 244 produce ultrasonic vibrations 245, which may be continuous or pulsed. These ultrasonic vibrations 245 propagate through the cleaning solution 243 and contact the drill solids 205 when they are contacting the cleaning solution 243. Accordingly, the cleaning solution 243 not only provides cleaning power on its own, but also serves as a conduit for transmission of ultrasonic vibrations 245. These ultrasonic vibrations 245 contact the drill solids 205, causing them to shake and vibrate. This action facilitates the shaking loose of contaminants, dirt and debris from the drill solids 205, and creates temporary spacing changes in the pores that allows the cleaning solution 243 to better penetrate the drill solids 205 for more effective cleaning. The ultrasonic vibrations 245 also disrupt lipophilic membranes that may form among oily, greasy or non-aqueous contaminants, such as oils and organic substances often found in drilling settings. By disrupting these membranes, the ultrasonic vibrations 245 assist in breaking up the contaminants and allowing the cleaning solution 243 to penetrate the contaminants, which may be coating the surfaces of the drill solids 205 and may also assist the surfactants of the cleaning solution 243 to bind or segregate the lipophilic materials for removal from the drill solids 205.

The system 200 may also include a post-treatment zone 250 in some embodiments. In the post-treatment zone 250, post-treatment fluid 252 is applied to the treated drill solids 205 to rinse the treated drill solids 205 and remove remnant contaminants that may be lingering after cleaning. As with the pre-treatment zone 230, the post-treatment zone 250 is optional. The transporter 220 carries the now cleaned drill solids 205 to and through the post-treatment zone 250, which may be at the same or different level as the treatment zone 240. The post-treatment zone 250 includes a plurality of post-treatment fluid dispensers 253 configured to provide post-treatment fluid 252 to the drill solids 205 and may be any of the configurations and types described above in connection with the pre-treatment fluid dispensers 233, including post-treatment fluid supply lines 254. The post-treatment fluid dispensers 253 may be the same or different than the pre-treatment fluid dispensers 233. The post-treatment fluid 252, like the pre-treatment fluid 232, may be the solvent of the cleaning solution or the same as the cleaning solution, and may further have the same or different composition as the pre-treatment fluid 232. Accordingly, the post-treatment fluid supply 256 may be the same as the pre-treatment fluid supply 236 and cleaning solution solvent, as in FIG. 11, or may be different therefrom. The system 200 may also include any number of pumps 258 and filters 259, as shown in FIG. 11, for moving the pre-treatment fluid supply 236, post-treatment fluid supply 256, and cleaning solution and/or solvent.

The system 200 may also include a collection area 260, as shown in FIG. 11. The collection area 260 is configured to receive the treated drill solids 205, which may occur directly following cleaning treatment in the treatment zone 240 or may follow the post-treatment zone 250. The transporter 220 carries the cleaned drill solids 205 to the collection area 260 and deposits them therein, such as by dropping them over the edge of the transporter 220 when the transporter 220 ends, as in FIG. 11. The collection area 260 may be used to temporarily store the treated drill solids 205 before transport to another site or use at the same site where drilling occurred. The collection area 260 may also be a receptacle for long term storage.

Although described herein as a method and system for cleaning drill solids resulting from a drilling rig, it should be appreciated that any contaminated solid material may be treated with the present method and/or system to clean contaminants therefrom.

EXAMPLES

The following Examples demonstrate the method 100 in greater detail. These Examples are not intended to limit the scope of the invention in any way and are illustrative of cleaning method 100. All testing of treated samples was performed by Geochemical Testing, a PA DEP-accredited analytical laboratory located in Somerset, Pa.

Example 1

Samples of air-drilled drill cuttings were treated with ultrasonic vibration in combination with cleaning solution to test whether such treatment could improve the amount of solids, thereby improve cleaning, of the drilling mud.

For a first trial sample, 100 grams of air drilled cuttings were placed in a fine-mesh filter basket and submerged in 12 ounces of plain tap water at 90.2° F. with no additional additives placed into the solution within a Heathkit Model GD-1151 ultrasonic cleaner. Ultrasonic energy was applied to the solution and drill cuttings for 5 minutes. After the cleaning period the cuttings were removed and allowed to air-dry for 24 hours. Post-trial observations revealed that the cleaning solution became a clouded dark-brown to light-gray color. The bottom of the cleaning tank was not visible through the used solution. The dried drill cuttings were observed to be a light to medium gray color, compared to the black color of the pre-trial cuttings. The post-trial cuttings had no discernable odor after the treatment process, despite exhibiting an odor consistent with fluids used in the drilling process before treatment.

For a second trial sample, 100 grams of air drilled cuttings were placed in a fine-mesh filter basket and submerged in a solution of plain tap water (12 ounces) and 3.5 ml (1%) sodium laureth sulfate at 71.1° F. in a Heathkit Model GD-1151 ultrasonic cleaner. Ultrasonic energy was applied to the solution and drill cuttings for 5 minutes. After the cleaning period the cuttings were removed and allowed to air-dry for 24 hours. Post-trial observations revealed that the cleaning solution became a clouded dark-brown to light-gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

The first and second trial samples, as well as an untreated "as-drilled" sample of drill cuttings and a background sample from the well pad were tested for total residue and volatile residue amounts. The results of these tests are shown in Table 6.

TABLE 6

| Sample | Total Residue/Solids | Volatile Residue/Solids |
|---|---|---|
| As drilled | 85.4% | 2.83% |
| Background | 97.4% | 0.36% |
| Water | 85.0% | 3.57% |
| 1% surfactant | 90.6% | 2.74% |

The analysis shows that treatment with ultrasonic vibration in water alone does not have an appreciable impact on cleaning power, having similar amounts of total solids to the "as drilled" sample that came directly from the wellbore and was not treated at all. However, treatment with ultrasonic vibration and a cleaning solution of 1% sodium laureth sulfate (surfactant) improved the cleaning, providing increased total solids as compared to the "as drilled" sample and the vibration and water alone.

Example 2

Once it was determined that a combination of ultrasonic vibration and cleaning solution could be effective at cleaning drill cuttings, different cleaning solutions were tested for efficacy.

A cleaning solution of 4% surfactants and 3% viscosity agents was used in the method and tested for cleaning efficacy. Specifically, 100 grams of air drilled cuttings were placed in a fine-mesh filter basket and submerged in a solution of 12 ounces of plain tap water and 1% (3.5 ml) sodium laureth sulfate, 1% (3.5 ml) sodium lauryl sulfate, 1% (3.5 ml) lauramine oxide, 1% (3.5 ml) PEG-8 propylheptyl ether, 1% (3.5 ml) PEI-14 PEG-10/PPG-7 copolymer, 1% (3.5 ml) PPG-26 polypropylene glycol at 82.3° F. in a Heathkit Model GD-1151 ultrasonic cleaner. Ultrasonic energy was applied to the solution and drill cuttings for 5 minutes. After the cleaning period the cuttings were removed and allowed to air-dry for 24 hours. Post-trial observations revealed that the cleaning solution became a clouded dark brown to light gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

In a second sample using a commercially available citrus cleaner and degreaser as the cleaning agent, 100 grams of air drilled cuttings were placed in a fine-mesh filter basket and submerged in a solution of 12 ounces of plain tap water and 1% (3.5 ml) commercially available citrus cleaner/degreaser at 79.6° F. in a Heathkit Model GD-1151 ultrasonic cleaner. Ultrasonic energy was applied to the solution and drill cuttings for 5 minutes. After the cleaning period the cuttings were removed and allowed to air-dry for 24 hours. Post-trial observations revealed that the cleaning solution became a clouded dark brown to light gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

The solids resulting from cleaning with cleaning solution of the present invention and the citrus cleaner, as well as an untreated "as-drilled" sample of drill cuttings taken directly from the well pad, were tested for total residue and volatile residue amounts. The results of these tests are shown in Table 7.

TABLE 7

| Sample | Total Residue/Solids | Volatile Residue/Solids |
|---|---|---|
| As drilled | 89.5% | 2.98% |
| cleaning solution: 4% surfactant, 3% viscosity agent | 84.4% | 2.80% |
| Citrus cleaner | 84.7% | 3.00% |

The analysis shows that treatment with the cleaning solution of the present invention containing surfactants and viscosity agents and the present method removes an amount of solids comparable to a known de-greaser cleaning product. This indicates that the cleaning solution and method provides some cleaning power, though it does not indicate what particular contaminants are being removed.

Example 3

To be even more environmentally friendly, one goal was also to use as few chemicals as possible to treat the drill solids and still effectively remove contaminants. To this end, the lower limits of the cleaning solution was probed with a reduction in the amount of cleaning solution ingredients, thereby increasing the amount of solvent.

A cleaning solution having 2% surfactants and 1.5% viscosity agent [sample 16002] was used in the method and tested for cleaning efficacy. 100 grams of air drilled cuttings were placed in a fine-mesh filter basket and submerged in a solution of 12 ounces of plain tap water and ½% (1.8 ml) sodium laureth sulfate, ½% (1.8 ml) sodium lauryl sulfate, ½% (1.8 ml) lauramine oxide, ½% (1.8 ml) PEG-8 propylheptyl ether, ½% (1.8 ml) PEI-14 PEG-10/PPG-7 copolymer, ½% (1.8 ml) PPG-26 polypropylene glycol at 74.8° F. in a Heathkit Model GD-1151 ultrasonic cleaner. Ultrasonic energy was applied to the solution and drill cuttings for 5 minutes. After the cleaning period the cuttings were removed and allowed to air-dry for 24 hours. Post-trial observations revealed that the cleaning solution became a clouded dark brown to light gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

A cleaning solution having 1% surfactants and 0.75% viscosity agents [sample 16003] was also used in the method and tested for cleaning efficacy. 100 grams of air drilled cuttings were placed in a fine-mesh filter basket and submerged in a solution of 12 ounces of plain tap water and ¼% (0.9 ml) sodium laureth sulfate, ¼% (0.9 ml) sodium lauryl sulfate, ¼% (0.9 ml) lauramine oxide, ¼% (0.9 ml) PEG-8 propylheptyl ether, ¼% (0.9 ml) PEI-14 PEG-10/PPG-7 copolymer, ¼% (0.9 ml) PPG-26 polypropylene glycol at 70.5° F. in a Heathkit Model GD-1151 ultrasonic cleaner. Ultrasonic energy was applied to the solution and drill cuttings for 5 minutes. After the cleaning period the cuttings were removed and allowed to air-dry for 24 hours. Post-trial observations revealed that the cleaning solution became a clouded dark brown to light gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

The solids resulting from cleaning with the formulas of samples 16002 and 16003, as well as an untreated "as-drilled" sample [16001] of drill cuttings taken directly from the well pad, were tested for total residue and volatile residue amounts, as well as for the presence of diesel-ranged organic (DRO) solids and semi-volatile organic compounds, which are known to be difficult to remove from drill cuttings. The results of these tests can be found in Table 8.

TABLE 8

| Analyte | 16001 As Drilled (mg/kg) | 16002 (mg/kg) | 16003 (mg/kg) |
|---|---|---|---|
| Diesel Range Organics (DRO) | 470 | <100 | <100 |
| Semi-Volatile Organics | | | |
| 2-Butanone, 4-hydroxy- | 0.7 | 0.2 | not detected |
| Acetic acid, trichloro-, nonyl est | 0.3 | not detected | not detected |
| Benzene | 0.1 | not detected | not detected |
| Benzene, 1,2,3-trimethyl- | 0.5 | 0.2 | 0.4 |
| Benzene, 1,3,5-trimethyl- | 0.1 | not detected | not detected |
| Benzene, 1,3-dimethyl- | 1 | not detected | not detected |
| Benzene, 1-ethyl-2-methyl- | 0.2 | not detected | not detected |
| Decane | 0.3 | 0.1 | 0.3 |
| Dodecane | 0.4 | not detected | 0.2 |
| Ethanol, 2-butoxy- | 3 | 0.9 | 1 |
| Naphthalene, 1,2,3,4-tetrahydro-6- | 0.1 | not detected | not detected |
| Naphthalene, 2-methyl- | 0.4 | 0.2 | not detected |
| o-Terphenyl | 2 | 8.4 | 8.3 |
| Octaethylene glycol | 1 | not detected | not detected |

TABLE 8-continued

| Analyte | 16001 As Drilled (mg/kg) | 16002 (mg/kg) | 16003 (mg/kg) |
|---|---|---|---|
| p-Xylene | 0.6 | not detected | 0.5 |
| Tetradecane | 0.3 | not detected | not detected |
| | Total Solids | | |
| Percent Total Solids | 85.2 | 94.0 | 93.2 |
| Percent Volatile Solids | 4.56 | 3.86 | 4.84 |

The testing shows that treatment with both the cleaning solution formulas here and the present method significantly removes contaminants from the drill solids, particularly the hard to remove DROs. This indicates that even low levels of the present cleaning solution and method provides effective cleaning power.

Example 4

Once the efficacy of the cleaning solutions was established, they were tested for their ability to remove a wider array of contaminants. The test samples were also scaled up for increased amount of testing material.

A first test sample [16-202] was prepared by being treated with a 1% surfactant and 0.75% viscosity agent cleaning solution. To begin, 1600 grams of air drilled cuttings were placed in a fine-mesh filter basket and submerged in a solution of 120 ounces plain tap water and ¼% (8.0 ml) sodium laureth sulfate, ¼% (8.0 ml) sodium lauryl sulfate, ¼% (8.0 ml) lauramine oxide, ¼% (8.0 ml) PEG-8 propylheptyl ether, ¼% (8.0 ml) PEI-14 PEG-10/PPG-7 copolymer, ¼% (8.0 ml) PPG-26 polypropylene glycol at 80.2° F. in a Yescom Model PS-30A ultrasonic cleaner (having a 6 liter (203 oz.) cleaning tank and is rated at 180 watts of ultrasonic cleaning power). Ultrasonic energy was applied to the solution and drill cuttings for 5 minutes. After the cleaning period the cuttings were removed from solution, placed in a sample jar and refrigerated. Post-trial observations revealed that the cleaning solution became a clouded dark brown to light gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

A second test sample [16-203] prepared by being treated with a 1.75% surfactant and 0.75% viscosity agent cleaning solution. To begin, 1600 grams of air drilled cuttings were placed in a fine-mesh filter basket and submerged in a solution of 120 ounces plain tap water and ½% (16.0 ml) sodium laureth sulfate, ½% (16.0 ml) sodium lauryl sulfate, ½% (16.0 ml) lauramine oxide, ¼% (8.0 ml) PEG-8 propylheptyl ether, ¼% (8.0 ml) PEI-14 PEG-10/PPG-7 copolymer, ¼% (8.0 ml) PPG-26 polypropylene glycol at 79.3° F. in a Yescom Model PS-30A ultrasonic cleaner (having a 6 liter (203 oz.) cleaning tank and rated at 180 watts of ultrasonic cleaning power). Ultrasonic energy was applied to the solution and drill cuttings for 5 minutes. After the cleaning period the cuttings were removed from solution, placed in a sample jar and refrigerated. Post-trial observations revealed that the cleaning solution became a clouded dark brown to light gray color. The bottom of the cleaning tank was not visible through the used solution. The dried drill cuttings were observed to be a light to medium gray color, compared to the black color of the pre-trial cuttings. The post-trial cuttings had no discernable odor after the cleaning process, despite exhibiting an odor consistent with fluids used in the drilling process before treatment.

The solids resulting from cleaning with the 1% surfactant and 0.75% viscosity agent solution [16-202] and 1.75% surfactant and 0.75% viscosity agent solution [16-203], as well as an untreated "as-drilled" sample [16-201] of drill cuttings taken directly from the same well, were tested for the following: metals (using EPA 7473 and EPA 6010 protocols), solids (using SM 4500-CNI protocol), inorganic solids (using EPA 9056A protocol), alcohols (using EPA 8015 protocol), glycols (using EPA 8015 protocol), herbicides (using EPA 8151 protocol), PCBs (using EPA 8082A protocol), pesticides (using EPA 8081B protocol), semi-volatile organic compounds (using EPA 8270 protocol), and low level solid volatile organic compounds (VOCs) (using EPA 8260 protocol). The results of these tests are summarized in Table 9.

TABLE 9

| Analyte | 16-201 As Drilled (mg/kg) | 16-202 (mg/kg) | 16-203 (mg/kg) |
|---|---|---|---|
| Mercury | 0.045 | 0.028 | 0.048 |
| Weak Acid Dissociable Cyanide | <2.3 | <2.1 | <2.1 |
| | Solids | | |
| Bromide | <2 | <2 | <2 |
| Chloride | 424 | 37 | 37 |
| Fluoride | 7 | 5 | 5 |
| Nitrate Nitrogen | 2.8 | 0.8 | 0.7 |
| Nitrite Nitrogen | <0.5 | <0.5 | <0.5 |
| Sulfate | 393 | 119 | 121 |
| | Total Metals | | |
| Antimony | <2.0 | <2.0 | <2.0 |
| Arsenic | 10 | 7.7 | 11.1 |
| Barium | 76.4 | 80.4 | 74.6 |
| Beryllium | 0.68 | 0.74 | 0.73 |
| Boron | <5.0 | <5.0 | <5.0 |
| Cadmium | 0.4 | 0.4 | 0.5 |
| Chromium | 21 | 16.6 | 16.9 |
| Cobalt | 14.2 | 14.7 | 16.7 |
| Copper | 28.7 | 26.5 | 27.4 |
| Lead | 15.2 | 10.7 | 13.1 |
| Manganese | 613 | 553 | 610 |
| Nickel | 30.9 | 32.4 | 34 |
| Selenium | <2.0 | <2.0 | <2.0 |
| Silver | <0.5 | <0.5 | <0.5 |
| Sulfur as Sulfate | <30.0 | <30.0 | <30.0 |
| Thallium | <2.0 | <2.0 | <2.0 |
| Tin | <10 | <10 | <10 |
| Vanadium | 18.9 | 18.1 | 17.7 |
| Zinc | 97.8 | 86.8 | 90.3 |
| Alcohol-Methanol | <58 | <52 | <52 |
| Glycol-Ethylene Glycol | <58 | <52 | <52 |
| | Herbicides | | |
| 2,4,5-T | <0.00579 | <0.00519 | <0.00522 |
| 2,4-D | <0.00579 | <0.00519 | <0.00522 |
| Dinoseb | <0.00579 | <0.00519 | <0.00522 |
| Silvex | <0.00579 | <0.00519 | <0.00522 |
| | PCBs | | |
| PCB 1016 | <0.058 | <0.052 | <0.052 |
| PCB 1221 | <0.058 | <0.052 | <0.052 |
| PCB 1232 | <0.058 | <0.052 | <0.052 |
| PCB 1242 | <0.058 | <0.052 | <0.052 |
| PCB 1248 | <0.058 | <0.052 | <0.052 |
| PCB 1254 | <0.058 | <0.052 | <0.052 |
| PCB 1260 | <0.058 | <0.052 | <0.052 |

TABLE 9-continued

| Analyte | 16-201 As Drilled (mg/kg) | 16-202 (mg/kg) | 16-203 (mg/kg) |
|---|---|---|---|
| Pesticides | | | |
| Aldrin | <0.00289 | <0.00259 | <0.00261 |
| Alpha BHC | <0.00289 | <0.00259 | <0.00261 |
| Alpha Endosulfan | <0.00289 | <0.00259 | <0.00261 |
| Beta BHC | <0.00289 | <0.00259 | <0.00261 |
| Beta Endosulfan | <0.00289 | <0.00259 | <0.00261 |
| Chlordane | <0.0579 | <0.0519 | <0.0522 |
| DDD | <0.00289 | <0.00259 | <0.00261 |
| DDE | <0.00289 | <0.00259 | <0.00261 |
| DDT | <0.00289 | <0.00259 | <0.00261 |
| Delta BHC | <0.00289 | <0.00259 | <0.00261 |
| Dieldrin | <0.00289 | <0.00259 | <0.00261 |
| Endosulfan Sulfate | <0.00289 | <0.00259 | <0.00261 |
| Endrin | <0.00289 | <0.00259 | <0.00261 |
| Gamma BHC (Lindane) | <0.00289 | <0.00259 | <0.00261 |
| Heptachlor | <0.00289 | <0.00259 | <0.00261 |
| Heptachlor epoxide | <0.00289 | <0.00259 | <0.00261 |
| Methoxychlor | <0.00289 | <0.00259 | <0.00261 |
| Toxaphene | <0.116 | <0.00259 | <0.104 |
| Semi-Volatile Solid Compounds (VOCs) | | | |
| 1,1-Biphenyl | <0.39 | <0.35 | <0.35 |
| 1,2,4,5-Tetrachlorobenzene | <0.39 | <0.35 | <0.35 |
| 1,3-Dinitrobenzene | <0.39 | <0.35 | <0.35 |
| 1-Naphthylamine | <0.39 | <0.35 | <0.35 |
| 2-3,4,6-Tetrachlorophenol | <0.77 | <0.69 | <0.70 |
| 2,4,5-Trichlorophenol | <0.39 | <0.35 | <0.35 |
| 2,4,6-Trichlorophenol | <0.39 | <0.35 | <0.35 |
| 2,4-Dichlorophenol | <0.39 | <0.35 | <0.35 |
| 2,4-Dimethylphenol | <0.39 | <0.35 | <0.35 |
| 2,4-Dinitrophenol | <1.9 | <1.7 | <1.7 |
| 2,4-Dinitrotoluene | <0.39 | <0.35 | <0.35 |
| 2,6-Dinitrotoluene | <0.39 | <0.35 | <0.35 |
| 2-Acetylaminofluorene | <0.77 | <0.69 | <0.70 |
| 2-Chloro-Naphthalene | <0.39 | <0.35 | <0.35 |
| 2-Chlorophenol | <0.39 | <0.35 | <0.35 |
| 2-Methylnaphthalene | 0.57 | <0.35 | <0.35 |
| 2-Methylphenol | <0.39 | <0.35 | <0.35 |
| 2-Naphthylamine | <0.39 | <0.35 | <0.35 |
| 2-Nitroaniline | <1.9 | <1.7 | <1.7 |
| 2-Nitrophenol | <0.39 | <0.35 | <0.35 |
| 3,3-Dichlorobenzidine | <0.77 | <0.69 | <0.70 |
| 3-Methylphenol | <0.39 | <0.35 | <0.35 |
| 3-Nitroaniline | <0.39 | <0.35 | <0.35 |
| 4-Aminobiphenyl | <0.39 | <0.35 | <0.35 |
| 4-Chloro-3-methylphenol | <0.39 | <0.35 | <0.35 |
| 4-Chloroaniline | <0.39 | <0.35 | <0.35 |
| 4-Methylphenol | <0.39 | <0.35 | <0.35 |
| 4-Nitroaniline | <0.39 | <0.35 | <0.35 |
| 4-Nitrophenol | <0.39 | <0.35 | <0.35 |
| Acenaphthene | <0.39 | <0.35 | <0.35 |
| Acenaphthylene | <0.39 | <0.35 | <0.35 |
| Acetophenone | <0.39 | <0.35 | <0.35 |
| Anthracene | <0.39 | <0.35 | <0.35 |
| Atrazine | <0.39 | <0.35 | <0.35 |
| Benzidine | <0.39 | <0.35 | <0.35 |
| Benzo(a)anthracene | <0.39 | <0.35 | <0.35 |
| Benzo(a)pyrene | <0.39 | <0.35 | <0.35 |
| Benzo(b)fluoranthene | <0.39 | <0.35 | <0.35 |
| Benzo(g,h,i)perylene | <0.39 | <0.35 | <0.35 |
| Benzo(k)fluoranthene | <0.39 | <0.35 | <0.35 |
| Benzyl Alcohol | <0.39 | <0.35 | <0.35 |
| bis(2-Chloroethyl)ether | <0.39 | <0.35 | <0.35 |
| bis(2-Chloroisopropyl)ether | <0.39 | <0.35 | <0.35 |
| bis(2-Ethylhexyl)phthalate | <0.39 | <0.35 | <0.35 |
| Butyl benzylphthalate | <0.39 | <0.35 | <0.35 |
| Carbazole | <0.39 | <0.35 | <0.35 |
| Chlorobenzilate | <0.39 | <0.35 | <0.35 |
| Chrysene | <0.39 | <0.35 | <0.35 |
| Di-N-Butyl Phthalate | <0.39 | <0.35 | <0.35 |
| Di-N-Octylphthalate | <0.39 | <0.35 | <0.35 |
| Dibenzo(a,h)anthracene | <0.39 | <0.35 | <0.35 |
| Diethyl Phthalate | <0.39 | <0.35 | <0.35 |
| Dimethoate | <0.39 | <0.35 | <0.35 |
| Diphenylamine | <0.39 | <0.35 | <0.35 |
| Disulfoton | <0.39 | <0.35 | <0.35 |
| Fluoranthene | <0.39 | <0.35 | <0.35 |
| Fluorene | <0.39 | <0.35 | <0.35 |
| Hexachlorobenzene | <0.39 | <0.35 | <0.35 |
| Hexachlorocyclopentadiene | <0.39 | <0.35 | <0.35 |
| Hexachloroethane | <0.39 | <0.35 | <0.35 |
| Indeno(1,2,3-cd)pyrene | <0.39 | <0.35 | <0.35 |
| Isophorone | <0.39 | <0.35 | <0.35 |
| Kepone | <3.9 | <3.5 | <3.5 |
| Methyl Methanesulfonate | <0.39 | <0.35 | <0.35 |
| Methyl Parathion | <0.39 | <0.35 | <0.35 |
| N-Nilrosodibutylamine | <0.39 | <0.35 | <0.35 |
| N-Nitrosodiethylamine | <0.39 | <0.35 | <0.35 |
| n-Nitrosodimethylamine | <0.39 | <0.35 | <0.35 |
| n-Nitrosodiphenylamine | <0.39 | <0.35 | <0.35 |
| N-nitrosodipropylamine | <0.39 | <0.35 | <0.35 |
| Nitrobenzene | <0.39 | <0.35 | <0.35 |
| o-Toluidine | <0.39 | <0.35 | <0.35 |
| p-Dimethylaminoazobenzene | <0.39 | <0.35 | <0.35 |
| Parathion | <0.39 | <0.35 | <0.35 |
| Pentachlorobenzene | <0.39 | <0.35 | <0.35 |
| Pentachloronitrobenzene | <0.39 | <0.35 | <0.35 |
| Pentachlorophenol | <0.39 | <0.35 | <0.35 |
| Phenacetin | <0.39 | <0.35 | <0.35 |
| Phenanthrene | <0.39 | <0.35 | <0.35 |
| Phenol | <0.39 | <0.35 | <0.35 |
| Phorate | <0.39 | <0.35 | <0.35 |
| Pronamide | <0.39 | <0.35 | <0.35 |
| Pyrene | <0.39 | <0.35 | <0.35 |
| Pyridine | <1.9 | <1.7 | <1.7 |
| Diallate | <0.39 | <0.35 | <0.35 |
| Low Level Solid VOCs | | | |
| 1,1,1,2-Tetrachloroethane | <0.0051 | <0.0062 | <0.0064 |
| 1,1,1-Trichloroethane | <0.0051 | <0.0062 | <0.0064 |
| 1,1,2,2-Tetrachloroethane | <0.0051 | <0.0062 | <0.0064 |
| 1,1,2-Trichloro-1,2,2-Trifluoroethane | <0.0051 | <0.0062 | <0.0064 |
| 1,1,2-Trichloroethane | <0.0051 | <0.0062 | <0.0064 |
| 1,1-Dichloroethane | <0.0051 | <0.0062 | <0.0064 |
| 1,1-Dichloroethene | <0.0051 | <0.0062 | <0.0064 |
| 1,2,3-Trichloropropane | <0.0051 | <0.0062 | <0.0064 |
| 1,2,4-Trichlorobenzene | <0.0051 | <0.0062 | <0.0064 |
| 1,2,4-Trimethylbenzene | <0.0051 | 0.008 | 0.0097 |
| 1,2-Dibromo-3-chloropropane | <0.0051 | <0.0062 | <0.0064 |
| 1,2-Dibromoethane | <0.0051 | <0.0062 | <0.0064 |
| 1,2-Dichlorobenzene | <0.0051 | <0.0062 | <0.0064 |
| 1,2-Dichloroethane | <0.0051 | <0.0062 | <0.0064 |
| 1,2-Dichloropropane | <0.0051 | <0.0062 | <0.0064 |
| 1,3,5-Trimethylbenzene | <0.0051 | <0.0062 | <0.0064 |
| 1,3-Dichlorobenzene | <0.0051 | <0.0062 | <0.0064 |
| 1,4-Dichlorobenzene | <0.0051 | <0.0062 | <0.0064 |
| 1,4-Dioxane | <0.0051 | <0.062 | <0.064 |
| 2-Butanone | 0.015 | 0.01 | 0.012 |
| 2-Chlorotoluene | <0.0051 | <0.0062 | <0.0064 |
| 4-Methyl-2-Pentanone | <0.0051 | <0.0062 | <0.0064 |
| Acetone | 0.062 | 0.038 | 0.043 |
| Acetonitrile | <0.051 | <0.062 | <0.064 |
| Acrolein | <0.0051 | <0.0062 | <0.0064 |
| Acrylonitrile | <0.0051 | <0.0062 | <0.0064 |
| Allyl chloride | <0.0051 | <0.0062 | <0.0064 |
| Benzene | 0.063 | 0.1 | 0.12 |
| Bromochloromethane | <0.0051 | <0.0062 | <0.0064 |
| Bromodichloromethane | <0.0051 | <0.0062 | <0.0064 |
| Bromoform | <0.0051 | <0.0062 | <0.0064 |
| Bromomethane | <0.0051 | <0.0062 | <0.0064 |
| Carbon Disulfide | <0.0051 | <0.0062 | <0.0064 |
| Carbon Tetrachloride | <0.0051 | <0.0062 | <0.0064 |
| Chlorobenzene | <0.0051 | <0.0062 | <0.0064 |
| Chlorodibromomethane | <0.0051 | <0.0062 | <0.0064 |
| Chloroethane | <0.0051 | <0.0062 | <0.0064 |
| Chloroform | <0.0051 | <0.0062 | <0.0064 |
| Chloromethane | <0.0051 | <0.0062 | <0.0064 |
| Chloroprene | <0.0051 | <0.0062 | <0.0064 |
| cis-1,2-Dichloroethene | <0.0051 | <0.0062 | <0.0064 |
| cis-1,3-Dichloropropene | <0.0051 | <0.0062 | <0.0064 |

TABLE 9-continued

| Analyte | 16-201 As Drilled (mg/kg) | 16-202 (mg/kg) | 16-203 (mg/kg) |
|---|---|---|---|
| Dibromomethane | <0.0051 | <0.0062 | <0.0064 |
| Dichlorodifluoromethane | <0.0051 | <0.0062 | <0.0064 |
| Dichlorofluoromethane | <0.0051 | <0.0062 | <0.0064 |
| Ethyl Methacrylate | <0.0051 | <0.0062 | <0.0064 |
| Ethylbenzene | 0.0058 | 0.0091 | 0.0094 |
| Hexachlorobutadiene | <0.0051 | <0.0062 | <0.0064 |
| Isobutyl alcohol | <0.051 | <0.062 | <0.064 |
| Isopropylbenzene | <0.0051 | <0.0062 | <0.0064 |
| Methacrylonitrile | <0.051 | <0.062 | <0.064 |
| Methyl methacrylate | <0.0051 | <0.0062 | <0.0064 |
| Methyl-tert-butyl ether | <0.0051 | <0.0062 | <0.0064 |
| Methylene Chloride | <0.0051 | <0.0062 | <0.0064 |
| n-Butylbenzene | <0.0051 | <0.0062 | <0.0064 |
| n-Propylbenzene | <0.0051 | <0.0062 | <0.0064 |
| Naphthalene | <0.0051 | 0.007 | 0.008 |
| sec-Butylbenzene | <0.0051 | <0.0062 | <0.0064 |
| Styrene | <0.0051 | <0.0062 | <0.0064 |
| tert-Butylbenzene | <0.0051 | <0.0062 | <0.0064 |
| Tetrachloroethene | <0.0051 | <0.0062 | <0.0064 |
| Toluene | 0.094 | 0.14 | 0.15 |
| trans-1,2-Dichloroethene | <0.0051 | <0.0062 | <0.0064 |
| trans-1,3-Dichloropropene | <0.0051 | <0.0062 | <0.0064 |
| trans-1,4-Dichloro-2-butene | <0.0051 | <0.0062 | <0.0064 |
| Trichloroethene | <0.0051 | <0.0062 | <0.0064 |
| Trichlorofluoromethane | <0.0051 | <0.0062 | <0.0064 |
| Vinyl Acetate | <0.0051 | <0.0062 | <0.0064 |
| Vinyl Chloride | <0.0051 | <0.0062 | <0.0064 |
| Total Xylene | 0.038 | 0.059 | 0.064 |

Figure 3A:
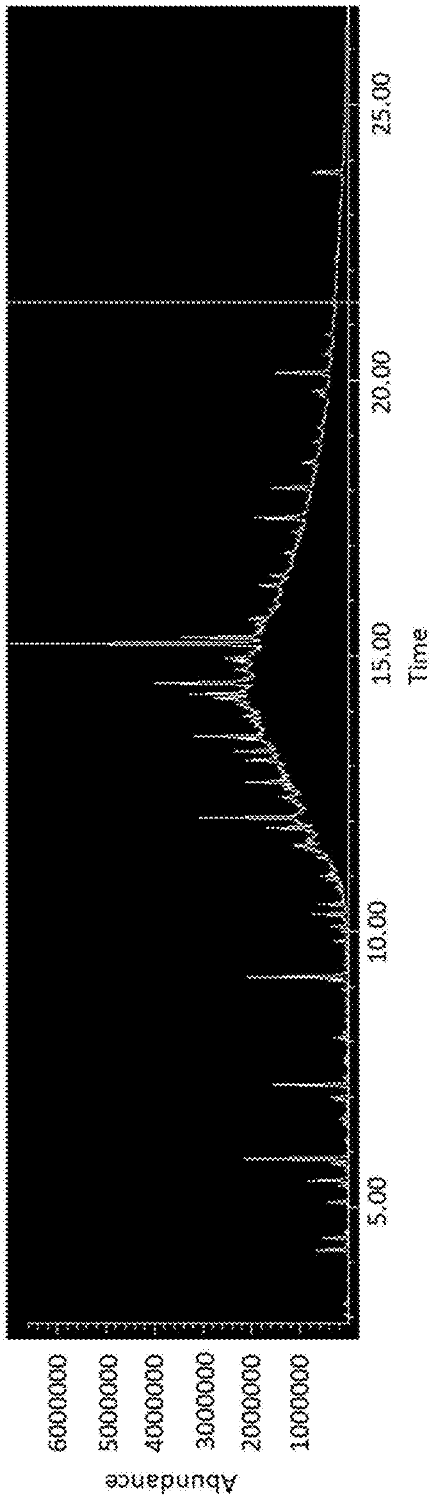
FIG. 3A is a chromatograph from a mass spectrometer following gas chromatography (GC/MS) showing peaks representative of semi-volatile organic compounds (SVOCs) in the untreated “as-drilled” sample 16-201 from Example 4.
Figure 3B:
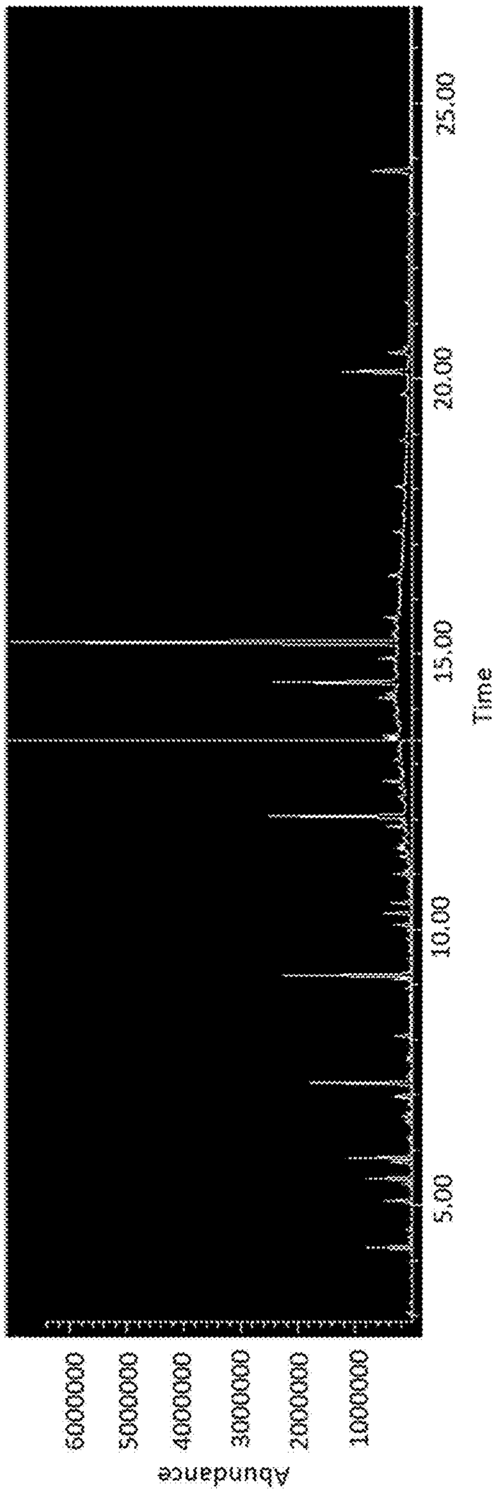
FIG. 3B is a GC/MS chromatograph showing peaks representative of SVOCs in one of the 16-202 and 16-203 samples from Example 4.

Chromatographs corresponding to Example 4 are provided in FIGS. 3A-4B. Specifically, FIG. 3A shows a chromatograph from a mass spectrometer following gas chromatography (GC/MS) of the semi-volatile organic compounds in the untreated "as is" sample. The peaks correspond to semi-volatile organic compounds detected in the sample. The broad curve results from a number of semi-volatile organic impurities detected in the sample. In contrast, FIG. 3B is a similar GC/MS chromatograph of one of the treated samples that has been subjected to a cleaning solution and method as described for Example 4. Here, the lack of a similar broad curve indicates the lack of many semi-volatile organic impurities in the sample.

Figure 4A:
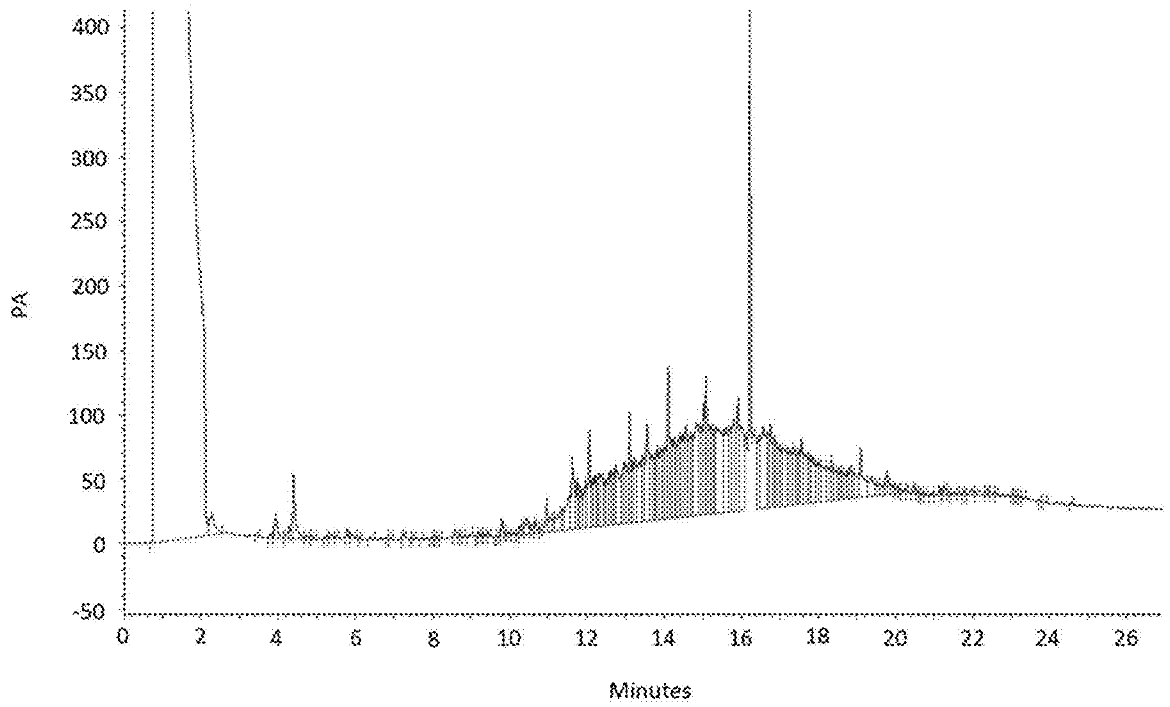
FIG. 4A is a chromatograph from a flame ionization detector following gas chromatography (GCFID) showing peaks representative of diesel ranged organics (DROs) in the untreated “as-drilled” sample 16-201 from Example 4.
Figure 4B:
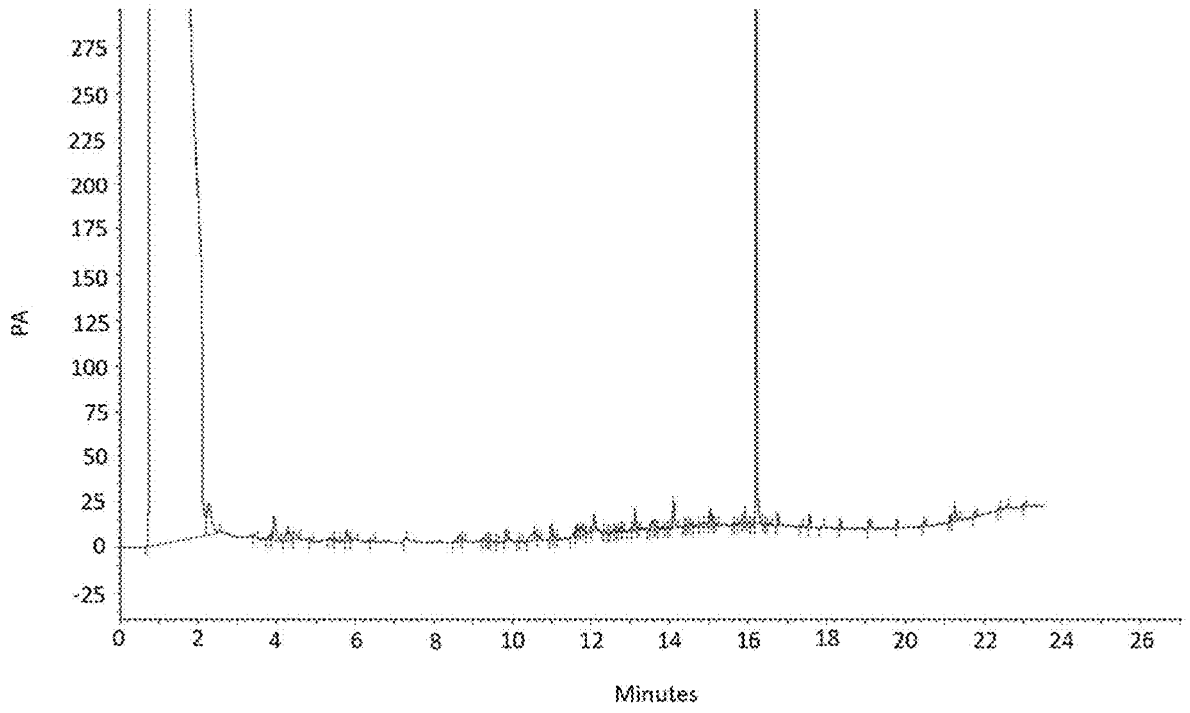
FIG. 4B is a GCFID chromatograph showing peaks representative of DROs in one of the 16-202 and 16-203 samples from Example 4.

FIGS. 4A and 4B are chromatographs showing peaks for DRO detected. FIG. 4A shows a chromatograph from a flame ionization detector following gas chromatography (GCFID) for the untreated "as is" sample, which shows many peaks overlapping, indicating many DRO present. In contrast, FIG. 4B shows a similar GCFID chromatograph for one of the treated samples that has been subjected to a cleaning solution and method as described for Example 4. Here, only a few DRO are detected, indicating a significant drop in the amount of DROs present after cleaning with the current cleaning solution and method.

Accordingly, the drill solids treated with the cleaning solutions of Example 4 and the method as described herein significantly reduce semi-volatile organic impurities and DROs from drill cuttings, which are among the more difficult to remove and are important in meeting beneficial use standards.

Example 5

To gain a better understanding of the various contaminants that are removed from the drill solids by the cleaning solution and method as described herein, a full-scope analysis of treated drill solids was performed.

A 1% surfactant and 0.75% viscosity agent cleaning solution [16-202] was used in cleaning the drill solids. 1600 grams of air drilled cuttings were placed in a fine-mesh filter basket and submerged in a solution of 120 ounces plain tap water and ¼% (8.0 ml) sodium laureth sulfate, ¼% (8.0 ml) sodium lauryl sulfate, ¼% (8.0 ml) lauramine oxide, ¼% (8.0 ml) PEG-8 propylheptyl ether, ¼% (8.0 ml) PEI-14 PEG-10/PPG-7 copolymer, ¼% (8.0 ml) PPG-26 polypropylene glycol at 79.1° F. in a Yescom Model PS-30A ultrasonic cleaner (having a 6 liter (203 oz.) cleaning tank and rated at 180 watts of ultrasonic cleaning power). Ultrasonic energy was applied to the solution and drill cuttings for 5 minutes. After the cleaning period the cuttings were removed from solution, placed in a sample jar and refrigerated. Post-trial observations revealed that the cleaning solution became a clouded dark brown to light gray color. The bottom of the cleaning tank was not visible through the used solution. The dried drill cuttings were observed to be a medium gray color, compared to the black color of the pre-trial cuttings. The post-trial cuttings had no discernable odor after the cleaning process, despite exhibiting an odor consistent with fluids used in the drilling process before treatment.

A 1.75% surfactant and 0.75% viscosity agent cleaning solution [16-203] was used in cleaning the drill solids. 1600 grams of air drilled cuttings were placed in a fine-mesh filter basket and submerged in a solution of 120 ounces plain tap water and ½% (16.0 ml) sodium laureth sulfate, ½% (16.0 ml) sodium lauryl sulfate, ½% (16.0 ml) lauramine oxide, ¼% (8.0 ml) PEG-8 propylheptyl ether, ¼% (8.0 ml) PEI-14 PEG-10/PPG-7 copolymer, ¼% (8.0 ml) PPG-26 polypropylene glycol at 79.8° F. in a Yescom Model PS-30A ultrasonic cleaner (having a 6 liter (203 oz.) cleaning tank and rated at 180 watts of ultrasonic cleaning power). Ultrasonic energy was applied to the solution and drill cuttings for 5 minutes. After the cleaning period the cuttings were removed from solution, placed in a sample jar and refrigerated. Post-trial observations revealed that the cleaning solution became a clouded dark brown to light gray color. The bottom of the cleaning tank was not visible through the used solution. The dried drill cuttings were observed to be a medium gray color, compared to the black color of the pre-trial cuttings. The post-trial cuttings had no discernable odor after the cleaning process, despite exhibiting an odor consistent with fluids used in the drilling process before treatment.

The solids resulting from cleaning with the 1% surfactant and 0.75% viscosity agent solution [16-202] and 1.75% surfactant and 0.75% viscosity agent solution [16-203], as well as an untreated "as-drilled" sample [16-201] of drill cuttings from the well and a background sample [Bckgd] of surface samples around the well were tested for the following: metals (using EPA 7473 and EPA 6010 protocols), solids (using SM 4500-CN I protocol), inorganic solids (using EPA 9056A protocol), alcohols (using EPA 8015 protocol), glycols (using EPA 8015 protocol), herbicides (using EPA 8151 protocol), PCBs (using EPA 8082A protocol), pesticides (using EPA 8081B protocol), semi-volatile organic compounds (using EPA 8270 protocol), and low level solid volatile organic compounds (VOCs) (using EPA 8260 protocol), as well as diesel range organics (using EPA 8015 protocol) and gasoline range organics (GRO) and BTEX (using EPA 8260 protocol). The results of these tests are summarized in Table 10.

TABLE 10

| Analyte | Bckgd | 16-201 As Drilled (mg/kg) | 16-202 (mg/kg) | 16-203 (mg/kg) |
|---|---|---|---|---|
| Mercury | <0.010 | <0.010 | 0.01 | 0.017 |
| Weak Acid Dissociable Cyanide | <2.1 | <2.3 | <2.1 | <2.1 |
| Solids | | | | |
| Chloride | 12 | 1190 | 56 | 11 |
| Nitrate Nitrogen | 4 | <0.5 | 1.9 | <0.5 |
| Nitrite Nitrogen | <0.5 | <0.5 | <0.5 | <0.5 |
| Sulfate | 101 | 230 | 189 | 151 |
| Total Metals | | | | |
| Antimony | <2.0 | <2.0 | <2.0 | <2.0 |
| Arsenic | <2.0 | 19.9 | 17.2 | 17.8 |
| Barium | 95.2 | 75.2 | 77.3 | 70.8 |
| Beryllium | 0.33 | 0.87 | 0.95 | 0.89 |
| Boron | <5.0 | 7.1 | 9 | 9.3 |
| Cadmium | 0.2 | 0.6 | 1 | 1 |
| Chromium | 5.1 | 21.8 | 23.5 | 23.5 |
| Cobalt | 1.9 | 17.7 | 18 | 18.2 |
| Copper | 4.1 | 34.1 | 39.8 | 39.4 |
| Lead | 7.1 | 23.6 | 23.9 | 23.1 |
| Manganese | 428 | 472 | 503 | 455 |
| Nickel | 5 | 41.3 | 46.4 | 47.6 |
| Selenium | 2.3 | <2.0 | <2.0 | <2.0 |
| Silver | <5.0 | <0.5 | <0.5 | <0.5 |
| Sulfur as Sulfate | 598 | 16600 | 26700 | 27100 |
| Thallium | <2.0 | <2.0 | <2.0 | <2.0 |
| Tin | <10 | <10 | <10 | <10 |
| Vanadium | 5.1 | 22.6 | 25.3 | 25.6 |
| Zinc | 30.9 | 135 | 156 | 172 |
| Alcohol-Methanol | <52 | <58 | <52 | <52 |
| Glycol-Ethylene Glycol | <52 | <58 | <52 | <52 |
| Herbicides | | | | |
| 2,4,5-T | <0.00518 | <0.00583 | <0.00523 | <0.00519 |
| 2,4-D | <0.00518 | <0.00583 | <0.00523 | <0.00519 |
| Dinoseb | <0.00518 | <0.00583 | <0.00523 | <0.00519 |
| Silvex | <0.00518 | <0.00583 | <0.00523 | <0.00519 |
| PCBs | | | | |
| PCB 1016 | <0.052 | <0.058 | <0.052 | <0.052 |
| PCB 1221 | <0.052 | <0.058 | <0.052 | <0.052 |
| PCB 1232 | <0.052 | <0.058 | <0.052 | <0.052 |
| PCB 1242 | <0.052 | <0.058 | <0.052 | <0.052 |
| PCB 1248 | <0.052 | <0.058 | <0.052 | <0.052 |
| PCB 1254 | <0.052 | <0.058 | <0.052 | <0.052 |
| PCB 1260 | <0.052 | <0.058 | <0.052 | <0.052 |
| Pesticides | | | | |
| Aldrin | <0.00259 | <0.00201 | <0.00262 | <0.00260 |
| Alpha BHC | <0.00259 | <0.00291 | <0.00262 | <0.00260 |
| Alpha Endosulfan | <0.00259 | <0.00291 | <0.00262 | <0.00260 |
| Beta BHC | <0.00259 | <0.00291 | <0.00262 | <0.00260 |
| Beta Endosulfan | <0.00259 | <0.00291 | <0.00262 | <0.00260 |
| Chlordane | <0.0518 | <0.0583 | <0.0523 | <0.0519 |
| DDD | <0.00259 | <0.00291 | <0.00262 | <0.00260 |
| DDE | <0.00259 | <0.00291 | <0.00262 | <0.00260 |
| DDT | <0.00239 | <0.00291 | <0.00262 | <0.00260 |
| Delta BHC | <0.00259 | <0.00291 | <0.00262 | <0.00260 |
| Dieldrin | <0.00259 | <0.00291 | <0.00262 | <0.00260 |
| Endosulfan Sulfate | <0.00259 | <0.00291 | <0.00262 | <0.00260 |
| Endrin | <0.00259 | <0.00291 | <0.00262 | <0.00260 |
| Gamma BHC (Lindane) | <0.00259 | <0.00291 | <0.00262 | <0.00260 |
| Heptachlor | <0.00259 | <0.00291 | <0.00262 | <0.00260 |
| Heptachlor epoxide | <0.00259 | <0.00291 | <0.00262 | <0.00260 |
| Methoxychlor | <0.00259 | <0.00291 | <0.00262 | <0.00260 |
| Toxaphene | <0.104 | <0.00291 | <0.105 | <0.104 |
| Semi-Volatile Solid Compounds (VOCs) | | | | |
| 1,1-Biphenyl | <0.35 | <0.39 | <0.35 | <0.35 |
| 1,2,4,5-Tetrachlorobenzene | <0.35 | <0.39 | <0.35 | <0.35 |
| 1,3-Dinitrobenzene | <0.35 | <0.39 | <0.35 | <0.35 |
| 1-Naphthylamine | <0.35 | <0.39 | <0.35 | <0.35 |
| 2,3,4,6-Tetrachlorophenol | <0.69 | <0.78 | <0.70 | <0.69 |
| 2,4,5-Trichlorophenol | <0.35 | <0.39 | <0.35 | <0.35 |
| 2,4,6-Trichlorophenol | <0.35 | <0.39 | <0.35 | <0.35 |
| 2,4-Dichlorophenol | <0.35 | <0.39 | <0.35 | <0.35 |

TABLE 10-continued

| Analyte | Bckgd | 16-201 As Drilled (mg/kg) | 16-202 (mg/kg) | 16-203 (mg/kg) |
|---|---|---|---|---|
| 2,4-Dimethylphenol | <0.35 | <0.39 | <0.35 | <0.35 |
| 2,4-Dinitrophenol | <1.7 | <1.9 | <1.7 | <1.7 |
| 2,4-Dinitrotoluene | <0.35 | <0.39 | <0.35 | <0.35 |
| 2,6-Dinitrotoluene | <0.35 | <0.39 | <0.35 | <0.35 |
| 2-Acetylaminofluorene | <0.69 | <0.78 | <0.70 | <0.69 |
| 2-Chloro-Naphthalene | <0.35 | <0.39 | <0.35 | <0.35 |
| 2-Chlorophenol | <0.35 | <0.39 | <0.35 | <0.35 |
| 2-Methylnaphthalene | <0.35 | <0.39 | <0.35 | <0.35 |
| 2-Methylphenol | <0.35 | <0.39 | <0.35 | <0.35 |
| 2-Naphthylamine | <0.35 | <0.39 | <0.35 | <0.35 |
| 2-Nitroaniline | <1.7 | <1.9 | <1.7 | <1.7 |
| 2-Nitrophenol | <0.35 | <0.39 | <0.35 | <0.35 |
| 3,3-Dichlorobenzidine | <0.69 | <0.78 | <0.70 | <0.69 |
| 3-Methylphenol | <0.35 | <0.39 | <0.35 | <0.35 |
| 3-Nitroaniline | <0.35 | <0.39 | <0.35 | <0.35 |
| 4-Aminobiphenyl | <0.35 | <0.39 | <0.35 | <0.35 |
| 4-Chloro-3-methylphenol | <0.35 | <0.39 | <0.35 | <0.35 |
| 4-Chloroaniline | <0.35 | <0.39 | <0.35 | <0.35 |
| 4-Methylphenol | <0.35 | <0.39 | <0.35 | <0.35 |
| 4-Nitroaniline | <0.35 | <0.39 | <0.35 | <0.35 |
| 4-Nitrophenol | <0.35 | <0.39 | <0.35 | <0.35 |
| Acenaphthene | <0.35 | <0.39 | <0.35 | <0.35 |
| Acenaphthylene | <0.35 | <0.39 | <0.35 | <0.35 |
| Acenophenone | <0.35 | <0.39 | <0.35 | <0.35 |
| Anthracene | <0.35 | <0.39 | <0.35 | <0.35 |
| Atrazine | <0.35 | <0.39 | <0.35 | <0.35 |
| Benzidine | <0.35 | <0.39 | <0.35 | <0.35 |
| Benzo(a)anthracene | <0.35 | <0.39 | <0.35 | <0.35 |
| Benzo(a)pyrene | <0.35 | <0.39 | <0.35 | <0.35 |
| Benzo(b)fluoranthene | <0.35 | <0.39 | <0.35 | <0.35 |
| Benzo(g,h,i)perylene | <0.35 | <0.39 | <0.35 | <0.35 |
| Benzo(k)fluoranthene | <0.35 | <0.39 | <0.35 | <0.35 |
| Benzoic acid | <6.9 | <7.8 | <7.0 | <6.9 |
| Benzyl Alcohol | <0.35 | <0.39 | <0.35 | <0.35 |
| bis(2-Chloroethyl)ether | <0.35 | <0.39 | <0.35 | <0.35 |
| bis(2-Chloroisopropyl)ether | <0.35 | <0.39 | <0.35 | <0.35 |
| bis(2-Ethylhexyl)phthalate | <0.35 | <0.39 | <0.35 | <0.35 |
| Butyl benzylphthalate | <0.35 | <0.39 | <0.35 | <0.35 |
| Carbazole | <0.35 | <0.39 | <0.35 | <0.35 |
| Chlorobenzilate | <0.35 | <0.39 | <0.35 | <0.35 |
| Chrysene | <0.35 | <0.39 | <0.35 | <0.35 |
| Di-N-Butyl Phthalate | <0.35 | <0.39 | <0.35 | <0.35 |
| Di-N-Octylphthalate | <0.35 | <0.39 | <0.35 | <0.35 |
| Dibenzo(a,h)anthracene | <0.35 | <0.39 | <0.35 | <0.35 |
| Diethyl Phthalate | <0.35 | <0.39 | <0.35 | <0.35 |
| Dimethoate | <0.35 | <0.39 | <0.35 | <0.35 |
| Diphenylamine | <0.35 | <0.39 | <0.35 | <0.35 |
| Disulfoton | <0.35 | <0.39 | <0.35 | <0.35 |
| Fluoranthene | <0.35 | <0.39 | <0.35 | <0.35 |
| Fluorene | <0.35 | <0.39 | <0.35 | <0.35 |
| Hexachlorobenzene | <0.35 | <0.39 | <0.35 | <0.35 |
| Hexachlorocyclopentadiene | <0.35 | <0.39 | <0.35 | <0.35 |
| Hexachloroethane | <0.35 | <0.39 | <0.35 | <0.35 |
| Indeno(1,2,3-cd)pyrene | <0.35 | <0.39 | <0.35 | <0.35 |
| Isophorone | <0.35 | <0.39 | <0.35 | <0.35 |
| Kepone | <3.5 | <3.9 | <3.5 | <3.5 |
| Methyl Methanesulfonate | <0.35 | <0.39 | <0.35 | <0.35 |
| Methyl Parathion | <0.35 | <0.39 | <0.35 | <0.35 |
| N-Nilrosodibutylamine | <0.35 | <0.39 | <0.35 | <0.35 |
| N-Nitrosodiethylamine | <0.35 | <0.39 | <0.35 | <0.35 |
| n-Nitrosodimethylamine | <0.35 | <0.39 | <0.35 | <0.35 |
| n-Nitrosodiphenylamine | <0.35 | <0.39 | <0.35 | <0.35 |
| N-nitrosodipropylamine | <0.35 | <0.39 | <0.35 | <0.35 |
| Nitrobenzene | <0.35 | <0.39 | <0.35 | <0.35 |
| o-Toluidine | <0.35 | <0.39 | <0.35 | <0.35 |
| p-Dimethylaminoazobenzene | <0.35 | <0.39 | <0.35 | <0.35 |
| Parathion | <0.35 | <0.39 | <0.35 | <0.35 |
| Pentachlorobenzene | <0.35 | <0.39 | <0.35 | <0.35 |
| Pentachloronitrobenzene | <0.35 | <0.39 | <0.35 | <0.35 |
| Pentachlorophenol | <0.35 | <0.39 | <0.35 | <0.35 |
| Phenacetin | <0.35 | <0.39 | <0.35 | <0.35 |
| Phenanthrene | <0.35 | <0.39 | <0.35 | <0.35 |
| Phenol | <0.35 | <0.39 | <0.35 | <0.35 |
| Phorate | <0.35 | <0.39 | <0.35 | <0.35 |
| Pronamide | <0.35 | <0.39 | <0.35 | <0.35 |
| Pyrene | <0.35 | <0.39 | <0.35 | <0.35 |

TABLE 10-continued

| Analyte | Bckgd | 16-201 As Drilled (mg/kg) | 16-202 (mg/kg) | 16-203 (mg/kg) |
|---|---|---|---|---|
| Pyridine | <1.7 | <1.9 | <1.7 | <1.7 |
| Diallate | <0.35 | <0.39 | <0.35 | <0.35 |
| Low Level Solid VOCs | | | | |
| 1,1,1,2-Tetrachloroethane | <0.0057 | <0.0059 | <0.0052 | <0.0054 |
| 1,1,1-Trichloroethane | <0.0057 | <0.0059 | <0.0052 | <0.0054 |
| 1,1,2,2-Tetrachloroethane | <0.0057 | <0.0059 | <0.0052 | <0.0054 |
| 1,1,2-Trichloro-1,2,2-Trifluoroethane | <0.0057 | <0.0059 | <0.0052 | <0.0054 |
| 1,1,2-Trichloroethane | <0.0057 | <0.0059 | <0.0052 | <0.0054 |
| 1,1-Dichloroethane | <0.0057 | <0.0059 | <0.0052 | <0.0054 |
| 1,1-Dichloroethene | <0.0057 | <0.0059 | <0.0052 | <0.0054 |
| 1,2,3-Trichloropropane | <0.0057 | <0.0059 | <0.0052 | <0.0054 |
| 1,2,4-Trichlorobenzene | <0.0057 | <0.0059 | <0.0052 | <0.0054 |
| 1,2,4-Trimethylbenzene | <0.0057 | <0.0059 | <0.0052 | <0.0054 |
| 1,2-Dibromo-3-chloropropane | <0.0057 | <0.0059 | <0.0052 | <0.0054 |
| 1,2-Dibromoethane | <0.0057 | <0.0059 | <0.0052 | <0.0054 |
| 1,2-Dichlorobenzene | <0.0057 | <0.0059 | <0.0052 | <0.0054 |
| 1,2-Dichloroethane | <0.0057 | <0.0059 | <0.0052 | <0.0054 |
| 1,2-Dichloropropane | <0.0057 | <0.0059 | <0.0052 | <0.0054 |
| 1,3,5-Trimethylbenzene | <0.0057 | <0.0059 | <0.0052 | <0.0054 |
| 1,3-Dichlorobenzene | <0.0057 | <0.0059 | <0.0052 | <0.0054 |
| 1,4-Dichlorobenzene | <0.0057 | <0.0059 | <0.0052 | <0.0054 |
| 1,4-Dioxane | <0.057 | <0.059 | <0.052 | <0.054 |
| 2-Butanone | <0.0057 | 0.16 | 0.019 | 0.014 |
| 2-Chlorotoluene | <0.0057 | <0.0059 | <0.0052 | <0.0054 |
| 4-Methyl-2-Pentanone | <0.0057 | <0.0059 | <0.0052 | <0.0054 |
| Acetone | <0.023 | 1.3 | 1.5 | 1.3 |
| Acetonitrile | <0.057 | <0.059 | <0.052 | <0.054 |
| Acrolein | <0.0057 | <0.0059 | <0.0052 | <0.0054 |
| Acrylonitrile | <0.0057 | <0.0059 | 0.006 | <0.0054 |
| Allyl chloride | <0.0057 | <0.0059 | <0.0052 | <0.0054 |
| Benzene | <0.0057 | 0.013 | <0.0052 | <0.0054 |
| Bromochloromethane | <0.0057 | <0.0059 | <0.0052 | <0.0054 |
| Bromodichloromethane | <0.0057 | <0.0059 | <0.0052 | <0.0054 |
| Bromoform | <0.0057 | <0.0059 | <0.0052 | <0.0054 |
| Bromomethane | <0.0057 | <0.0059 | <0.0052 | <0.0054 |
| Carbon Disulfide | <0.0057 | 0.012 | 0.0099 | <0.0054 |
| Carbon Tetrachloride | <0.0057 | <0.0059 | <0.0052 | <0.0054 |
| Chlorobenzene | <0.0057 | <0.0059 | <0.0052 | <0.0054 |
| Chlorodibromomethane | <0.0057 | <0.0059 | <0.0052 | <0.0054 |
| Chloroethane | <0.0057 | <0.0059 | <0.0052 | <0.0054 |
| Chloroform | <0.0057 | <0.0059 | <0.0052 | <0.0054 |
| Chloromethane | <0.0057 | <0.0059 | <0.0052 | <0.0054 |
| Chloroprene | <0.0057 | <0.0059 | <0.0052 | <0.0054 |
| cis-1,2-Dichloroethene | <0.0057 | <0.0059 | <0.0052 | <0.0054 |
| cis-1,3-Dichloropropene | <0.0057 | <0.0059 | <0.0052 | <0.0054 |
| Dibromomethane | <0.0057 | <0.0059 | <0.0052 | <0.0054 |
| Dichlorodifluoromethane | <0.0057 | <0.0059 | <0.0052 | <0.0054 |
| Dichlorofluoromethane | <0.0057 | <0.0059 | <0.0052 | <0.0054 |
| Ethyl Methacrylate | <0.0057 | <0.0059 | <0.0052 | <0.0054 |
| Ethylbenzene | <0.0057 | <0.0059 | <0.0052 | <0.0054 |
| Hexachlorobutadiene | <0.0057 | <0.0059 | <0.0052 | <0.0054 |
| Isobutyl alcohol | <0.057 | <0.059 | <0.052 | <0.054 |
| Isopropylbenzene | <0.0057 | <0.0059 | <0.0052 | <0.0054 |
| Methacrylonitrile | <0.057 | <0.059 | <0.052 | <0.054 |
| Methyl methacrylate | <0.0057 | <0.0059 | <0.0052 | <0.0054 |
| Methyl-tert-butyl ether | <0.0057 | <0.0059 | <0.0052 | <0.0054 |
| Methylene Chloride | <0.0057 | <0.0059 | <0.0052 | <0.0054 |
| n-Butylbenzene | <0.0057 | <0.0059 | <0.0052 | <0.0054 |
| n-Propylbenzene | <0.0057 | <0.0059 | <0.0052 | <0.0054 |
| Naphthalene | <0.0057 | <0.0059 | <0.0052 | <0.0054 |
| sec-Butylbenzene | <0.0057 | <0.0059 | <0.0052 | <0.0054 |
| Styrene | <0.0057 | <0.0059 | <0.0052 | <0.0054 |
| tert-Butylbenzene | <0.0057 | <0.0059 | <0.0052 | <0.0054 |
| Tetrachloroethene | <0.0057 | <0.0059 | <0.0052 | <0.0054 |
| Toluene | <0.0057 | <0.0059 | <0.0052 | <0.0054 |
| trans-1,2-Dichloroethene | <0.0057 | <0.0059 | <0.0052 | <0.0054 |
| trans-1,3-Dichloropropene | <0.0057 | <0.0059 | <0.0052 | <0.0054 |
| trans-1,4-Dichloro-2-butene | <0.0057 | <0.0059 | <0.0052 | <0.0054 |
| Trichloroethene | <0.0057 | <0.0059 | <0.0052 | <0.0054 |
| Trichlorofluoromethane | <0.0057 | <0.0059 | <0.0052 | <0.0054 |
| Vinyl Acetate | <0.0057 | <0.0059 | <0.0052 | <0.0054 |
| Vinyl Chloride | <0.0057 | <0.0059 | <0.0052 | <0.0054 |
| Total Xylene | <0.017 | <0.018 | <0.16 | <0.16 |

TABLE 10-continued

| Analyte | Bckgd | 16-201 As Drilled (mg/kg) | 16-202 (mg/kg) | 16-203 (mg/kg) |
|---|---|---|---|---|
| Diesel Range Organics | | | | |
| Diesel Range Organics | <100 | <120 | <100 | <100 |
| Oil Range Organics | <100 | <120 | <100 | <100 |
| GRO and BTEX | | | | |
| Gasoline Range Organics | <13 | <14 | <13 | <13 |

Figure 5A:
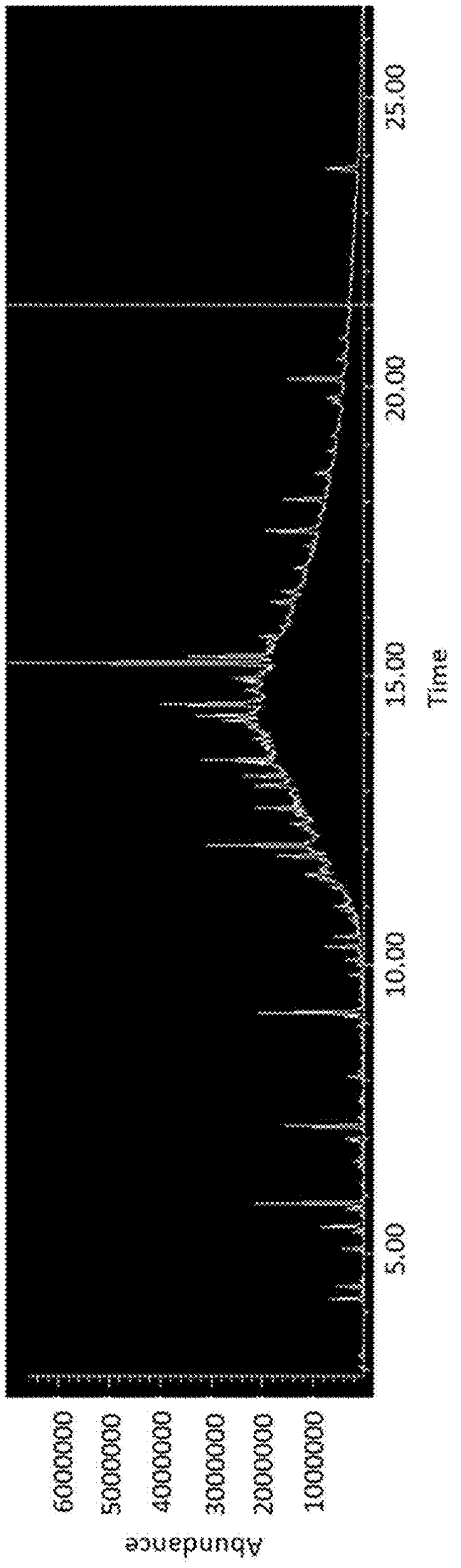
FIG. 5A is a GC/MS chromatograph showing peaks representative of SVOCs in the untreated “as-drilled” sample 16-201 of Example 5.
Figure 5B:
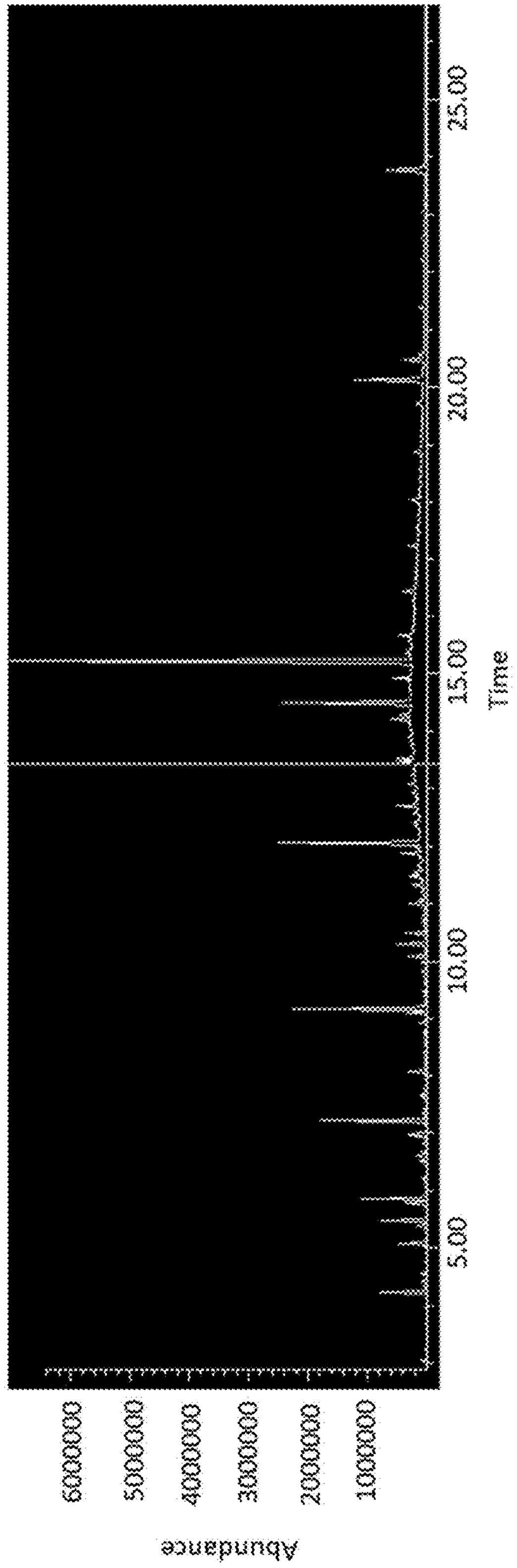
FIG. 5B is a GC/MS chromatograph showing peaks representative of SVOCs in one of the 16-202 and 16-203 samples of Example 5.

Chromatographs corresponding to Example 5 are provided in FIGS. 5A-6B. Specifically, FIG. 5A shows a GC/MS chromatograph of the semi-volatile organic compounds in the untreated "as is" sample. The peaks show a number of semi-volatile organic impurities detected in the sample. In contrast, FIG. 5B is a similar GC/MS chromatograph of one of the treated samples that has been subjected to a cleaning solution and method as described for Example 5. Here, the lack of a similar broad curve indicates the absence of many semi-volatile organic impurities in the sample.

Figure 6A:
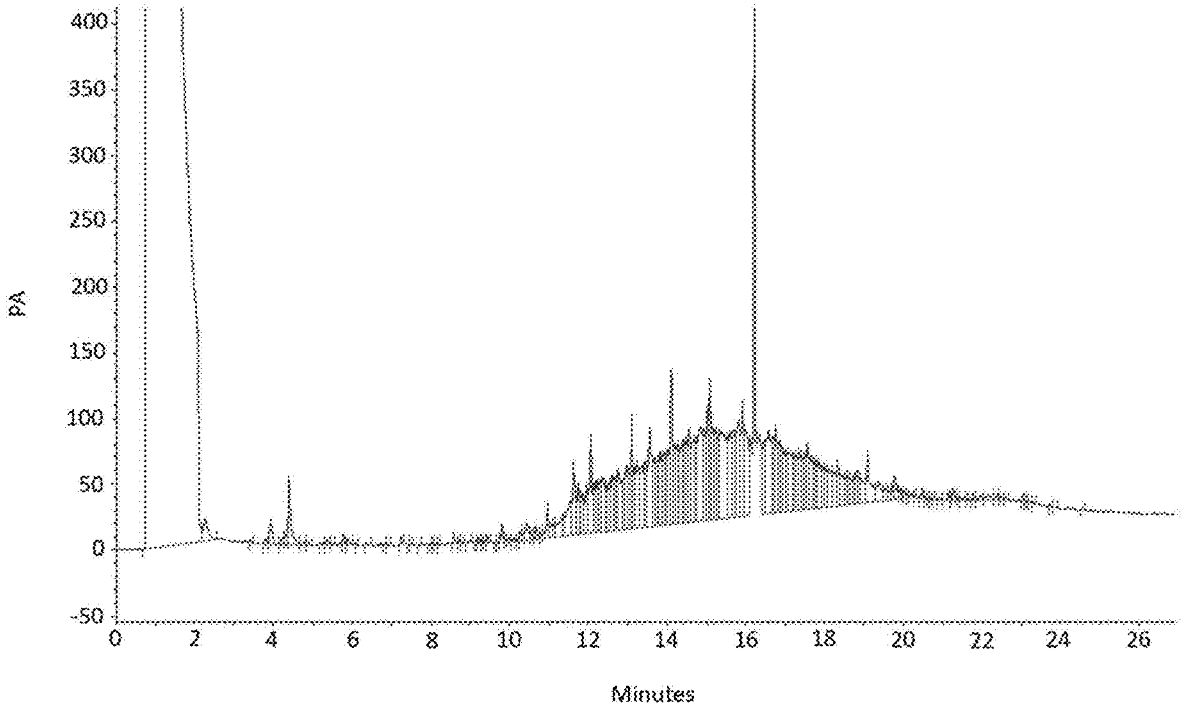
FIG. 6A is a GCFID chromatograph showing peaks representative of DROs in the untreated “as-drilled” sample 16-201 of Example 5.
Figure 6B:
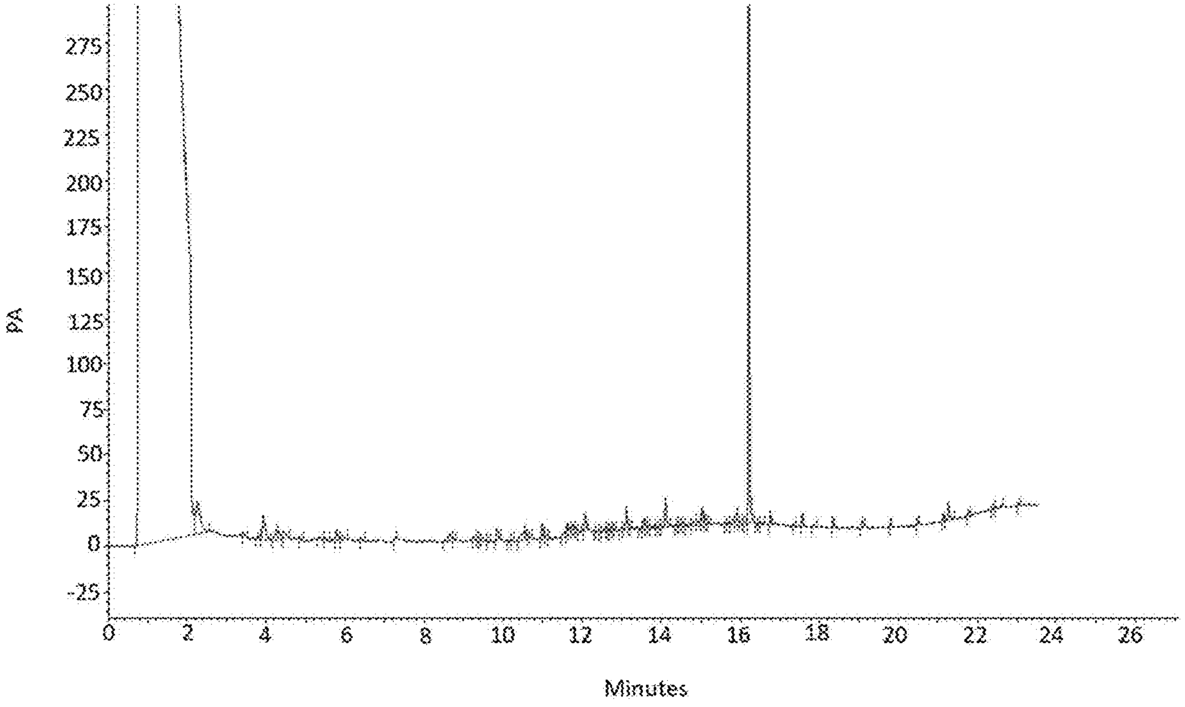
FIG. 6B is a GCFID chromatograph showing peaks representative of DROs in one of the 16-202 and 16-203 samples of Example 5.

FIGS. 6A and 6B are GCFID chromatographs showing peaks for DRO detected. FIG. 6A shows the GCFID chromatograph for the untreated "as is" sample, which shows many peaks overlapping, indicating many DRO present. In contrast, FIG. 6B shows a similar GCFID chromatograph for one of the treated samples that has been subjected to a cleaning solution and method as described for Example 5. Here, only a few DRO are detected, indicating a significant drop in the amount of DROs present after cleaning with the current cleaning solution and method.

These data show that the cleaning solutions having 1% surfactant and 0.75% viscosity agent or 1.75% surfactant and 0.75% viscosity agent are effective at removing contaminants from the drill cuttings, and specifically at removing difficult DROs. The cleaned samples [16-202] and [16-203] had levels similar to those found at the surface (Bckgd) rather than untreated drill cuttings coming from the depths of the well [16-201] "as drilled." Chlorides were also significantly reduced in the cleaned samples as compared to the untreated drill cuttings. Metals, which are present at higher levels in drill cuttings in general as compared to the background surface samples since they are from a different stratum far below the surface having different mineral composition that the surface, were also reduced as compared to the untreated drill cuttings. This supports a conclusion that the metals still found in the cleaned drill cuttings are likely to be native to the strata of the well depth from which they were taken, and thus are not "contaminants."

Example 6

These trials were performed on cuttings from a bakken shale drill site in North Dakota, using synthetic drill mud and diesel-based drilling fluids. Laboratory testing confirmed that these samples, when cleaned with a cleaning solution and method as described herein, also removed many of the contaminants.

In a first sample [16-702A], a 3.25% surfactant and 0.75% viscosity agent cleaning solution was used in cleaning the drill solids. 1600 grams of cutting drilled of bakken shale that was fluid drilled with synthetic mud were placed in a fine-mesh filter basket and submerged in the cleaning solution, specifically having 120 ounces plain tap water and 1% (32.0 ml) sodium laureth sulfate, 1% (32.0 ml) sodium lauryl sulfate, 1% (32.0 ml) lauramine oxide, ¼% (8.0 ml) PEG-8 propylheptyl ether, ¼% (8.0 ml) PEI-14 PEG-10/PPG-7 copolymer, ¼% (8.0 ml) PPG-26 polypropylene glycol at 77.6° F. in a Yescom Model PS-30A ultrasonic cleaner (having a 6 liter (203 oz.) cleaning tank and rated at 180 watts of ultrasonic cleaning power). Ultrasonic energy was applied to the solution and drill cuttings for 5 minutes. After the cleaning period the cuttings were removed from solution, placed in a sample jar and refrigerated. Post-trial observations revealed that the cleaning solution became a clouded dark brown to light gray color. The bottom of the cleaning tank was not visible through the used solution. The dried drill cuttings were observed to be a light to medium gray color, compared to the black/brown color of the pre-trial cuttings. The post-trial cuttings had no discernable odor after the cleaning process, despite exhibiting an odor consistent with fluids used in the drilling process before treatment.

In a second sample [16-702B], a 17% surfactant and 6% viscosity agent cleaning solution was used. 1600 grams of cutting drilled of bakken shale that was fluid drilled with diesel-based mud were placed in a fine-mesh filter basket and submerged in the cleaning solution, specifically having 120 ounces plain tap water and 5% (160.0 ml) sodium laureth sulfate, 5% (160.0 ml) sodium lauryl sulfate, 5% (160.0 ml) lauramine oxide, 2% (16.0 ml) PEG-8 propylheptyl ether, 2% (16.0 ml) PEI-14 PEG-10/PPG-7 copolymer, 2% (16.0 ml) PPG-26 polypropylene glycol at 78.0° F. in a Yescom Model PS-30A ultrasonic cleaner (having a 6 liter (203 oz.) cleaning tank and rated at 180 watts of ultrasonic cleaning power). Ultrasonic energy was applied to the solution and drill cuttings for 5 minutes. After the cleaning period the cuttings were removed from solution, placed in a sample jar and refrigerated. Post-trial observations revealed that the cleaning solution became a clouded dark brown to light gray color. The bottom of the cleaning tank was not visible through the used solution. The dried drill cuttings were observed to be a light to medium gray color, compared to the black/brown color of the pre-trial cuttings. The post-trial cuttings had no discernable odor after the cleaning process, despite exhibiting an odor consistent with fluids used in the drilling process before treatment.

The samples 16-702A and corresponding untreated "as-drilled" synthetic mud control taken from the same well [16-701A], and sample 16-702B and corresponding untreated "as-drilled" diesel-based mud control taken from the same well [16-701B], were tested for the following: metals (using EPA 7473 and EPA 6010 protocols), solids (using SM 4500-CN I protocol), inorganic solids (using EPA 9056A protocol), alcohols (using EPA 8015 protocol), glycols (using EPA 8015 protocol), herbicides (using EPA 8151 protocol), PCBs (using EPA 8082A protocol), pesticides (using EPA 8081B protocol), semi-volatile organic compounds (using EPA 8270 protocol), and low level solid volatile organic compounds (VOCs) (using EPA 8260 protocol), as well as diesel range organics (using EPA 8015 protocol) and gasoline range organics (GRO) and BTEX (using EPA 8260 protocol). The results of these tests can be found in Table 11.

TABLE 11

| Analyte | 16-701A As Drilled-synthetic (mg/kg) | 16-702A synthetic (mg/kg) | 16-701B As Drilled-diesel (mg/kg) | 16-702B diesel (mg/kg) |
|---|---|---|---|---|
| Mercury | <0.010 | <0.010 | <0.010 | <0.010 |
| Weak Acid Dissociable Cyanide | <2.6 | <2.9 | <2.3 | <2.3 |
| Solids | | | | |
| Chloride | 24100 | 751 | 8630 | 1340 |
| Nitrate Nitrogen | 5.1 | 2.3 | 1.3 | 0.7 |
| Nitrite Nitrogen | <0.5 | 1 | <0.5 | <0.5 |
| Sulfate | 2800 | 1790 | 445 | 2900 |
| Total Metals | | | | |
| Antimony | <2.0 | <2.0 | <2.0 | 2 |
| Arsenic | 8.9 | 8.2 | 5.6 | 6.8 |
| Barium | 2300 | 3700 | 1580 | 2840 |
| Beryllium | 0.28 | 0.4 | 0.32 | 0.25 |
| Boron | 69.4 | 25.6 | 66.9 | 48 |
| Cadmium | <0.2 | <0.2 | <0.2 | <0.2 |
| Chromium | 18.1 | 14.6 | 33.8 | 44.7 |
| Cobalt | 5.5 | 5.2 | 6.4 | 7.8 |
| Copper | 58.7 | 33.6 | 79.3 | 82 |
| Lead | 8.2 | 9.6 | 5.8 | 13.6 |
| Manganese | 418 | 420 | 371 | 1110 |
| Nickel | 19.5 | 19.9 | 18.5 | 27.9 |
| Selenium | <2.0 | <2.0 | <2.0 | 3.1 |
| Silver | <0.5 | <0.5 | <0.5 | <0.5 |
| Sulfur as Sulfate | 23000 | 18300 | 29700 | 19400 |
| Thallium | <2.0 | <2.0 | <2.0 | <2.0 |
| Tin | <10 | <10 | <10 | <10 |
| Vanadium | 12.6 | 21.7 | 12.6 | 22 |
| Zinc | 39.4 | 49.5 | 74.2 | 115 |
| Alcohol-Methanol | 78 | <72 | <59 | not detected |
| Glycol-Ethylene Glycol | 90 | <72 | <59 | not detected |
| Herbicides | | | | |
| 2,4,5-T | <0.00652 | <0.0144 | <0.0117 | not detected |
| 2,4-D | <0.00652 | <0.0144 | <0.0117 | not detected |
| Dinoseb | <0.00652 | <0.0144 | <0.0117 | not detected |
| Silvex | <0.00652 | <0.0144 | <0.0117 | not detected |
| PCBs | | | | |
| PCB 1016 | <0.065 | <0.072 | <0.059 | <0.056 |
| PCB 1221 | <0.065 | <0.072 | <0.059 | <0.056 |
| PCB 1232 | <0.065 | <0.072 | <0.059 | <0.056 |
| PCB 1242 | <0.065 | <0.072 | <0.059 | <0.056 |
| PCB 1248 | <0.065 | <0.072 | <0.059 | <0.056 |
| PCB 1254 | <0.065 | <0.072 | <0.059 | <0.056 |
| PCB 1260 | <0.065 | <0.072 | <0.059 | <0.056 |
| Pesticides | | | | |
| Aldrin | <0.0816 | <0.0902 | <0.0733 | <0.0698 |
| Alpha BHC | <0.0816 | <0.0902 | <0.0733 | <0.0698 |
| Alpha Endosulfan | <0.0816 | <0.0902 | <0.0733 | <0.0698 |
| Beta BHC | <0.0816 | <0.0902 | <0.0733 | <0.0698 |
| Beta Endosulfan | <0.0816 | <0.0902 | <0.0733 | <0.0698 |
| Chlordane | <1.63 | <1.8 | <1.47 | <1.4 |
| DDD | <0.0816 | <0.0902 | <0.0733 | <0.0698 |
| DDE | <0.0816 | <0.0902 | <0.0733 | <0.0698 |
| DDT | <0.0816 | <0.0902 | <0.0733 | <0.0698 |
| Delta BHC | <0.0816 | <0.0902 | <0.0733 | <0.0698 |
| Dieldrin | <0.0816 | <0.0902 | <0.0733 | <0.0698 |
| Endosulfan Sulfate | <0.0816 | <0.0902 | <0.0733 | <0.0698 |
| Endrin | <0.0816 | <0.0902 | <0.0733 | <0.0698 |
| Gamma BHC (Lindane) | <0.0815 | <0.0902 | <0.0733 | <0.0698 |
| Heptachlor | <0.0816 | <0.0902 | <0.0733 | <0.0698 |
| Heptachlor epoxide | <0.0816 | <0.0902 | <0.0733 | <0.0698 |
| Methoxychlor | <0.0816 | <0.0902 | <0.0733 | <0.0698 |
| Toxaphene | <3.26 | <3.61 | <2.93 | <2.79 |
| Semi-Volatile Solid Compounds (VOCs) | | | | |
| 1,1-Biphenyl | 9.2 | <4.8 | <20 | not detected |
| 1,2,4,5-Tetrachlorobenzene | <4.3 | <4.8 | <3.9 | not detected |

TABLE 11-continued

| Analyte | 16-701A As Drilled-synthetic (mg/kg) | 16-702A synthetic (mg/kg) | 16-701B As Drilled-diesel (mg/kg) | 16-702B diesel (mg/kg) |
|---|---|---|---|---|
| 1,3-Dinitrobenzene | <4.3 | <4.8 | <20 | not detected |
| 1-Naphthylamine | <4.3 | <4.8 | <20 | not detected |
| 2,3,4,6-Tetrachlorophenol | <8.7 | <9.6 | <39 | not detected |
| 2,4,5-Trichlorophenol | <4.3 | <4.8 | <20 | not detected |
| 2,4,6-Trichlorophenol | <4.3 | <4.8 | <20 | not detected |
| 2,4-Dichlorophenol | <4.3 | <4.8 | <3.9 | not detected |
| 2,4-Dimethylphenol | <4.3 | <4.8 | <3.9 | not detected |
| 2,4-Dinitrophenol | <22 | <24 | <98 | not detected |
| 2,4-Dinitrotoluene | <4.3 | <4.8 | <20 | not detected |
| 2,6-Dinitrotoluene | <4.3 | <4.8 | <20 | not detected |
| 2-Acetylaminofluorene | <8.7 | <9.6 | <7.8 | not detected |
| 2-Chloro-Naphthalene | <4.3 | <4.8 | <20 | not detected |
| 2-Chlorophenol | <4.3 | <4.8 | <3.9 | not detected |
| 2-Methylnaphthalene | 27 | 8.3 | 130 | not detected |
| 2-Methylphenol | <4.3 | <4.8 | <3.9 | not detected |
| 2-Naphthylamine | <4.3 | <4.8 | <20 | not detected |
| 2-Nitroaniline | <22 | <24 | <98 | not detected |
| 2-Nitrophenol | <4.3 | <4.8 | <3.9 | not detected |
| 3,3-Dichlorobenzidine | <8.7 | <9.6 | <7.8 | not detected |
| 3-Methylphenol | <4.3 | <4.8 | <20 | not detected |
| 3-Nitroaniline | <4.3 | <4.8 | <20 | not detected |
| 4-Aminobiphenyl | <4.3 | <4.8 | <20 | not detected |
| 4-Chloro-3-methylphenol | <4.3 | <4.8 | <3.9 | not detected |
| 4-Chloroaniline | <4.3 | <4.8 | <3.9 | not detected |
| 4-Methylphenol | <4.3 | <4.8 | <20 | not detected |
| 4-Nitroaniline | <4.3 | <4.8 | <20 | not detected |
| 4-Nitrophenol | <4.3 | <4.8 | <20 | not detected |
| Acenaphthene | <4.3 | <4.8 | <20 | not detected |
| Acenaphthylene | <4.3 | <4.8 | <20 | not detected |
| Acetophenone | <4.3 | <4.8 | <3.9 | not detected |
| Anthracene | <4.3 | <4.8 | <20 | not detected |
| Atrazine | <4.3 | <4.8 | <20 | not detected |
| Benzidine | <4.3 | <4.8 | <3.9 | not detected |
| Benzo(a)anthracene | <4.3 | <4.8 | <3.9 | not detected |
| Benzo(a)pyrene | <4.3 | <4.8 | <20 | not detected |
| Benzo(b)fluoranthene | <4.3 | <4.8 | <20 | not detected |
| Benzo(g,h,i)perylene | <4.3 | <4.8 | <20 | not detected |
| Benzo(k)fluoranthene | <4.3 | <4.8 | <20 | not detected |
| Benzoic acid | <87 | <96 | <78 | not detected |
| Benzyl Alcohol | <4.3 | <4.8 | <3.9 | not detected |
| bis(2-Chloroethyl)ether | <4.3 | <4.8 | <3.9 | not detected |
| bis(2-Chloroisopropyl)ether | <4.3 | <4.8 | <3.9 | not detected |
| bis(2-Ethylhexyl)phthalate | <4.3 | <4.8 | <3.9 | not detected |
| Butyl benzylphthalate | <4.3 | <4.8 | <3.9 | not detected |
| Carbazole | <4.3 | <4.8 | <20 | not detected |
| Chlorobenzilate | <4.3 | <4.8 | <20 | not detected |
| Chrysene | <4.3 | <4.8 | <3.9 | not detected |
| Di-N-Butyl Phthalate | <4.3 | <4.8 | <20 | not detected |
| Di-N-Octylphthalate | <4.3 | <4.8 | <20 | not detected |
| Dibenzo(a,h)anthracene | <4.3 | <4.8 | <20 | not detected |
| Diethyl Phthalate | <4.3 | <4.8 | <20 | not detected |
| Dimethoate | <4.3 | <4.8 | <20 | not detected |
| Diphenylamine | <4.3 | <4.8 | <20 | not detected |
| Disulfoton | <4.3 | <4.8 | <20 | not detected |
| Fluoranthene | <4.3 | <4.8 | <20 | not detected |
| Fluorene | <4.3 | <4.8 | <20 | not detected |
| Hexachlorobenzene | <4.3 | <4.8 | <20 | not detected |
| Hexachlorocyclopentadiene | <4.3 | <4.8 | <20 | not detected |
| Hexachloroethane | <4.3 | <4.8 | <3.9 | not detected |
| Indeno(1,2,3-cd)pyrene | <4.3 | <4.8 | <20 | not detected |
| Isophorone | <4.3 | <4.8 | <3.9 | not detected |
| Kepone | <43 | <48 | <39 | not detected |
| Methyl Methanesulfonate | <4.3 | <4.8 | <3.9 | not detected |
| Methyl Parathion | <4.3 | <4.8 | <20 | not detected |
| N-Nilrosodibutylamine | <4.3 | <4.8 | <3.9 | not detected |
| N-Nitrosodiethylamine | <4.3 | <4.8 | <3.9 | not detected |
| n-Nitrosodimethylamine | <4.3 | <4.8 | <3.9 | not detected |
| n-Nitrosodiphenylamine | <4.3 | <4.8 | <20 | not detected |
| N-nitrosodipropylamine | <4.3 | <4.8 | <3.9 | not detected |
| Nitrobenzene | <4.3 | <4.8 | <3.9 | not detected |
| o-Toluidine | <4.3 | <4.8 | <3.9 | not detected |
| p-Dimethylaminoazobenzene | <4.3 | <4.8 | <3.9 | not detected |
| Parathion | <4.3 | <4.8 | <20 | not detected |
| Pentachlorobenzene | <4.3 | <4.8 | <20 | not detected |
| Pentachloronitrobenzene | <4.3 | <4.8 | <20 | not detected |

TABLE 11-continued

| Analyte | 16-701A As Drilled-synthetic (mg/kg) | 16-702A synthetic (mg/kg) | 16-701B As Drilled-diesel (mg/kg) | 16-702B diesel (mg/kg) |
|---|---|---|---|---|
| Pentachlorophenol | <4.3 | <4.8 | <20 | not detected |
| Phenacetin | <4.3 | <4.8 | <20 | not detected |
| Phenanthrene | 8.5 | <4.8 | 54 | not detected |
| Phenol | <4.3 | <4.8 | <3.9 | not detected |
| Phorate | <4.3 | <4.8 | <20 | not detected |
| Pronamide | <4.3 | <4.8 | <20 | not detected |
| Pyrene | <4.3 | <4.8 | <3.9 | not detected |
| Pyridine | <22 | <24 | <20 | not detected |
| Diallate | <4.3 | <4.8 | <20 | not detected |
| Low Level Solid VOCs | | | | |
| 1,1,1,2-Tetrachloroethane | <0.16 | <0.18 | <0.15 | <0.14 |
| 1,1,1-Trichloroethane | <0.16 | <0.18 | <0.15 | <0.14 |
| 1,1,2,2-Tetrachloroethane | <0.16 | <0.18 | <0.15 | <0.14 |
| 1,1,2-Trichloro-1,2,2-Trifluoroethane | <0.81 | <0.89 | <0.73 | <0.7 |
| 1,1,2-Trichloroethane | <0.16 | <0.18 | <0.15 | <0.14 |
| 1,1-Dichloroethane | <0.16 | <0.18 | <0.15 | <0.14 |
| 1,1-Dichloroethene | <0.16 | <0.18 | <0.15 | <0.14 |
| 1,2,3-Trichloropropane | <0.16 | <0.18 | <0.15 | <0.14 |
| 1,2,4-Trichlorobenzene | <0.16 | <0.18 | <0.15 | <0.14 |
| 1,2,4-Trimethylbenzene | 32 | 6.5 | 14 | 2.3 |
| 1,2-Dibromo-3-chloropropane | <0.81 | <0.18 | <0.73 | <0.7 |
| 1,2-Dibromoethane | <0.16 | <0.18 | <0.15 | <0.14 |
| 1,2-Dichlorobenzene | <0.16 | <0.18 | <0.15 | <0.14 |
| 1,2-Dichloroethane | <0.16 | <0.18 | <0.15 | <0.14 |
| 1,2-Dichloropropane | <0.16 | <0.18 | <0.15 | <0.14 |
| 1,3,5-Trimethylbenzene | 6.8 | 1.4 | 3.7 | 0.6 |
| 1,3-Dichlorobenzene | <0.16 | <0.18 | <0.15 | <0.14 |
| 1,4-Dichlorobenzene | <0.16 | <0.18 | <0.15 | <0.14 |
| 1,4-Dioxane | <8.1 | <8.9 | <0.15 | <7.0 |
| 2-Butanone | <0.81 | <0.089 | <0.73 | <0.7 |
| 2-Chlorotoluene | <0.16 | <0.18 | <0.15 | <0.14 |
| 2-Methyl-1-propanol | <8.1 | <8.9 | <0.73 | <7.0 |
| 3-Chloro-1-Propene | <0.16 | <0.18 | <0.15 | <0.14 |
| 4-Methyl-2-Pentanone | <0.16 | <0.18 | <0.15 | <0.14 |
| Acetone | 5 | <1.8 | <1.5 | <1.4 |
| Acetonitrile | <3.2 | <3.6 | <2.9 | <2.8 |
| Acrolein | <1.6 | <1.8 | <1.5 | <1.4 |
| Acrylonitrile | <0.81 | 0.89 | <0.73 | <0.7 |
| Benzene | 0.34 | <0.18 | 0.16 | <0.14 |
| Bromochloromethane | <0.16 | <0.18 | <0.15 | <0.14 |
| Bromodichloromethane | <0.16 | <0.18 | <0.15 | <0.14 |
| Bromoform | <0.16 | <0.18 | <0.15 | <0.14 |
| Bromomethane | <0.16 | <0.18 | <0.15 | <0.14 |
| Carbon Disulfide | <0.16 | <0.18 | <0.15 | <0.14 |
| Carbon Tetrachloride | <0.16 | <0.18 | <0.15 | <0.14 |
| Chlorobenzene | <0.16 | <0.18 | <0.15 | <0.14 |
| Chlorodibromomethane | <0.16 | <0.18 | <0.15 | <0.14 |
| Chloroethane | <0.16 | <0.18 | <0.15 | <0.14 |
| Chloroform | <0.16 | <0.18 | <0.15 | <0.14 |
| Chloromethane | <0.16 | <0.18 | <0.15 | <0.14 |
| Chloroprene | <0.16 | <0.18 | <0.15 | <0.14 |
| cis-1,2-Dichloroethene | <0.16 | <0.18 | <0.15 | <0.14 |
| cis-1,3-Dichloropropene | <0.16 | <0.18 | <0.15 | <0.14 |
| Dibromomethane | <0.16 | <0.18 | <0.15 | <0.14 |
| Dichlorodifluoromethane | <0.16 | <0.18 | <0.15 | <0.14 |
| Dichlorofluoromethane | <0.16 | <0.18 | <0.15 | <0.14 |
| Ethyl Methacrylate | <0.16 | <0.18 | <0.15 | <0.14 |
| Ethylbenzene | 1 | <0.18 | 0.7 | <0.14 |
| Hexachlorobutadiene | <0.16 | <0.18 | <0.15 | <0.14 |
| Isopropylbenzene | 0.89 | <0.18 | 0.55 | <0.14 |
| Methacrylonitrile | <1.6 | <1.8 | <1.5 | <1.4 |
| Methyl methacrylate | <1.6 | <0.18 | <0.15 | <0.14 |
| Methylene Chloride | <1.6 | <0.18 | <0.15 | <0.14 |
| Methyl-tert-butyl ether | <1.6 | <0.18 | <0.15 | <0.14 |
| Naphthalene | 2.9 | <0.18 | 5.4 | <0.14 |
| n-Butylbenzene | 6.9 | 2 | 3.5 | 0.84 |
| n-Propylbenzene | 2.7 | 0.51 | 1.4 | 0.2 |
| sec-Butylbenzene | 4.8 | 1.2 | 2.3 | <0.14 |
| Styrene | <1.6 | <0.18 | <0.15 | <0.14 |
| tert-Butylbenzene | <1.6 | <0.18 | <0.15 | <0.14 |
| Tetrachloroethene | <1.6 | <0.18 | <0.15 | <0.14 |
| Toluene | 1.8 | <0.18 | 1.1 | <0.14 |
| trans-1,2-Dichloroethene | <1.6 | <0.18 | <0.15 | <0.14 |

TABLE 11-continued

| Analyte | 16-701A As Drilled-synthetic (mg/kg) | 16-702A synthetic (mg/kg) | 16-701B As Drilled-diesel (mg/kg) | 16-702B diesel (mg/kg) |
|---|---|---|---|---|
| trans-1,3-Dichloropropene | <1.6 | <0.18 | <0.15 | <0.14 |
| trans-1,4-Dichloro-2-butene | <0.32 | <0.36 | <0.29 | <0.28 |
| Trichloroethene | <1.6 | <0.18 | <0.15 | <0.14 |
| Trichlorofluoromethane | <1.6 | <0.18 | <0.15 | <0.14 |
| Vinyl Acetate | <1.6 | <0.18 | <0.15 | <0.14 |
| Vinyl Chloride | <1.6 | <0.18 | <0.15 | <0.14 |
| Total Xylene | 8.1 | 0.78 | 6 | 0.98 |
| Diesel Range Organics | | | | |
| Diesel Range Organics | 57000 | 24000 | 55000 | not detected |
| Oil Range Organics | <2600 | <1400 | <2300 | <11000 |
| GRO and BTEX | | | | |
| Gasoline Range Organics | 760 | 150 | 360 | 41 |

Figure 7A:
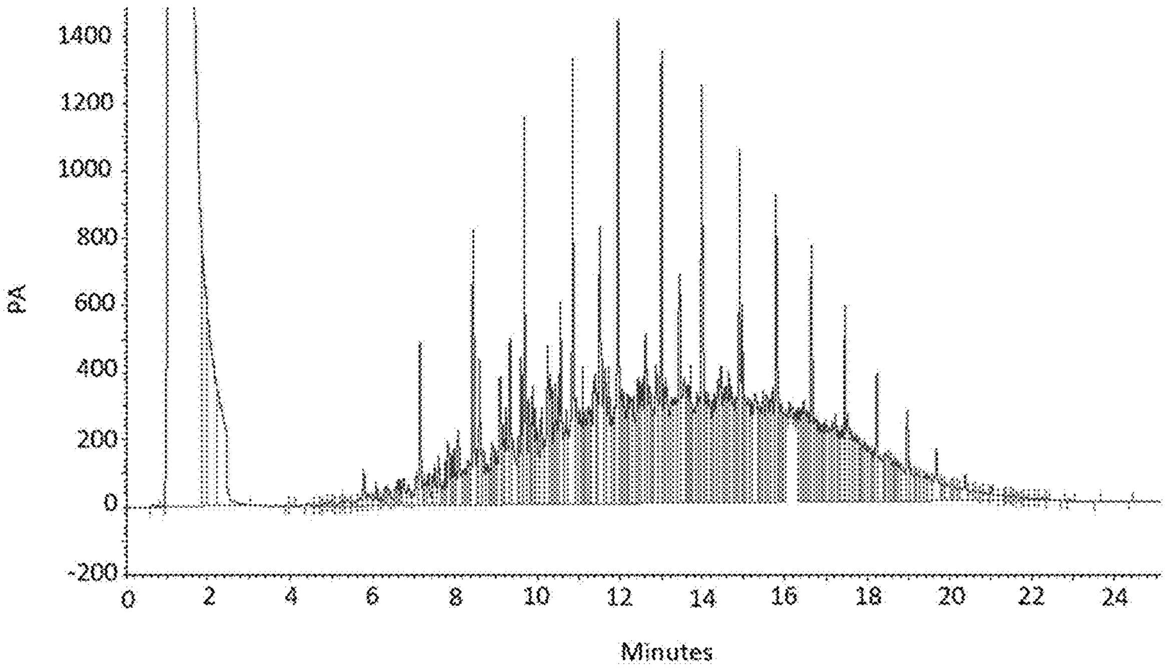
FIG. 7A is a GCFID chromatograph showing peaks representative of DROs in untreated “as is” sample 16-701A in which synthetic drilling mud was used of Example 6.
Figure 7B:
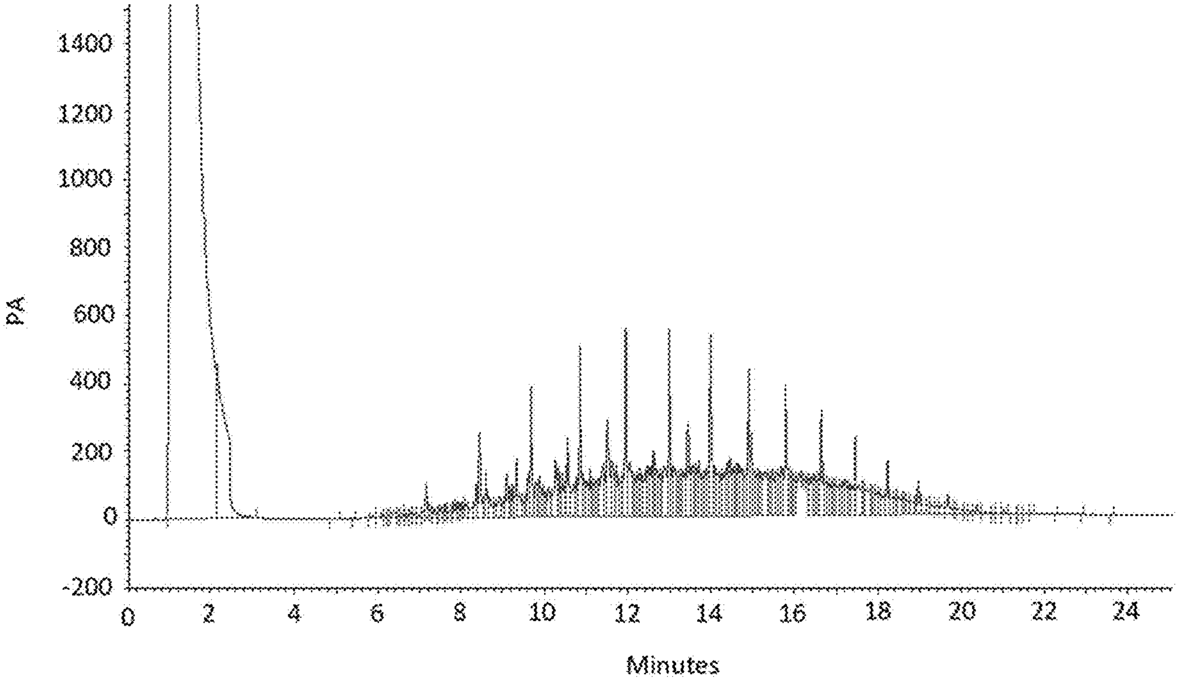
FIG. 7B is a GCFID chromatograph showing peaks representative of DROs in treated sample 16-702A as described in Example 6.
Figure 8A:
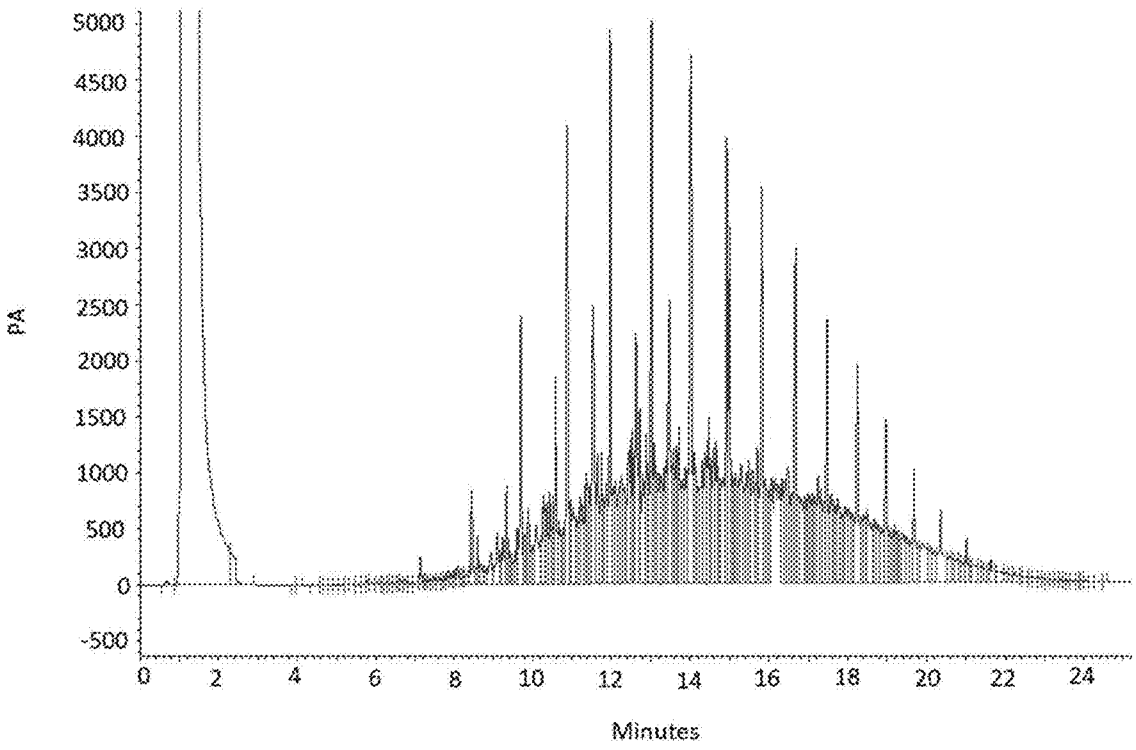
FIG. 8A is a GCFID chromatograph showing peaks representative of DROs in the untreated “as is” sample 16-701B of Example 6 in which an oily drilling mud was used.
Figure 8B:
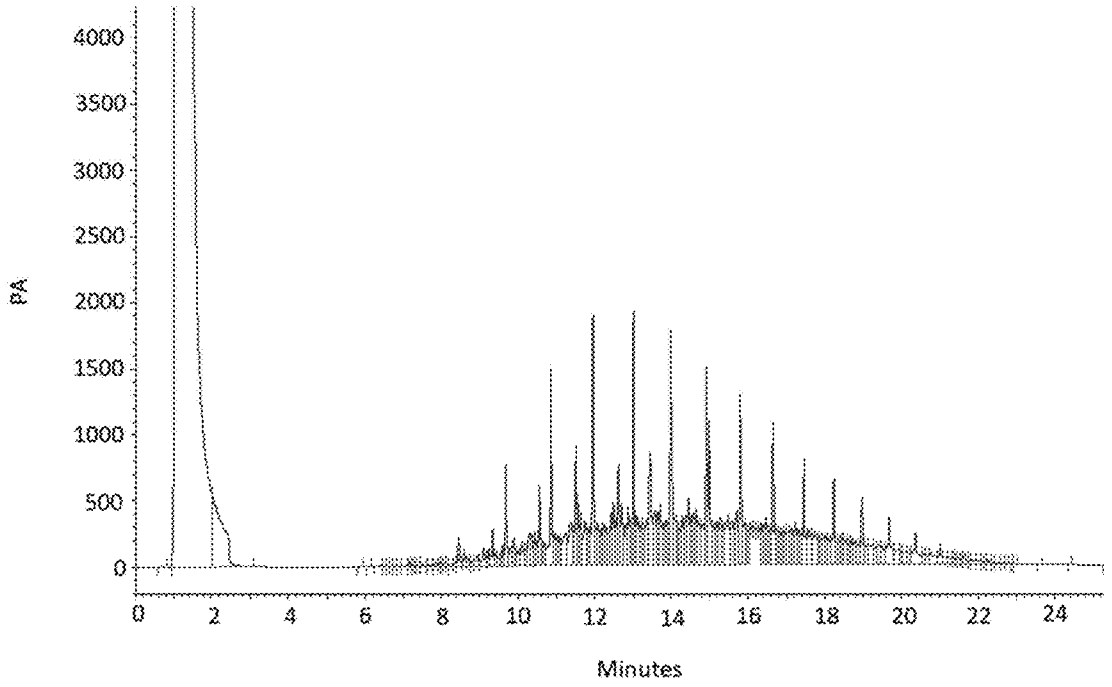
FIG. 8B is a GCFID chromatograph showing peaks representative of DROs in sample 16-702B as described in Example 6.

Chromatographs corresponding to Example 6 are provided in FIGS. 7A-9C. Specifically, FIGS. 7A-8B are chromatographs showing peaks for DRO detected. FIG. 7A shows a GCFID chromatograph for the untreated "as is" sample 16-701A in which synthetic drilling mud was used. It shows many peaks overlapping, indicating many DROs present. In contrast, FIG. 7B shows a similar GCFID chromatograph for the sample 16-702A as described for Example 6. Here, far fewer DROs are detected, indicating a significant drop in the amount of DROs present after cleaning with the current cleaning solution and method. Similarly, FIG. 8A shows a GCFID chromatograph for the untreated "as is" sample 16-701B in which an oily drilling mud was used. It shows fewer peaks than the synthetic drilling mud control, but still many overlapping peaks indicating many DROs present. In FIG. 8B, the sample 16-702B as described for Example 6 is shown in a GCFID chromatograph. Here, fewer DROs are detected (as is evident from the increase in scale for FIG. 8B as compared to control FIG. 8A), indicating a significant drop in the amount of DROs present after cleaning with the current cleaning solution and method.

Figure 9A:
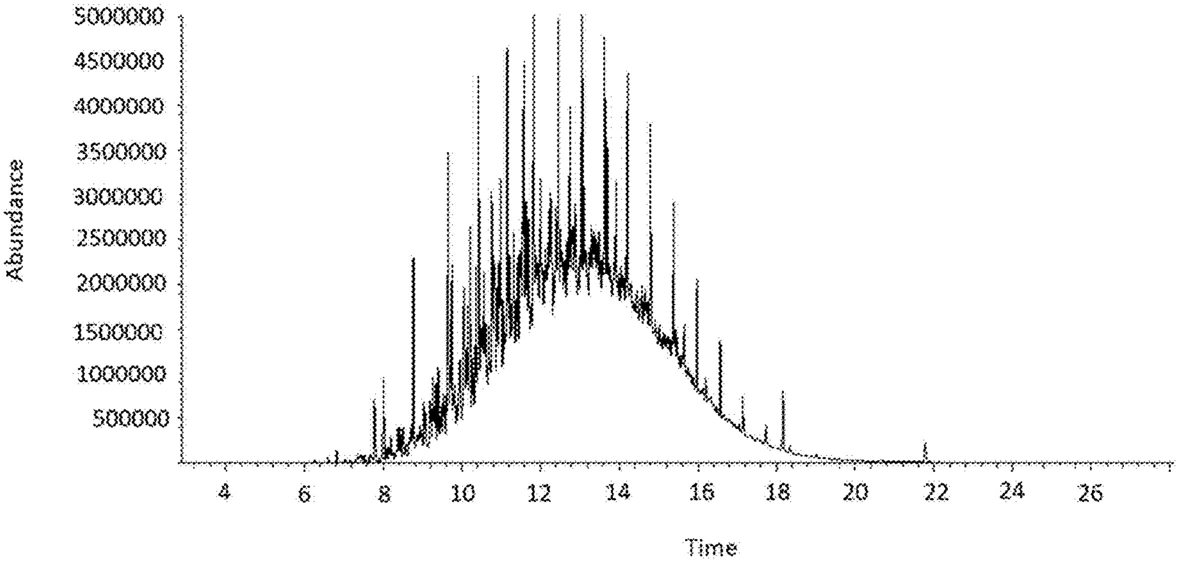
FIG. 9A is a GC/MS chromatograph showing peaks representative of SVOCs in the untreated “as is” synthetic mud sample 16-701A of Example 6.
Figure 9B:
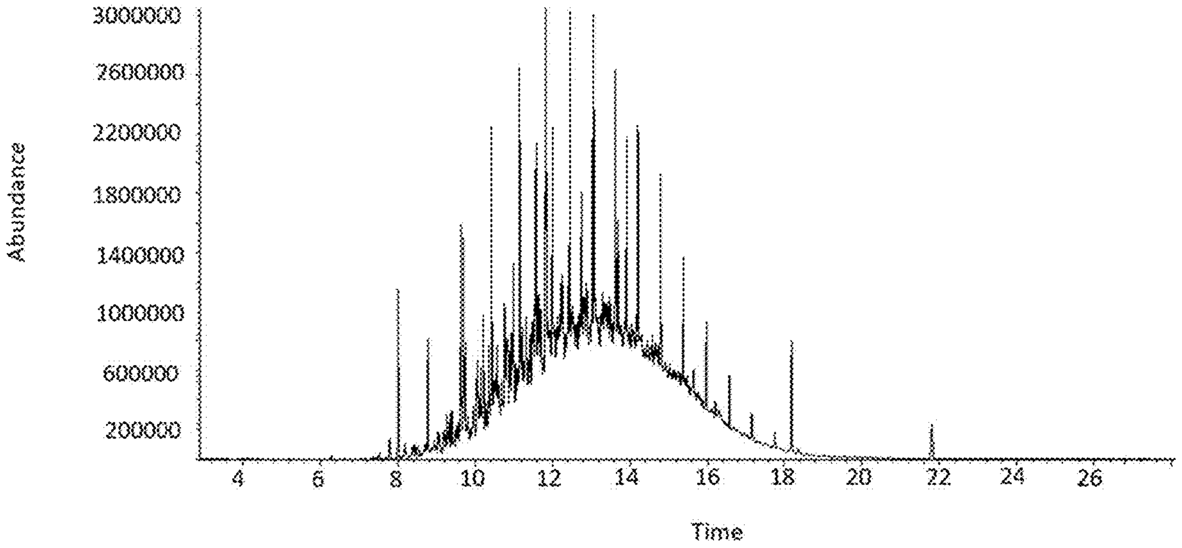
FIG. 9B is a GC/MS chromatograph showing peaks representative of SVOCs in the treated sample 16-702A of Example 6.
Figure 9C:
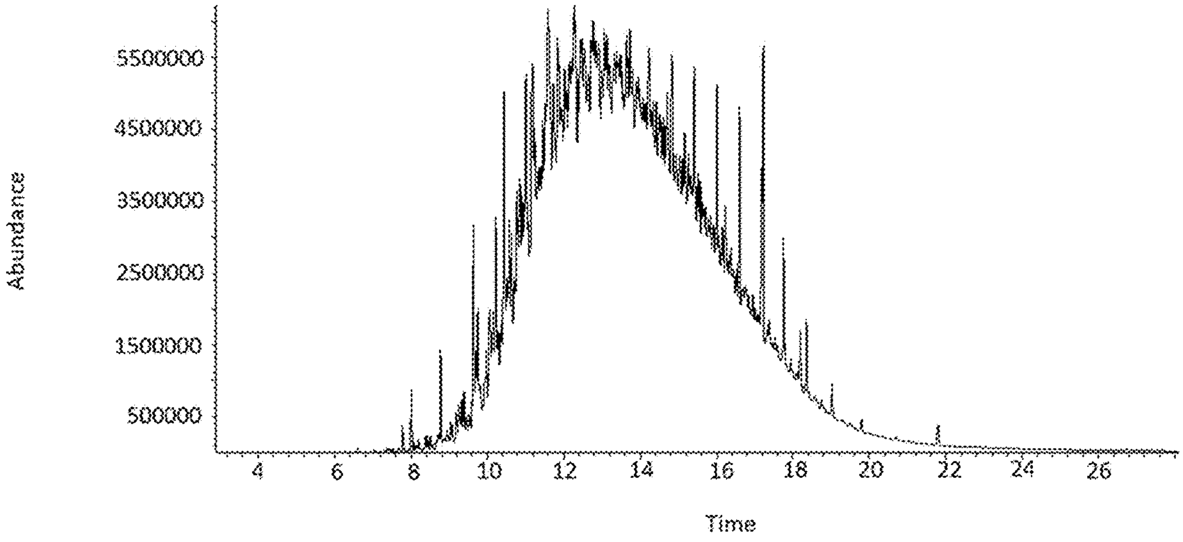
FIG. 9C is a GC/MS chromatograph showing peaks representative of SVOCs in the untreated “as is” diesel-based mud sample 16-701B of Example 6.

FIG. 9A shows a GC/MS chromatograph of the semi-volatile organic compounds (SVOCs) in the untreated "as is" synthetic mud sample 16-701A. The peaks show a number of semi-volatile organic impurities detected in the sample. In contrast, FIG. 9B is a similar GC/MS chromatograph of the corresponding treated sample 16-702A that has been subjected to a cleaning solution and method as described for Example 6. Here, the peak abundance of any of the peaks is far lower than in FIG. 9A, indicating less semi-volatile organic impurities in the treated sample. FIG. 9C shows a GC/MS chromatograph of the semi-volatile organic compounds in the untreated "as is" diesel-based mud sample 16-701B, also showing a number of peaks with similar abundance levels compared to the synthetic mud control 16-701A, indicating similar levels of semi-volatile organic impurities detected in the control.

Figure 10:
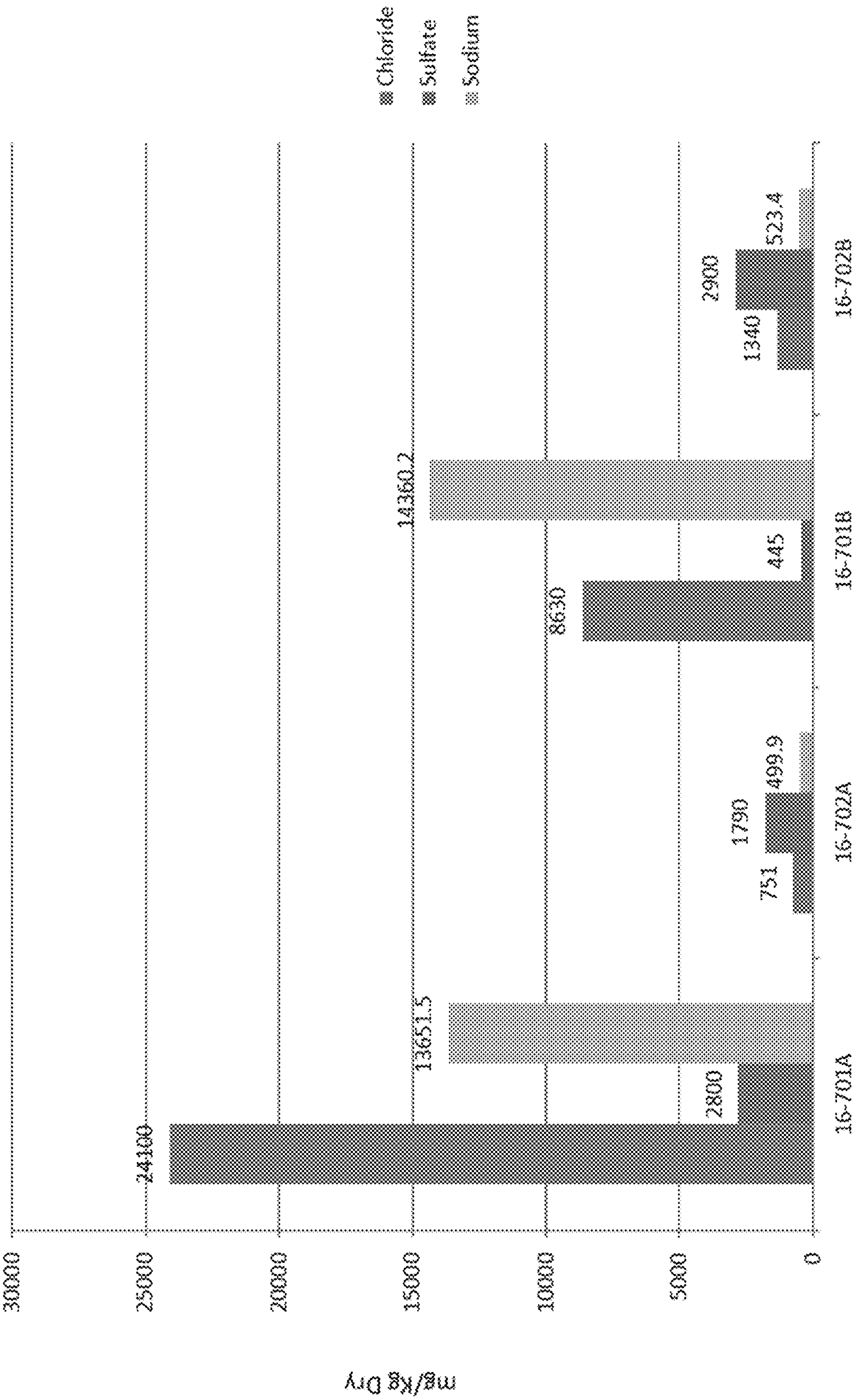
FIG. 10 is a graphical representation of the amounts of chlorides, sulfates and sodium found in each of the samples of Example 6.

FIG. 10 is a graph of the leachable amounts of chloride, sulfate and sodium in the treated samples (16-702A and 16-702B) as compared to their control untreated "as drilled" counterparts (16-701A and 16-701B, respectively).

The testing results show that even when synthetic or diesel-based drilling muds are used, the drill solids can still be effectively cleaned with the present method to reduce the level of DRO and semi-volatile organic compounds, making the drill solids safer for the environment. Synthetic or diesel-based drilling muds often introduce more contaminants than air drilling, many of which are organics and DROs that can be difficult to remove. The data here show that even with these increased levels of contaminants, the cleaning solution and method still provides substantial cleaning, particularly with respect to chlorides, sulfates, DROs, GRO and many of the organic compounds.

Example 7

To test for whether the cleaning solution and method are capable of cleaning to beneficial use standards, the following tests were performed on drill cuttings cleaned with the sixth cleaning solution formula [18-101] from Table 1. First, approximately 2500 grams of drill cuttings were taken from a drilling well and characterized. The untreated drill cuttings were trending dry, having a liquid content of about 35%. The surface texture of the drill solids appeared to be of fine texture, being smaller particulates than visible to the naked eye and therefore determined to be smaller than 1 mm. The solids ranged from ¼ inch to ⅜ inch in size, so they were considered smaller than ½ inch in size. Based on this characterization, and using the decision tree of FIG. 2, the sixth cleaning solution of Table 1 was selected. Approximately 128 oz. of base cleaning formula as described above was provided, to which 2% (2.24 oz.) sodium laureth sulfate, 2% (2.24 oz.) sodium lauryl sulfate, 2% (2.24 oz.) lauramine oxide, and 2% (2.24 oz.) PEG-8 propylheptyl ether was added until the sixth cleaning solution formula from Table 1 was achieved: an 9% surfactant and 2.5% viscosity agent cleaning solution in water, being 2.25% sodium laureth sulfate, 2.25% sodium lauryl sulfate, 2.25% lauramine oxide, 2.25% PEG-8 propylheptyl ether, and 0.25% PPG-26 polypropylene glycol. The pH was adjusted with agricultural lime to raise pH or citric acid to lower pH until a pH between 5-7 was achieved. This cleaning solution was added to a Yescom Model PS-30A ultrasonic cleaner (having a 6 liter (203 oz.) cleaning tank and rated at 180 watts of ultrasonic cleaning power) and held at a temperature of 74.4° F. The drill cuttings were added to the cleaning solution and ultrasonic energy was applied to the solution and drill cuttings for 15 minutes. After the cleaning period of 15 minutes, the cuttings were removed from solution, placed in a sample jar and refrigerated.

The resulting cleaned solids [18-101] were subjected to analytical testing according to TCLP which simulates leaching through a landfill. The results are presented in Table 12 below and are compared with the PA Drill Cuttings requirements and WV DEP requirements described above for beneficial reuse of drill cuttings and/or waste.

TABLE 12

| Analyte | Sample 18-101 (mg/kg)* | PA-Drill Cuttings (mg/kg)* | WV (mg/kg) |
|---|---|---|---|
| Metals | | | |
| Aluminum | 7,660 | 190,000 | none specified |
| Antimony | <10 | 88 | none specified |
| Arsenic | 5.7 | 29 | 20 |
| Barium | 113 | 15,000 | none specified |
| Beryllium | 0.64 | 440 | none specified |
| Boron | 5.1 | 20,000 | none specified |
| Cadmium | <5.0 | 47 | 39 |
| Calcium | 24,300 | none specified | none specified |
| Chromium | 59.5 | none specified | 1000 |
| Cobalt | 9.6 | 4,400 | none specified |
| Copper | 19.8 | 1,500 | 1,500 |
| Lead | 5.7 | 500 | 250 |
| Lithium | 14.6 | none specified | none specified |
| Magnesium | 6,060 | none specified | none specified |
| Manganese | 639 | 31,000 | none specified |
| Mercury | 0.036 | 66 | 10 |
| Molybdenum | <2.0 | 18 | 18 |
| Nickel | 40.2 | 4,400 | 200 |
| Selenium | <10 | 1,100 | 36 |
| Silver | <0.5 | 1,100 | none specified |
| Strontium | 90.3 | none specified | none specified |
| Thallium | <10 | 15 | none specified |
| Zinc | 64.7 | 66,000 | 2800 |
| Organics | | | |
| 1,1-Dichloroethene | <0.13 | 6.4 | none specified |
| cis-1,2-dichloroethene | <0.13 | 670 | none specified |
| trans-1,2-dichloroethene | <0.13 | 1,300 | none specified |
| trans-1,2-Dichloroethylene | <0.13 | none specified | none specified |
| 1,1,1-Trichloroethane | <0.13 | 750 | none specified |
| 1,1,2-Trichloroethane | <0.13 | 20 | none specified |
| 1,2-Dichloroethane | <0.13 | 12 | none specified |
| 1,2-Dichloropropane | <0.13 | 31 | none specified |
| 1,2,4-Trichlorobenzene | <0.13 | 340 | none specified |
| 1,2,4-Trimethylbenzene | <0.13 | 110 | none specified |
| 1,3,5-Trimethylbenzene | <0.13 | 110 | none specified |
| 1,2-Dichlorobenzene | <0.13 | 260 | none specified |
| 1,4-Dichlorobenzene | <0.13 | 210 | none specified |
| 2,4-D | <10.4 | 200 | none specified |
| 2,4-Dinitrotoluene | <1.0 | 58 | none specified |
| 2,4,5-TP (Silvex) | <10.4 | 1,200 | none specified |
| 2,4,5-Trichlorophenol | <1.0 | 12,000 | none specified |
| 2,4,6-Trichlorophenol | <1.0 | 6,600 | none specified |
| Atrazine | <1.0 | 46 | none specified |
| Benzene | <0.13 | 41 | none specified |
| Benzo(a)pyrene | <1.0 | 2.5 | none specified |
| Carbon Tetrachloride | <0.13 | 21 | none specified |
| Chlordane | <1.04 | 28 | none specified |
| Chlorobenzene | <0.13 | 490 | none specified |
| Chloroform | <0.13 | 6 | none specified |
| Cresol | <1.0 | 1,100 | none specified |
| Dalapon | <52.1 | 2,000 | none specified |
| Di(2-ethylhexyl) adipate | <1.0 | 10,000 | none specified |
| Dibromochloropropane | <0.13 | 3.8 | none specified |
| Dichloromethane (Methylene Chloride) | <0.13 | 680 | none specified |
| Dinoseb | <10.4 | 30 | none specified |
| Endrin | <0.104 | 13 | none specified |
| Ethylbenzene | <0.13 | 180 | none specified |
| Ethylene Dibromide (1,2-Dibromomethane) | <0.13 | 0.21 | none specified |
| Ethlyene Glycol | <52 | 10,000 | none specified |
| Heptachlor | <0.104 | 4 | none specified |
| Heptachlor Epoxide | <0.104 | 2 | none specified |
| Hexachlorobenzene | <1.0 | 0.15 | none specified |
| Hexachlorobutadiene | <0.13 | 44 | none specified |
| Hexachlorocyclopentadine | <1.0 | 66 | none specified |
| Hexachloroethane | <0.13 | 220 | none specified |
| Isopropylbenzene (Cumene) | <0.13 | 700 | none specified |
| Lindane (Gamma BHC) | <0.104 | 14 | none specified |
| m-Cresol (3-Methylphenol) | <1.0 | 440 | none specified |

TABLE 12-continued

| Analyte | Sample 18-101 (mg/kg)* | PA-Drill Cuttings (mg/kg)* | WV (mg/kg) |
|---|---|---|---|
| Methoxychlor | <0.104 | 15 | none specified |
| Methyl Ethyl Ketone (butanone,2-) | <0.64 | 10,000 | none specified |
| Methyl-tert-butyl-ether (MTBE) | <0.13 | 620 | none specified |
| Naphthalene | <0.13 | 140 | none specified |
| Nitrobenzene | <2.1 | 110 | none specified |
| o-Cresol (methylphenol, 2-) | <1.0 | 1,200 | none specified |
| p-Cresol (4-Methylphenol) | <1.0 | 1,100 | none specified |
| PCBs | <0.21 | 1 or 2 | none specified |
| Pentachlorophenol | <0.104 | 150 | none specified |
| Pyridine | <2.1 | 33 | none specified |
| Styrene | <0.13 | 1,400 | none specified |
| Tetrachloroethene | <0.13 | 240 | none specified |
| Toluene | <0.13 | 350 | none specified |
| Toxophene | <2.08 | 16 | none specified |
| Trichloroethene | <0.13 | 190 | none specified |
| Vinyl Chloride | <0.13 | 12 | none specified |
| Xylenes | <0.26 | 310 | none specified |
| | Miscellaneous | | |
| Chlorides (Leachable) | 3.8 mg/L | 250 mg/L | none specified |
| Sulfates (Leachable) | <5 mg/L | 250 mg/L | none specified |
| Total Petroleum Hydrocarbons | <520 | none specified | none specified |
| Paint Filter | no free liquid | none specified | none specified |
| Percent Solids | 0.96 gram/gram | none specified | none specified |
| Sulfide (Total) | 210 | none specified | none specified |
| Toatl Organic halogens | <52 | none specified | none specified |
| Volitile Residue | 4.31% | none specified | none specified |
| Bromide | <4 | none specified | none specified |
| Solid pH | 9.92 | none specified | none specified |
| Cyanide (Weak Acid Dissociable Cyanide) | <2.1 | none specified | none specified |
| Fluoride | 3.4 | none specified | none specified |
| Gross Alpha/Beta | 14.5 +/− 6.89 pCi/g | none specified | none specified |
| Rad 226/228 | 0.59 +/− 0.0422 pCi/g | none specified | none specified |
| Thorium | <10 | none specified | none specified |
| Uranium | <10 | none specified | none specified |

*unless otherwise noted

As is evident from Table 12, the method and formula of the present invention significantly reduces the contaminants in drill solids to levels well below the leachability maximums acknowledged by Pennsylvania and West Virginia for beneficial reuse. Sample 18-101 cleaned by the current method with the sixth cleaning solution formula meets the current requirements leachability levels for treated drill cuttings in Pennsylvania, particularly with respect to chlorides and sulfates which are known to be problematic in drill cuttings. It also meets the standards for beneficial use in West Virginia.

The resulting cleaned solids [18-101] were also subjected to analytical testing according to SPLP as described in EPA Method 1312, which determines the mobility or leachability of organic and inorganic analytes in liquids, soils, and wastes. This is a further requirement for drill cuttings in Pennsylvania according to the PA Drill Cuttings described above to meet beneficial reuse. The results of this testing are presented in Table 13 below and are compared with the PA Drill Cuttings requirements as well as those of the EPA, Texas and North Dakota (which follow the EPA) for beneficial reuse of waste.

TABLE 13

| Analyte | Sample 18-101 (mg/L) | PA-Drill Cuttings (mg/L) | EPA, TX and ND (mg/L) |
|---|---|---|---|
| | Metals | | |
| Aluminum | 1 | 0.1 | not specified |
| Antimony | 0.002 | 0.006 | 1 |
| Arsenic | 0.012 | 0.05 | 1.8 |
| Barium | 0.03 | 2 | 100 |
| Beryllium | <0.001 | 0.004 | 0.08 |
| Cadmium | <0.002 | 0.005 | 0.5 |
| Chromium | <0.01 | 0.1 | 5 |
| Chloride | 5.46 | 250 | not specified |
| Copper | <0.01 | 1 | not specified |
| Fluoride | 0.182 | 4 | not specified |

TABLE 13-continued

| Analyte | Sample 18-101 (mg/L) | PA-Drill Cuttings (mg/L) | EPA, TX and ND (mg/L) |
|---|---|---|---|
| Iron | 0.35 | 0.3 | not specified |
| Lead | <0.001 | 0.015 | 1.5 |
| Manganese | <0.01 | 0.1 | not specified |
| Mercury | <0.0002 | 0.002 | 0.2 |
| Nickel | <0.01 | 0.1 | 70 |
| Nitrate | <0.050 | 10 | not specified |
| Nitrite | <0.050 | 1 | not specified |
| Selenium | <0.001 | 0.05 | 1 |
| Silver | <0.005 | 0.01 | 5 |
| Sulfate | <2.0 | 500 | not specified |
| Thallium | 0.0002 | 0.002 | not specified |
| Zinc | 0.01 | 2 | not specified |
| pH | Metals = 7.65* Non-metals = 9.97* | 5.5-11.5* | not specified |
| | Organics | | |
| Benzene | 0.0024 | 0.005 | 0.5 |
| Carbon Tetrachloride | <0.001 | 0.005 | 0.5 |
| O-Dichlorobenzene (1,2-Dichlorobenzene) | <0.001 | 0.6 | 6 |
| para-Dichlorobenzene (1,4-Dichlorobenzene) | <0.001 | 0.075 | 7.5 |
| 1,2-Dichloroethane | <0.001 | 0.005 | 0.5 |
| 1,1-Dichloroethene | <0.001 | 0.027 | not specified |
| Cis-1,2-Dicloroethene | <0.001 | 0.007 | not specified |
| Trans-1,2-Dichloroethylene | <0.001 | 0.07 | 0.6 |
| Dichloromethane (Methylene Chloride) | <0.001 | 0.005 | 50 |
| 1,2-Dichloropropane | <0.001 | 0.005 | 1 |
| Ethylbenzene | <0.001 | 0.7 | 0.7 |
| Monochlorobenzene (Chlorobenzene) | <0.001 | 0.1 | 70 |
| Styrene | <0.001 | 0.1 | 700 |
| Tetrachloroethene | <0.001 | 0.005 | 2 |
| Toluene | 0.0045 | 1 | 1000 |
| 1,2,4-Trichlorobenzene | <0.001 | 0.07 | 70 |
| 1,1,1-Trichloroethane | <0.001 | 0.2 | 10 |
| 1,1,2-Trichloroethane | <0.001 | 0.003 | 300 |
| Trichloroethene | <0.001 | 0.005 | 0.5 |
| Vinyl Chloride | <0.001 | 0.002 | 0.2 |
| Xylenes | <0.1 | 10 | 7000 |
| Atrazine | <0.00052 | 0.003 | not specified |
| Benzo(a)pyrene | <0.00021 | 0.0002 | not specified |
| Chlordane | <0.0011 | 0.002 | 0.03 |
| 2,4,D (Dichlorophenoxyacetic acid) | <0.001 | 0.07 | 10 |
| Dalapon | <0.001 | 0.2 | not specified |
| Dibromochloropropane 1,2-Dibromo-3-chloropropane (DBCP) | <0.00004 | 0.0002 | not specified |
| Di (2-ethylhexyl) Adipate Bis(2-ethylhexyl Adipate | <0.00052 | 0.4 | 30 |
| Dinoseb | <0.001 | 0.007 | 3.5 |
| Endrin | <0.000053 | 0.002 | 0.02 |
| Ethylene Dibromide (1,2-Dibromoethane) | <0.00004 | 0.00005 | 0.004 |
| Heptachlor | <0.000053 | 0.0004 | 0.04 |
| Heptachlor Epoxide | <0.000053 | 0.0002 | 0.04 |
| Hexachlorobenzene | <0.00011 | 0.001 | 0.13 |
| Hexachlorocyclopentadiene | <0.00052 | 0.05 | 20 |
| Lindane | <0.000053 | 0.0002 | 0.3 |
| Methoxychlor | <0.000053 | 0.0004 | 10 |
| PCBs | <0.00105 | 2 | not specified |
| Pentachlorophenol | <0.001 | 0.001 | 100 |
| Toxaphene | <0.0021 | 0.002 | 0.3 |
| 2,4,5-TP (Silvex) | <0.001 | 0.05 | 1 |

*standard pH units

According to these data, Sample 18-101 is significantly reduced in the levels of contaminants to well below the maximum allowable limits for the current PA Drill Cuttings requirements for drill cuttings in Pennsylvania. It would also be acceptable under the EPA standards for beneficial use and for any states that follow it, such as Texas and North Dakota where well-known basins are located for drilling sites.

Though presented here in tabular form as maximum acceptable limits, it is acknowledged that the PA DEP, and perhaps other state or federal regulatory bodies, would permit beneficial reuse of cleaned materials that falls within 10% of the stated limit levels. For example, if an analyte is present in an amount exceeding the stated limit, the sample may still be considered to meet beneficial reuse standards if the number of analytes exceeding their respective limits is minimal. Accordingly, the present invention acknowledges and contemplates that the cleaning method and formulas may achieve cleaning to within ±10% of the levels stated in regulatory guidelines for beneficial reuse, or less.

These data collectively demonstrate that the method 100 for cleaning drill cuttings results in drill solids that meets developing standards for beneficial use of drill cuttings in Pennsylvania, West Virginia and Texas as a few illustrative examples. The resulting treated solids may therefore be used at the same well site or pad and therefore do not have to be transported during well operation. This will result in significant cost savings to well operators over the life of a well pad which often has multiple wells at a pad, such as up to 20 wells.

Since many modifications, variations and changes in detail can be made to the described preferred embodiments, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A method of cleaning drill cuttings having drill solids and drill fluid, said method comprising:

characterizing said drill cuttings as having:

(i) greater than 50% fluid composition or less than 50% fluid composition, (ii) solids texture being greater than 1 mm or less than 1 mm, and (iii) solids size being greater than 0.5 inch in diameter or less than 0.5 inch in diameter;

determining a composition of a cleaning solution based on said characterization of fluid composition, solids texture and solids size, said cleaning solution being one of:

(iv) a first formula having 1% surfactant and 2.5% viscosity agent when said drill cuttings have over 50% drill fluid composition and said drill solids have a texture greater than 1 mm and a size less than 0.5 inch;

(v) a second formula having 5% surfactant and 2.5% viscosity agent when said drill cuttings have over 50% drill fluid composition and said drill solids have a texture less than 1 mm and a size less than 0.5 inch;

(vi) a third formula having 1% surfactant and 3.5% viscosity agent when said drill cuttings have over 50% drill fluid composition and said drill solids have a texture greater than 1 mm and a size greater than 0.5 inch;

(vii) a fourth formula having 5% surfactant and 3.5% viscosity agent when said drill cuttings have over 50% drill fluid composition and said drill solids have a texture less than 1 mm and a size greater than 0.5 inch;

(viii) a fifth formula having 5% surfactant and 2.5% viscosity agent when said drill cuttings have less than 50% drill fluid composition and said drill solids have a texture greater than 1 mm and a size less than 0.5 inch;

(ix) a sixth formula having 9% surfactant and 2.5% viscosity agent when said drill cuttings have less than 50% drill fluid composition and said drill solids have a texture less than 1 mm and a size less than 0.5 inch;

(x) a seventh formula having 5% surfactant and 3.5% viscosity agent when said drill cuttings have less than 50% drill fluid composition and said drill solids have a texture greater than 1 mm and a size greater than 0.5 inch; and (xi) an eighth formula having 9% surfactant and 3.5% viscosity agent when said drill cuttings have less than 50% drill fluid composition and said drill solids have a texture less than 1 mm and a size greater than 0.5 inch; and treating said drill cuttings by:

(xii) contacting said drill cuttings with said cleaning solution having a composition as determined for a preselected treatment time; and (xiii) applying ultrasonic vibration to said cleaning solution and said drill cuttings for a preselected vibration time.

2. The method as recited in claim 1, further comprising reducing contaminants in said drill cuttings to leachable levels of within 10% of the following or less:

| | |
|---|---|
| Aluminum | 190,000 mg/kg |
| Antimony | 88 mg/kg |
| Arsenic | 29 mg/kg |
| Barium | 15,000 mg/kg |
| Beryllium | 440 mg/kg |
| Boron | 20,000 mg/kg |
| Cadmium | 47 mg/kg |
| Chromium | 1000 mg/kg |
| Cobalt | 4,400 mg/kg |
| Copper | 1,500 mg/kg |
| Lead | 500 mg/kg |
| Manganese | 31,000 mg/kg |
| Mercury | 66 mg/kg |
| Molybdenum | 18 mg/kg |
| Nickel | 4,400 mg/kg |
| Selenium | 1,100 mg/kg |
| Silver | 1,100 mg/kg |
| Thallium | 15 mg/kg |
| Zinc | 66,000 mg/kg |
| 1,1-Dichloroethene | 6.4 mg/kg |
| cis-1,2-dichloroethene | 670 mg/kg |
| trans-1,2-dichloroethene | 1,300 mg/kg |
| 1,1,1-Trichloroethane | 750 mg/kg |
| 1,1,2-Trichloroethane | 20 mg/kg |
| 1,2-Dichloroethane | 12 mg/kg |
| 1,2-Dichloropropane | 31 mg/kg |
| 1,2,4-Trichlorobenzene | 340 mg/kg |
| 1,2,4-Trimethylbenzene | 110 mg/kg |
| 1,3,5-Trimethylbenzene | 110 mg/kg |
| 1,2-Dichlorobenzene | 260 mg/kg |
| 1,4-Dichlorobenzene | 210 mg/kg |
| 2,4-D | 200 mg/kg |
| 2,4-Dinitrotoluene | 58 mg/kg |
| 2,4,5-TP | 1,200 mg/kg |
| 2,4,5-Trichlorophenol | 12,000 mg/kg |
| 2,4,6-Trichlorophenol | 6,600 mg/kg |
| Atrazine | 46 mg/kg |
| Benzene | 41 mg/kg |
| Benzo(a)pyrene | 2.5 mg/kg |
| Carbon Tetrachloride | 21 mg/kg |
| Chlordane | 28 mg/kg |
| Chlorobenzene | 490 mg/kg |
| Chloroform | 6 mg/kg |
| Cresol | 1,100 mg/kg |
| Dalapon | 2,000 mg/kg |
| Di(2-ethylhexyl) adipate | 10,000 mg/kg |
| Dibromochloropropane | 3.8 mg/kg |
| Dichloromethane | 680 mg/kg |
| Dinoseb | 30 mg/kg |
| Endrin | 13 mg/kg |
| Ethylbenzene | 180 mg/kg |
| Ethylene Dibromide | 0.21 mg/kg |
| Ethlyene Glycol | 10,000 mg/kg |
| Heptachlor | 4 mg/kg |
| Heptachlor Epoxide | 2 mg/kg |
| Hexachlorobenzene | 0.15 mg/kg |
| Hexachlorobutadiene | 44 mg/kg |

-continued

| | |
|---|---|
| Hexachlorocyclopentadine | 66 mg/kg |
| Hexachloroethane | 220 mg/kg |
| Isopropylbenzene | 700 mg/kg |
| Lindane | 14 mg/kg |
| m-Cresol | 440 mg/kg |
| Methoxychlor | 15 mg/kg |
| Methyl Ethyl Ketone | 10,000 mg/kg |
| Methyl-tert-butyl-ether | 620 mg/kg |
| Naphthalene | 140 mg/kg |
| Nitrobenzene | 110 mg/kg |
| o-Cresol | 1,200 mg/kg |
| p-Cresol | 1,100 mg/kg |
| PCBs | 2 mg/kg |
| Pentachlorophenol | 150 mg/kg |
| Pyridine | 33 mg/kg |
| Styrene | 1,400 mg/kg |
| Tetrachloroethene | 240 mg/kg |
| Toluene | 350 mg/kg |
| Toxophene | 16 mg/kg |
| Trichloroethene | 190 mg/kg |
| Vinyl Chloride | 12 mg/kg |
| Xylenes | 310 mg/kg |
| Chlorides Leachable | 250 mg/l |
| Sulfates Leachable | 250 mg/l. |

3. The method as recited in claim 1, further comprising reducing contaminants in said drill cuttings to leachable levels of within 10% of the following or less:

| | |
|---|---|
| Aluminum | 0.1 mg/L |
| Antimony | 0.006 mg/L |
| Arsenic | 0.05 mg/L |
| Barium | 2 mg/L |
| Beryllium | 0.004 mg/L |
| Boron | 0.6 mg/L |
| Cadmium | 0.005 mg/L |
| Chromium | 0.1 mg/L |
| Cobalt | 0.73 mg/L |
| Copper | 1 mg/L |
| Lead | 0.015 mg/L |
| Manganese | 0.1 mg/L |
| Mercury | 0.002 mg/L |
| Molybdenum | 0.175 mg/L |
| Nickel | 0.1 mg/L |
| Selenium | 0.05 mg/L |
| Silver | 0.1 mg/L |
| Thallium | 0.002 mg/L |
| Zinc | 2 mg/L |
| 1,1-Dichloroethene | 0.007 mg/L |
| cis-1,2-dichloroethene | 0.007 mg/L |
| trans-1,2-dichloroethene | 0.07 mg/L |
| 1,1,1-Trichloroethane | 0.2 mg/L |
| 1,1,2-Trichloroethane | 0.003 mg/L |
| 1,2-Dichloroethane | 0.005 mg/L |
| 1,2-Dichloropropane | 0.005 mg/L |
| 1,2,4-Trichlorobenzene | 0.07 mg/L |
| 1,2,4-Trimethylbenzene | 0.016 mg/L |
| 1,3,5-Trimethylbenzene | 0.016 mg/L |
| 1,2-Dichlorobenzene | 0.6 mg/L |
| 1,4-Dichlorobenzene | 0.075 mg/L |
| 2,4-D | 0.07 mg/L |
| 2,4-Dinitrotoluene | 0.0021 mg/L |
| 2,4,5-TP | 0.05 mg/L |
| 2,4,5-Trichlorophenol | 3.5 mg/L |
| 2,4,6-Trichlorophenol | 0.00318 mg/L |
| Atrazine | 0.003 mg/L |
| Benzene | 0.005 mg/L |
| Benzo(a)pyrene | 0.0002 mg/L |
| Carbon Tetrachloride | 0.005 mg/L |
| Chlordane | 0.002 mg/L |
| Chlorobenzene | 0.1 mg/L |
| Chloroform | 0.1 mg/L |
| Cresol | 0.18 mg/L |
| Dalapon | 0.2 mg/L |
| Di(2-ethylhexyl) adipate | 0.4 mg/L |
| Dibromochloropropane | 0.0002 mg/L |
| Dichloromethane | 0.005 mg/L |

-continued

| | |
|---|---|
| Dinoseb | 0.007 mg/L |
| Endrin | 0.002 mg/L |
| Ethylbenzene | 0.7 mg/L |
| Ethylene Dibromide | 0.00005 mg/L |
| Ethylene Glycol | 14 mg/L |
| Heptachlor | 0.0004 mg/L |
| Heptachlor Epoxide | 0.0002 mg/L |
| Hexachlorobenzene | 0.001 mg/L |
| Hexachlorobutadiene | 0.001 mg/L |
| Hexachlorocyclopentadiene | 0.05 mg/L |
| Hexachloroethane | 0.001 mg/L |
| Isopropylbenzene | 1.1 mg/L |
| Lindane | 0.0002 mg/L |
| m-Cresol | 1.75 mg/L |
| Methoxychlor | 0.0004 mg/L |
| Methyl Ethyl Ketone | 2.8 mg/L |
| Methyl-tert-butyl ether | 0.02 mg/L |
| Naphthalene | 0.1 mg/L |
| Nitrobenzene | 0.018 mg/L |
| o-Cresol | 1.75 mg/L |
| p-Cresol | 0.18 mg/L |
| Pentachlorophenol | 0.001 mg/L |
| Pyridine | 0.0097 mg/L |
| Styrene | 0.1 mg/L |
| Tetrachloroethene | 0.005 mg/L |
| Toluene | 1 mg/L |
| Toxaphene | 0.002 mg/L |
| Trichloroethene | 0.005 mg/L |
| Vinyl Chloride | 0.002 mg/L |
| Xylenes | 10 mg/L |
| Chlorides | 250 mg/L |
| Sulfates | 250 mg/L. |

4. The method as recited in claim 1, wherein said surfactant is at least one of salt, oxide and ether of at least one fatty acid.

5. The method as recited in claim 4, wherein said surfactant is at least one of sodium laureth sulfate, sodium lauryl sulfate, lauramine oxide and PEG-8 propylheptyl ether.

6. The method as recited in claim 1, wherein said viscosity agent is at least one of a glycol, ethylene polymer and copolymer.

7. The method as recited in claim 6, wherein said viscosity agent is at least one of PEI-14 PEG-10/PPG-7 copolymer, PPG-26 and PEG-8 propylheptyl ether.

8. The method as recited in claim 1, wherein said steps of treating said drill cuttings occurs at a drill site.

9. The method as recited in claim 8, wherein said steps of treating said drill cuttings occurs contemporaneously with removing said drill cuttings from a drill rig at said drill site.

10. The method as recited in claim 1, wherein said steps of treating said drill cuttings occurs on one of: (i) a continuous basis, and (ii) a batch basis.

11. The method as recited in claim 1, wherein said predetermined treatment time is in the range of 1 to 20 minutes.

12. The method as recited in claim 11, wherein said predetermined treatment time is selected from the group consisting of: (i) in the range of 1 to 5 minutes, (ii) in the range of 5 to 10 minutes, and (iii) in the range of 10 to 20 minutes.

13. The method as recited in claim 1, wherein said predetermined vibration time is in the range of 1 to 20 minutes.

14. The method as recited in claim 13, wherein said predetermined vibration time is selected from the group consisting of: (i) in the range of 20 seconds-5 minutes, (ii) in the range of 1-5 minutes, (iii) in the range of 1-4 minutes, and (iv) in the range of 1-3 minutes, (v) in the range of 5 to 10 minutes, and (vi) in the range of 10 to 20 minutes.

15. The method as recited in claim 1, wherein said ultrasonic vibration is in the range of 80 to 120 kilohertz.

16. The method as recited in claim 1, wherein applying said ultrasonic vibration further comprises operating at least one ultrasound source at about 30 watts per gallon of cleaning solution in said treatment compartment.

17. The method as recited in claim 1, wherein said step of determining said composition of said cleaning solution includes providing a base cleaning solution of 1% surfactant and 0.5% viscosity agent, and adjusting said base cleaning solution according to at least one of said drill solid composition and said drill fluid composition.

18. The method of claim 17, wherein said adjusting said base cleaning solution includes adding at least one of the following:

(i) at least one surfactant until said cleaning solution is 1% to 5% surfactant when said drill cuttings have over 50% drill fluid composition and 5% to 9% surfactant when said drill cuttings have less than 50% drill fluid composition;

(ii) at least one viscosity agent until said cleaning solution is 2.5% to 3.5% viscosity agent when said drill cuttings have over 50% drill fluid composition and 2.5% to 3.5% viscosity agent when said drill cuttings have less than 50% drill fluid composition;

(iii) at least one surfactant until said cleaning solution is 1% to 5% surfactant when said drill solids have a texture greater than 1 mm and 5% to 9% surfactant when said drill solids have a texture less than 1 mm;

(iv) at least one viscosity agent until said cleaning solution is 2.5% to 3.5% viscosity agent when said drill solids have a texture greater than 1 mm and 2.5% to 3.5% viscosity agent when said drill solids have a texture less than 1 mm;

(v) at least one surfactant until said cleaning solution is 1% to 9% surfactant when said drill solids have a size less than ½ inch and 1% to 9% surfactant when said drill solids have a size greater than ½ inch; and (vi) at least one viscosity agent until said cleaning solution 2.5% viscosity agent when said drill solids have a size less than ½ inch and 3.5% viscosity agent when said drill solids have a size greater than ½ inch.

19. The method as recited in claim 1, further comprising at least one of: (i) applying a pre-treatment fluid to said drill cuttings for a predetermined pre-treatment time in the range of 15 to 120 seconds at a pre-treatment pressure in the range of 15 to 120 psi, and (ii) applying a post-treatment fluid to cleaned drill solids for a predetermined post-treatment time in the range of 15 to 120 seconds and post-treatment pressure in the range of 15 to 120 psi.

20. The method as recited in claim 19, wherein said each of said pre-treatment time and said post-treatment time is in the range of 15 to 30 seconds and each of said pre-treatment pressure and said post-treatment pressure is in the range of 30 to 60 psi.

* * * * *